US012664176B2

(12) United States Patent
Ares et al.

(10) Patent No.: US 12,664,176 B2
(45) Date of Patent: Jun. 23, 2026

(54) CUSTOMIZED DATA ANALYSIS AND VISUALIZATION USING STRUCTURED DATA TABLES AND NODAL NETWORKS

(71) Applicant: Choral Systems, LLC, Milton, GA (US)

(72) Inventors: Jean-Michel Ares, Milton, GA (US); Dick Amin, Milton, GA (US)

(73) Assignee: Choral Systems, LLC, Milton, GA (US)

( * ) Notice: Subject to any disclaimer, the term of this patent is extended or adjusted under 35 U.S.C. 154(b) by 0 days.

(21) Appl. No.: 17/886,395

(22) Filed: Aug. 11, 2022

(65) Prior Publication Data

US 2023/0067944 A1 Mar. 2, 2023

Related U.S. Application Data

(60) Provisional application No. 63/232,585, filed on Aug. 12, 2021.

(51) Int. Cl.
G06F 16/26 (2019.01)
G06F 16/242 (2019.01)
G06F 16/28 (2019.01)

(52) U.S. Cl.
CPC .......... G06F 16/26 (2019.01); G06F 16/2423 (2019.01); G06F 16/283 (2019.01)

(58) Field of Classification Search
CPC ..... G06F 16/26; G06F 16/2423; G06F 16/283
See application file for complete search history.

(56) References Cited

U.S. PATENT DOCUMENTS 6,292,715 B1 9/2001 Rongo
9,436,760 B1 9/2016 Tacchi et al.
(Continued)

FOREIGN PATENT DOCUMENTS

EP 3 953 883 A1 2/2022
WO WO-2020/206204 A1 10/2020

OTHER PUBLICATIONS

International Search Report and Written Opinion on PCT/US2022/040021 dated Dec. 15, 2022 (21 pages).
(Continued)

*Primary Examiner* — Aleksandr Kerzhner
*Assistant Examiner* — Aryan D Toughiry
(74) *Attorney, Agent, or Firm* — Foley & Lardner LLP

(57) ABSTRACT
Methods and systems described herein allow a server to generate a nodal data structure by parsing data into a set of domain data tables, each domain data table corresponding to a domain having a first criterion, parsing each domain data table into a set of dimension data tables, each dimension data table corresponding to a dimension having a second criterion, and generating a nodal network comprising a set of nodes where each node represents at least a portion of the data, each node having metadata comprising an identifier corresponding to a particular domain data table and a particular dimension table corresponding to data associated with each node. Upon receiving a request, the server parses the request to identify a first subset of the set of nodes associated with the request and identifies a second subset of the set of nodes authorized to be accessed by the user computing device. The server then displays data associated with the second subset of the set of nodes.

18 Claims, 57 Drawing Sheets

3400

(56) References Cited

U.S. PATENT DOCUMENTS

| | | | |
|---|---|---|---|
| 9,558,265 | B1 | 1/2017 | Tacchi et al. |
| 10,311,360 | B1 | 6/2019 | Ares |
| 11,328,213 | B2 | 5/2022 | Ares et al. |
| 11,334,802 | B2 | 5/2022 | Ares et al. |
| 11,630,815 | B2 | 4/2023 | Ares et al. |
| 11,657,028 | B2 | 5/2023 | Ares et al. |
| 2004/0174397 | A1 | 9/2004 | Cereghini et al. |
| 2005/0060647 | A1 | 3/2005 | Doan et al. |
| 2006/0282443 | A1 | 12/2006 | Hanagata |
| 2007/0011146 | A1 | 1/2007 | Holbrook |
| 2007/0198564 | A1 | 8/2007 | Blackstone et al. |
| 2008/0319947 | A1 | 12/2008 | Latzina et al. |
| 2009/0265299 | A1 | 10/2009 | Hadad et al. |
| 2009/0319930 | A1 | 12/2009 | Groh et al. |
| 2012/0166425 | A1 | 6/2012 | Sharma et al. |
| 2012/0180133 | A1 | 7/2012 | Al-Harbi et al. |
| 2013/0151417 | A1 | 6/2013 | Gupta |
| 2014/0090056 | A1 | 3/2014 | Manadhata et al. |
| 2014/0304214 | A1 | 10/2014 | Sakunkoo et al. |
| 2014/0379697 | A1 | 12/2014 | Martin et al. |
| 2015/0026260 | A1 | 1/2015 | Worthley |
| 2015/0100543 | A1 | 4/2015 | Tsuchida et al. |
| 2015/0199405 | A1 | 7/2015 | Redlich et al. |
| 2015/0229664 | A1 | 8/2015 | Hawthorn et al. |
| 2016/0350834 | A1 | 12/2016 | Wilson et al. |
| 2017/0046127 | A1 | 2/2017 | Fletcher et al. |
| 2017/0063911 | A1 | 3/2017 | Muddu et al. |
| 2017/0063912 | A1 | 3/2017 | Muddu et al. |
| 2017/0126843 | A1 | 5/2017 | Pantea et al. |
| 2017/0293840 | A1 | 10/2017 | Ceugniet et al. |
| 2017/0346839 | A1 | 11/2017 | Peppe et al. |
| 2018/0025035 | A1 | 1/2018 | Xia et al. |
| 2018/0113950 | A1 | 4/2018 | Blanchflower |
| 2018/0357298 | A1 | 12/2018 | Andrei et al. |
| 2019/0303387 | A1 | 10/2019 | Smarda et al. |
| 2020/0012741 | A1 | 1/2020 | Bracholdt et al. |
| 2020/0097609 | A1 | 3/2020 | Randhawa et al. |
| 2020/0175181 | A1* | 6/2020 | Hughes ................. G06T 11/206 |
| 2020/0220823 | A1* | 7/2020 | Eirinberg ........... G06Q 30/0209 |
| 2020/0234153 | A1 | 7/2020 | Ares |
| 2020/0234155 | A1* | 7/2020 | Ares .................... G06F 16/258 |
| 2021/0026982 | A1* | 1/2021 | Amarendran ....... G06F 21/6254 |
| 2021/0334254 | A1* | 10/2021 | Thompson .......... G06F 16/9024 |

OTHER PUBLICATIONS

Mayank. "Visualizing Networks in Python." Towards Data Science. Feb. 2, 2021 Retrieved on Nov. 8, 2022 (Nov. 8, 2022) from <https://towardsdatascience.com/visualizing-networks-in-python-d70f4cbeb259> entire document.

Extended European Search Report on EPO App. No. 20782277.6 dated Nov. 29, 2022 (9 pages).

International Search Report & Written Opinion for PCT/US2020/026511 dated Aug. 14, 2020 (19 pages).

Office Action for Canadian Patent App. No. 3,135,186 dated Aug. 19, 2024 (6 pages).

Office Action for Canadian Patent App. No. 3,135,186 dated Oct. 10, 2023 (2 pages).

* cited by examiner

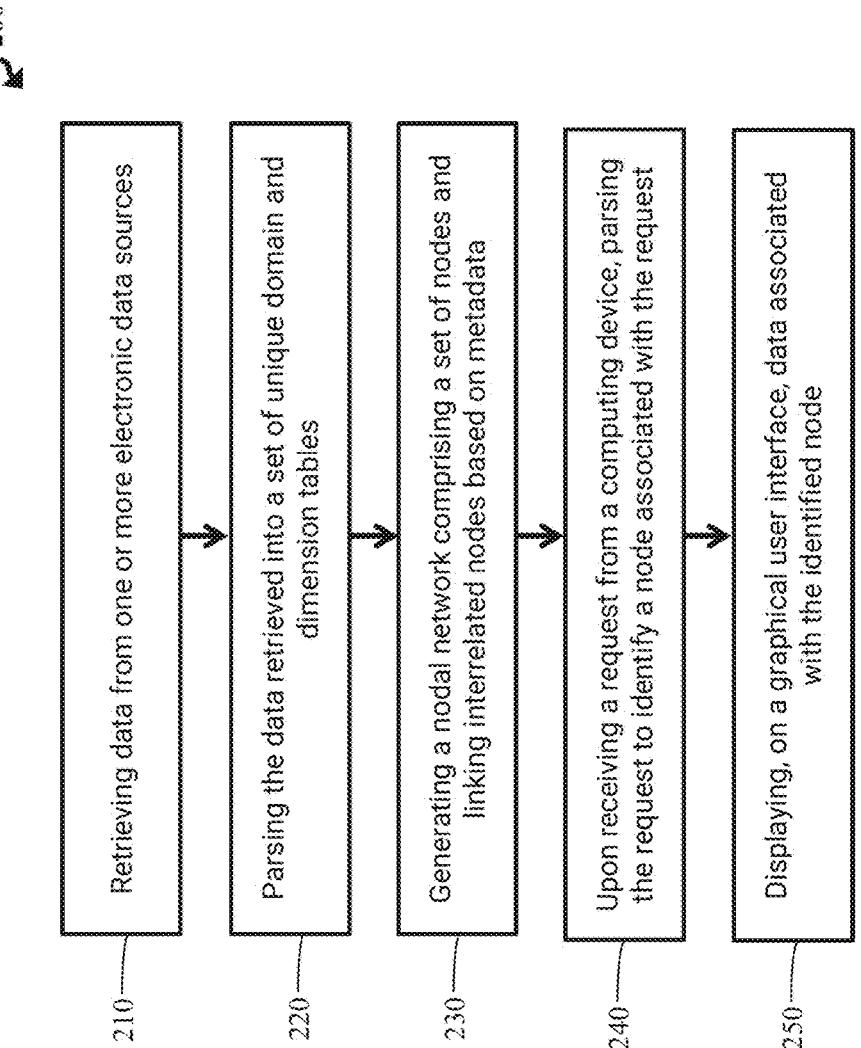

200

210 — Retrieving data from one or more electronic data sources

220 — Parsing the data retrieved into a set of unique domain and dimension tables 230 — Generating a nodal network comprising a set of nodes and linking interrelated nodes based on metadata 240 — Upon receiving a request from a computing device, parsing the request to identify a node associated with the request 250 — Displaying, on a graphical user interface, data associated with the identified node

FIG. 2

The knowledge grid is subdivided into "N" domains

⛏ Domains

| | | |
|---|---|---|
| ⟳ Financials | ⊡ Customer journey | ⟰ Regulatory |
| △ Risk | Sales | Issue |
| Organization | ○ Technology | Initiative |
| ◎ Objectives | Data & analytics | Innovation |
| ⟲ Process | Facilities | M&A |
| ☰ Controls | ATM | Economy |
| Operations | Supplier | Industry |
| Customer | Cyber & privacy | Competitor |
| ® Brand | Fraud | ◷ Time |
| Product | AML | ⊕ Location |
| Channel | Audit | Platform |

310

The contents of each domain is organized using standard building blocks

⛏ Building blocks

Measures    ⊙ Dimensions    Atomic items

✳ Relationships    Unstructured data    Views

Diagrams    Mental models    ≣ Methods

Glossary    Keywords

320

Each building block is assembled using standard data structures

• Core Dimension Tables (DTs)

• Fact Catalogs (FCs)

• Fact Journals (FJs)

• View Dimension Tables (DTVs)

• Measure / Information Dimension Tables (DTIs)

• Keyword Dimension Tables (DTKs)

330

Data sources

Structured . Unstructured . Internal . External . Choral

FIG. 3A

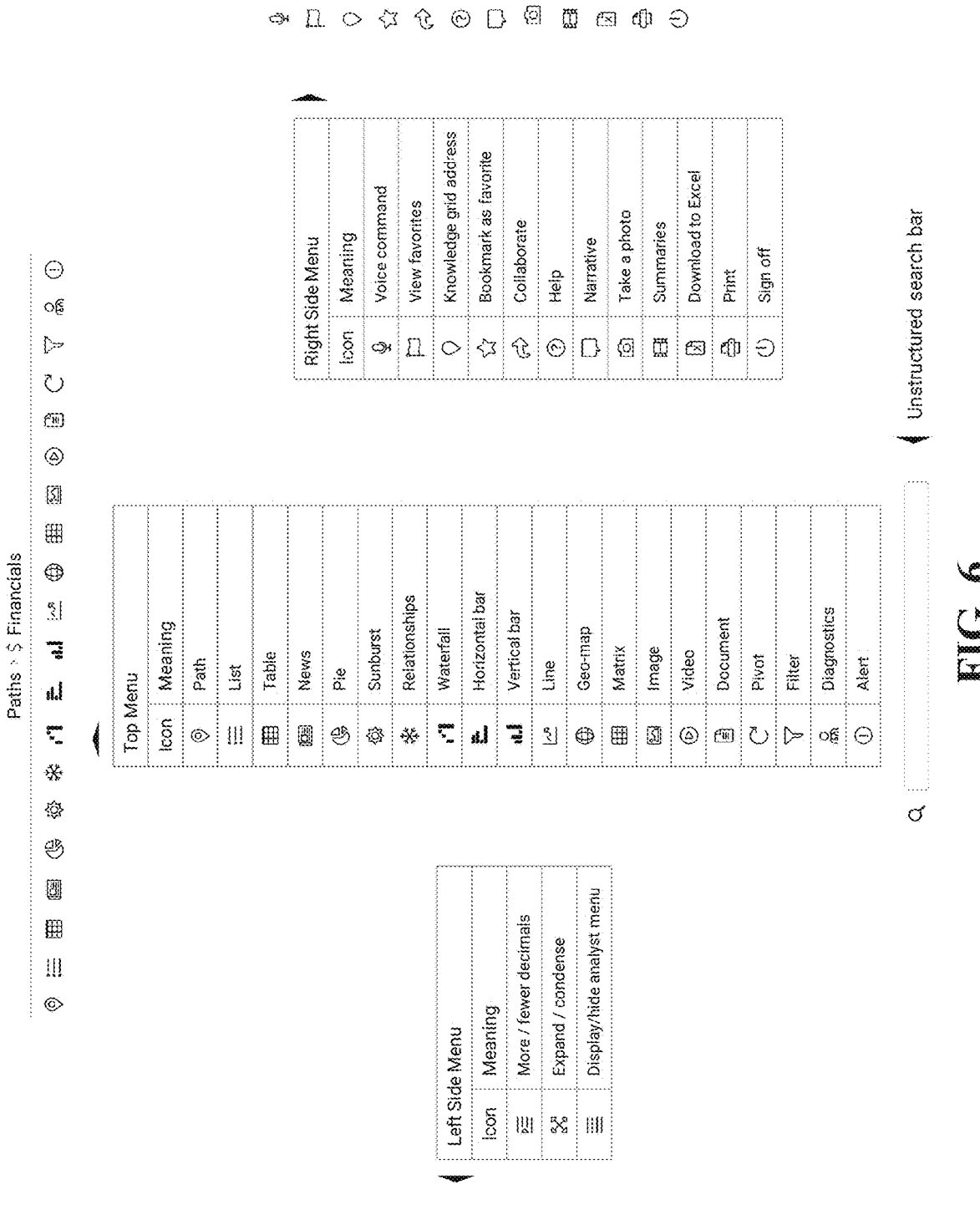

Top Menu

| Icon | Meaning |
|---|---|
| ◎ | Path |
| ☰ | List |
| ⊞ | Table |
| ▥ | News |
| ◔ | Pie |
| ✿ | Sunburst |
| ✳ | Relationships |
| ⌐ | Waterfall |
| ▮▪ | Horizontal bar |
| ▪▮ | Vertical bar |
| ⌁ | Line |
| ⊕ | Geo-map |
| ⊞ | Matrix |
| ▨ | Image |
| ◉ | Video |
| ▤ | Document |
| ⟳ | Pivot |
| ▽ | Filter |
| ⚙ | Diagnostics |
| ⊖ | Alert |

Right Side Menu

| Icon | Meaning |
|---|---|
| ⚲ | Voice command |
| ⬜ | View favorites |
| ◇ | Knowledge grid address |
| ☆ | Bookmark as favorite |
| ⬑ | Collaborate |
| ⊙ | Help |
| ▭ | Narrative |
| ▣ | Take a photo |
| ⊞ | Summaries |
| ⊠ | Download to Excel |
| ⎙ | Print |
| ⟳ | Sign off |

Left Side Menu

| Icon | Meaning |
|---|---|
| ▦ | More / fewer decimals |
| ✂ | Expand / condense |
| ▥ | Display/hide analyst menu |

Paths › $ Financials

Unstructured search bar

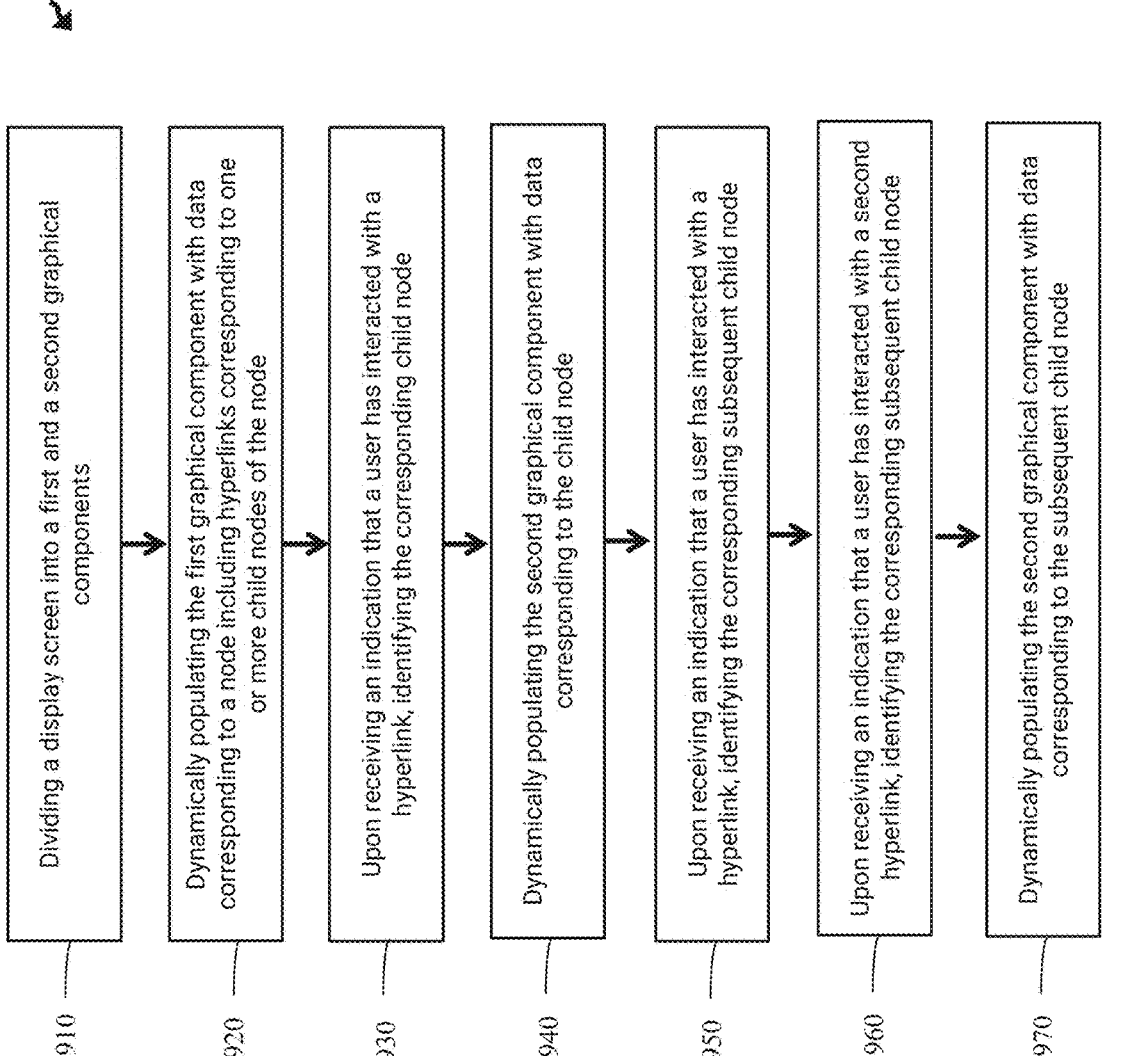

900

910 — Dividing a display screen into a first and a second graphical components

920 — Dynamically populating the first graphical component with data corresponding to a node including hyperlinks corresponding to one or more child nodes of the node 930 — Upon receiving an indication that a user has interacted with a hyperlink, identifying the corresponding child node 940 — Dynamically populating the second graphical component with data corresponding to the child node 950 — Upon receiving an indication that a user has interacted with a hyperlink, identifying the corresponding subsequent child node 960 — Upon receiving an indication that a user has interacted with a second hyperlink, identifying the corresponding subsequent child node 970 — Dynamically populating the second graphical component with data corresponding to the subsequent child node

FIG. 9A

Paths : Channels

|  | F16 | | F17 | | | | F18 | |
|---|---|---|---|---|---|---|---|---|
|  | Q3 | Q4 | Q1 | Q2 | Q3 | Q4 | Q1 | Q2 |
| - Channel type | N | N | N | N | N | N | N | N |
| Digital | N | N | N | N | N | N | N | N |
| Branch | N | N | N | N | N | N | N | N |
| ATM | N | N | N | N | N | N | N | N |
| Call center | N | N | N | N | N | N | N | N |
| - Sales force | N | N | N | N | N | N | N | N |
| Customer care services | N | N | N | N | N | N | N | N |
| Retail banking sales & service | N | N | N | N | N | N | N | N |
| Wealth sales & service | N | N | N | N | N | N | N | N |
| Commercial sales & service | N | N | N | N | N | N | N | N |
| Customer solutions | N | N | N | N | N | N | N | N |

Trend ( Q . Y )

View
Channel count
Sales
Costs
Transaction count
Transaction value
AVG transaction value
Cost / transaction
NPS
- ORGANIZATION
  ∨ P&C
  ∨ Wealth
  ∨ Asset Mgmt
  ∨ Capital Markets
- LOCATIONS
  ∨ Canada
  ∨ United States
  ∨ Other countries

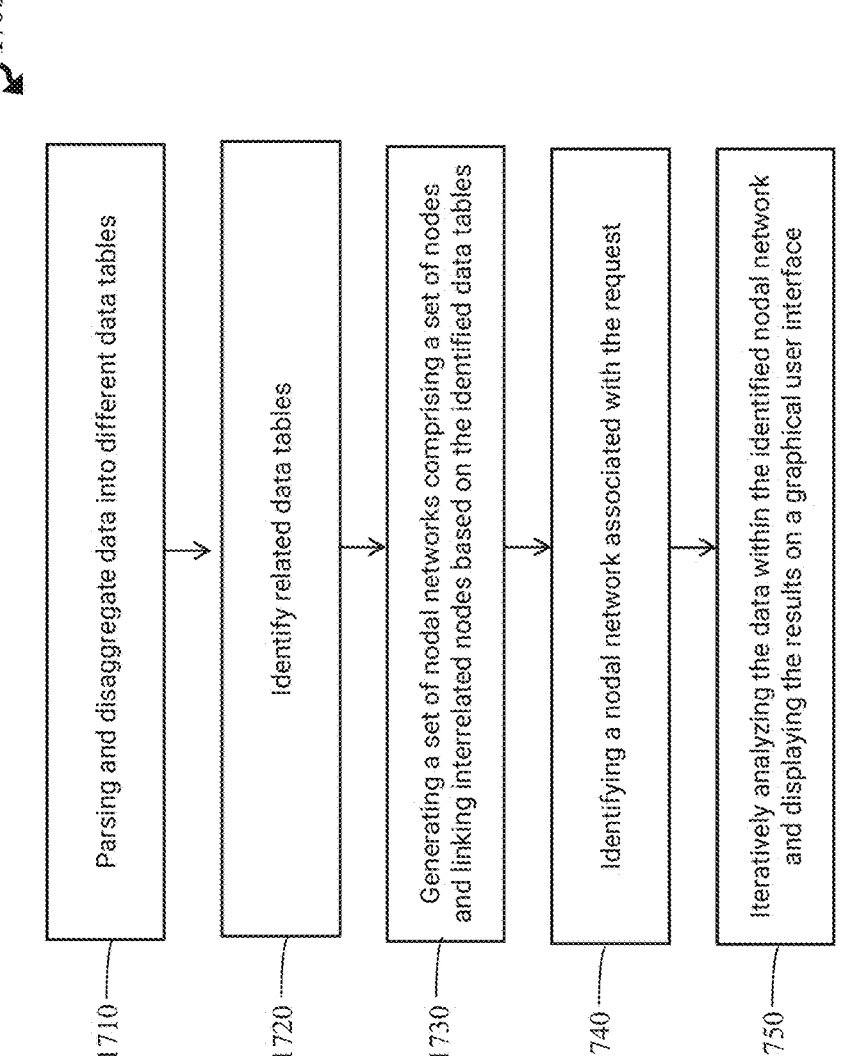

Parsing and disaggregate data into different data tables

Identify related data tables

Generating a set of nodal networks comprising a set of nodes and linking interrelated nodes based on the identified data tables Identifying a nodal network associated with the request Iteratively analyzing the data within the identified nodal network and displaying the results on a graphical user interface

Domains

| | |
|---|---|
| $ Financials | Customer journey |
| Risk | Sales |
| Organization | Technology |
| Objectives | Data & analytics |
| Process | Facilities |
| Controls | ATM |
| Operations | Supplier |
| Customer | Cyber & privacy |
| Brand | Fraud |
| Product | AML |
| Channel | Audit |

| | |
|---|---|
| Regulatory | |
| Issue | |
| Initiative | |
| Innovation | |
| M&A | |
| Economy | |
| Industry | |
| Competitor | |
| Time | |
| Location | |
| Platform | |

Above domains are reflective of a financial institution. Domains will vary by industry.

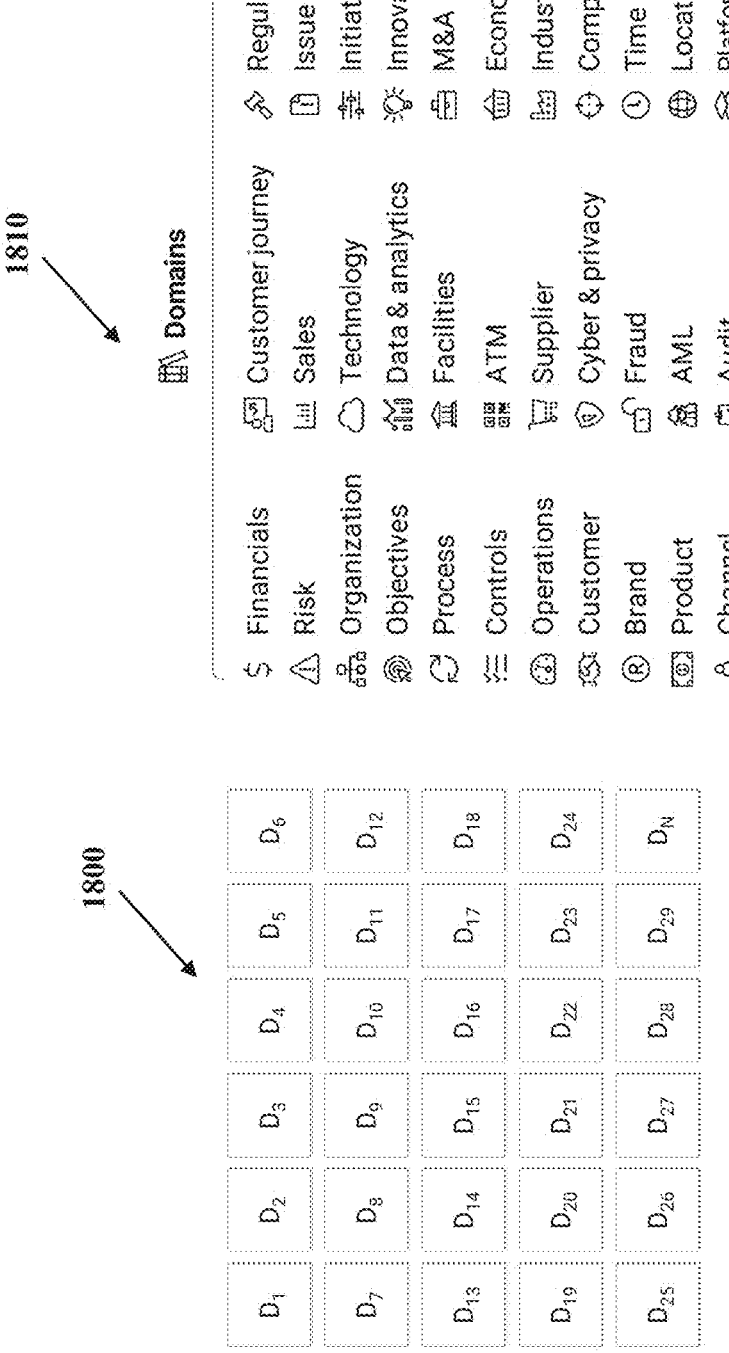

| | | | | | |
|---|---|---|---|---|---|
| $D_1$ | $D_2$ | $D_3$ | $D_4$ | $D_5$ | $D_6$ |
| $D_7$ | $D_8$ | $D_9$ | $D_{10}$ | $D_{11}$ | $D_{12}$ |
| $D_{13}$ | $D_{14}$ | $D_{15}$ | $D_{16}$ | $D_{17}$ | $D_{18}$ |
| $D_{19}$ | $D_{20}$ | $D_{21}$ | $D_{22}$ | $D_{23}$ | $D_{24}$ |
| $D_{25}$ | $D_{26}$ | $D_{27}$ | $D_{28}$ | $D_{29}$ | $D_N$ |

Example

ℂ CHORAL`
KNOWLEDGE GRID PART 1 – MEASURES (ME)

| Key | Domain | D_Id | Measure_Family | D_Icon | Measure_Name | Acronym | Units | Table_Name(s) |
|---|---|---|---|---|---|---|---|---|
| 1 | Financials | 1 | Agency ratings | | DBRS rating | | Rating | (FI_Other_Financial_Measure) |
| 2 | Financials | 1 | Agency ratings | | Fitch rating | | Rating | (FI_Other_Financial_Measure) |
| 3 | Financials | 1 | Agency ratings | | Moody's rating | | Rating | (FI_Other_Financial_Measure) |
| 4 | Financials | 1 | Agency ratings | | Standard & Poor's rating | | Rating | (FI_Other_Financial_Measure) |
| 5 | Financials | 1 | AUA & AUM | | AUA & AUM ($CAD) | AUA/AUM | $CAD | (FI_AUA_AUM) |
| 6 | Financials | 1 | Balance sheet | | # Deposit accounts | | # | (FI_Enterprise_Financial_Ledger) |
| 7 | Financials | 1 | Balance sheet | | # Lending accounts | | # | (FI_Enterprise_Financial_Ledger) |
| 8 | Financials | 1 | Balance sheet | | Acceptances ($CAD) | | $CAD | (FI_Enterprise_Financial_Ledger) |
| 9 | Financials | 1 | Balance sheet | | Accumulated other comprehensive income ($CAD) | | $CAD | (FI_Enterprise_Financial_Ledger) |
| 10 | Financials | 1 | Balance sheet | | Allowance for credit losses ($CAD) | | $CAD | (FI_Enterprise_Financial_Ledger) |
| 11 | Financials | 1 | Balance sheet | | Average assets ($CAD) | | $CAD | (FI_Enterprise_Financial_Ledger) |
| 12 | Financials | 1 | Balance sheet | | Average assets ($USD) | | $USD | (FI_Enterprise_Financial_Ledger) |
| 13 | Financials | 1 | Balance sheet | | Average common shareholders equity ($CAD) | | $CAD | (FI_Enterprise_Financial_Ledger) |
| 14 | Financials | 1 | Balance sheet | | Average deposit account balance ($CAD) | | $CAD | (FI_Enterprise_Financial_Ledger) |
| 15 | Financials | 1 | Balance sheet | | Average deposit account balance ($USD) | | $USD | (FI_Enterprise_Financial_Ledger) |
| 16 | Financials | 1 | Balance sheet | | Average deposits ($CAD) | | $CAD | (FI_Enterprise_Financial_Ledger) |
| 17 | Financials | 1 | Balance sheet | | Average deposits ($USD) | | $USD | (FI_Enterprise_Financial_Ledger) |
| 18 | Financials | 1 | Balance sheet | | Average earning assets ($CAD) | | $CAD | (FI_Enterprise_Financial_Ledger) |
| 19 | Financials | 1 | Balance sheet | | Average earning assets ($USD) | | $USD | (FI_Enterprise_Financial_Ledger) |
| 20 | Financials | 1 | Balance sheet | | Average gross loans & acceptances ($CAD) | GLA | $CAD | (FI_Enterprise_Financial_Ledger) |
| 21 | Financials | 1 | Balance sheet | | Average gross loans & acceptances ($USD) | GLA | $USD | (FI_Enterprise_Financial_Ledger) |
| 22 | Financials | 1 | Balance sheet | | Average lending account balance ($CAD) | | $CAD | (FI_Enterprise_Financial_Ledger) |

FIG. 20A

Specify a measure catalog for each domain

Agency ratings
DBRS rating
Fitch rating
Moody's rating
Standard & Poor's rating
AUA & AUM
AUA & AUM ($CAD)
Balance sheet
Deposit accounts
Lending accounts
Acceptances ($CAD)
Accumulated other comprehensive income ($CAD)
Allowance for credit losses ($CAD)
Average assets ($CAD)
Average assets ($USD)
Average common shareholders' equity ($CAD)
Average deposit account balance ($CAD)
Average deposit account balance ($USD)
Average deposits ($CAD)
Average deposits ($USD)
Average earning assets ($CAD)
Average earning assets ($USD)
Average gross loans & acceptances ($CAD)
Average gross loans & acceptances ($USD)
Average lending account balance ($CAD)
Average lending account balance ($USD)
Average net loans & acceptances ($CAD)
Average net loans & acceptances ($USD)
Business & government loans ($CAD)
Cash & cash equivalents ($CAD)
Cash & securities to total assets ratio
Common shares ($CAD)
Consumer instalment and other personal loans ($CAD)
Contributed surplus ($CAD)

Interest & non-interest trading revenue
Other trading revenue ($CAD)
Total trading revenue ($CAD)
Total trading revenue, excluding teb offset ($CAD)
Trading revenue teb offset ($CAD)
Trading revenue, commodities ($CAD)
Trading revenue, equities ($CAD)
Trading revenue, foreign exchange ($CAD)
Trading revenue, interest rates ($CAD)
Trading revenue, net interest income ($CAD)
Trading revenue, non-interest revenue ($CAD)
Net income
Net income ($CAD)
Net income ($USD)
Net income attributable to Bank shareholders ($CAD)
Non-controlling interest in subsidiaries ($CAD)
Non-interest expense
Amortization of intangible assets ($CAD)
Business & capital taxes ($CAD)
Communications ($CAD)
Computer & equipment ($CAD)
Employee benefits ($CAD)
Employee compensation ($CAD)
Non-interest expense ($CAD)
Non-interest expense ($USD)
Other expenses ($CAD)
Performance based compensation ($CAD)
Premises & equipment ($CAD)
Premises, furniture & fixtures ($CAD)
Professional fees ($CAD)
Property taxes ($CAD)
Rental of real-estate ($CAD)
Salaries ($CAD)
Travel & business development ($CAD)

```
/*
* TABLE: Account
*/

CREATE TABLE Account{
[Account ID]        char(10)  NOT NULL,
[Account Number]    char(10)  NULL,
[Account Type ID]   char(10)  NOT NULL,
[Product ID]        char(10)  NOT NULL,
[User Account ID]   char(10)  NOT NULL
CONSTRAINT PK282 PRIMARY KEY NONCLUSTERED ([Account ID])
}
go IF OBJECT_ID('Account') IS NOT NULL
   PRINT '<<< CREATED TABLE Account >>>'
ELSE
   PRINT '<<< FAILED CREATING TABLE Account >>>'
go /*
* TABLE: [Account Type]
*/

CREATE TABLE [Account Type]{
[Account Type ID]   char(10)  NOT NULL,
L1                  char(10)  NULL,
L2                  char(10)  NULL,
L3                  char(10)  NULL,
L4                  char(10)  NULL,
Ln                  char(10)  NULL,
Overview            char(10)  NULL,
CONSTRAINT PK297 PRIMARY KEY NONCLUSTERED ([Account Type ID])
}
go
```

```
: [Acquisition Target Digital Channel]
*/

CREATE TABLE [Acquisition Target Digital Channel]{
[Acquisition Target Digital Channel ID]  char(10)  NOT NULL,
[Acquisition Target ID]                  char(10)  NOT NULL,
Name                                     char(10)  NULL,
Overview                                 char(10)  NULL,
CONSTRAINT PK381 PRIMARY KEY NONCLUSTERED ([Acquisition Target Digital Channel ID])
}
go IF OBJECT_ID('Acquisition Target Digital Channel') IS NOT NULL
   PRINT '<<< CREATED TABLE Acquisition Target Digital Channel >>>'
ELSE
   PRINT '<<< FAILED CREATING TABLE Acquisition Target Digital Channel >>>'
go /*
* TABLE: Address
*/

CREATE TABLE Address{
[Address ID]              char(10)  NOT NULL,
[Location ID]             char(10)  NOT NULL,
[Facility ID]             char(10)  NOT NULL,
[ATM ID]                  char(10)  NOT NULL,
[Competitor Branch ID]    char(10)  NOT NULL,
[Competitor ATM ID]       char(10)  NOT NULL,
[Building Number]         char(10)  NULL,
[Street Name]             char(10)  NULL,
Neighborhood              char(10)  NULL,
City                      char(10)  NULL,
[Postal Code / Zip Code]  char(10)  NULL,
[Additional Numbers]      char(10)  NULL,
Longitude                 char(10)  NULL,
Latitude                  char(10)  NULL,
CONSTRAINT PK241 PRIMARY KEY NONCLUSTERED ([Address ID])
}
go
```

FIG. 25

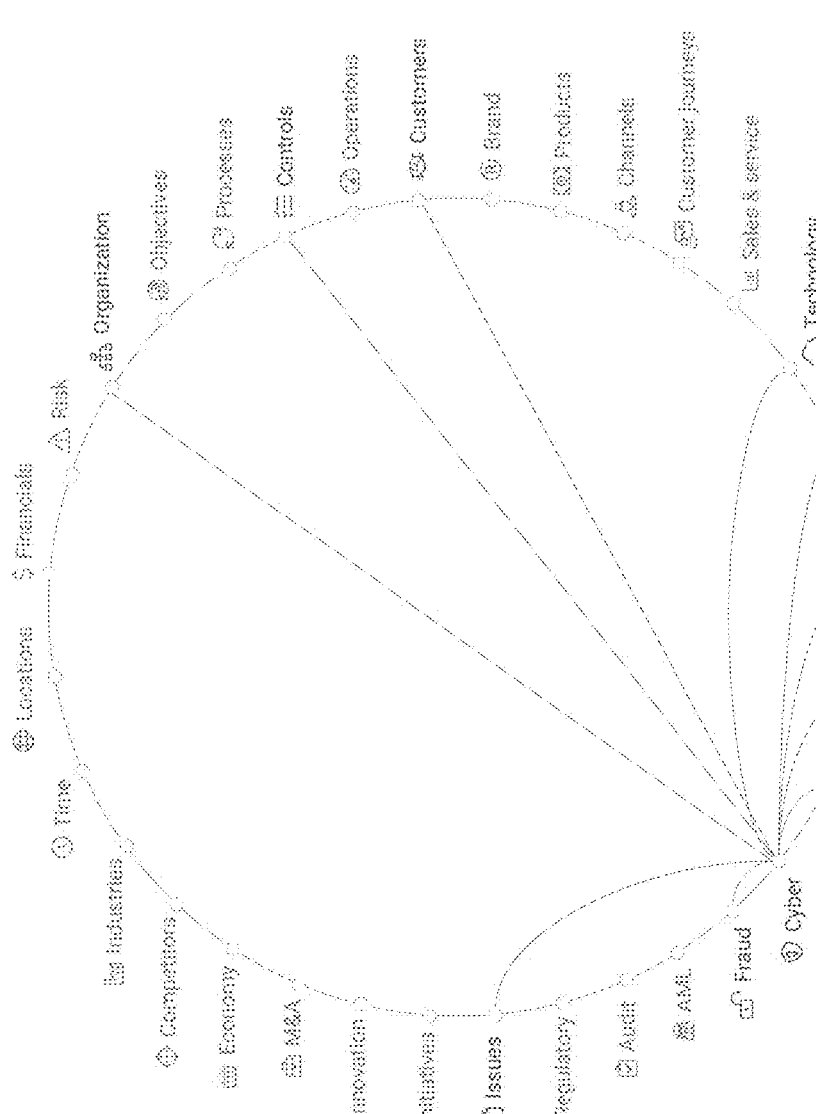

Cyber & privacy use case

How many IT / data assets do we have? Which ones are high value?

Which suppliers are critical? What are the results of their cyber risk assessment?

How many IT user accounts do we have? Which ones are high value? Any unusual activity?

What is the fraud event / loss trend? Any cyber mitigating actions required?

Which facilities are high value? Are the right controls in place to protect from unauthorized access?

How many cyber controls do we have? How to they map to NIST? How effective are they? Who is reviewing their effectiveness?

How many audit / regulatory issues are related to cyber? How critical are they? What is their remediation status?

FIG. 29

Configuration method

| Step | Description |
|------|-------------|
| UC-1 | Disaggregate the in-scope knowledge into a set of domains |
| UC-2 | Specify use cases along with the required relationships across domains |
| KG-1 | Specify a measure catalog for each domain |
| KG-2 | Specify dimension tables for each domain |
| KG-3 | Specify fact catalogs for each domain |
| KG-4 | Specify an unstructured data catalog for each domain |
| KG-5 | Specify fact journals for each domain |
| KG-6 | Build an entity relationship model |
| KG-7 | Translate the entity relationship model into a physical data model |
| DA-1 | One-time data load to enable teams to configure the system |
| DA-2 | Build the data pipeline |
| UC-3 | Configure the Choral user interface: navigation, visualization, collaboration |
| UC-4 | Build analytic features using the knowledge grid & platform features |
| UC-5 | Iterate & refine the system by repeating steps in the Choral method |

Prototype then scale

FIG. 30B

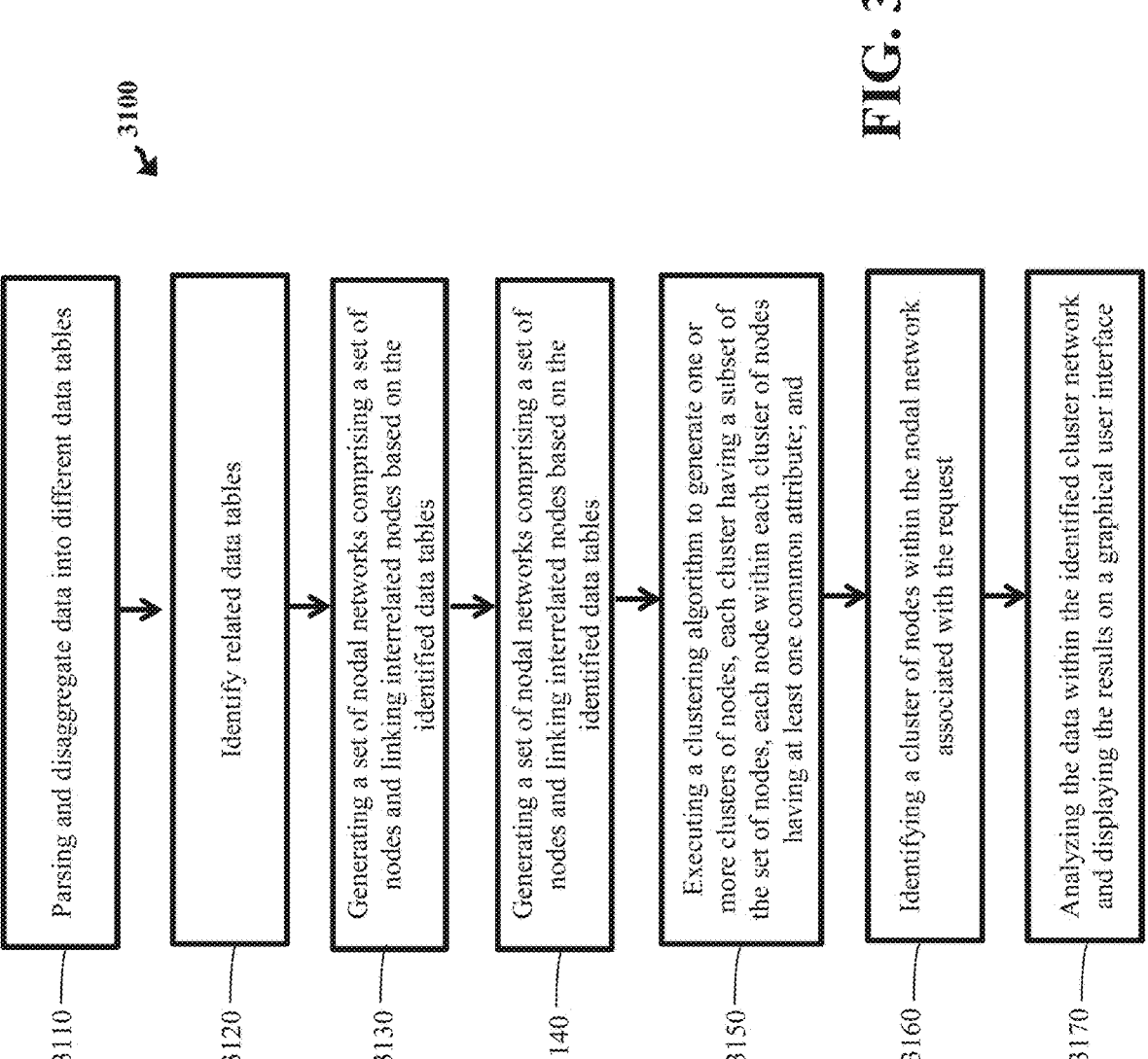

3100

3110 — Parsing and disaggregate data into different data tables

3120 — Identify related data tables

3130 — Generating a set of nodal networks comprising a set of nodes and linking interrelated nodes based on the identified data tables 3140 — Generating a set of nodal networks comprising a set of nodes and linking interrelated nodes based on the identified data tables 3150 — Executing a clustering algorithm to generate one or more clusters of nodes, each cluster having a subset of the set of nodes, each node within each cluster of nodes having at least one common attribute; and 3160 — Identifying a cluster of nodes within the nodal network associated with the request 3170 — Analyzing the data within the identified cluster network and displaying the results on a graphical user interface

3300

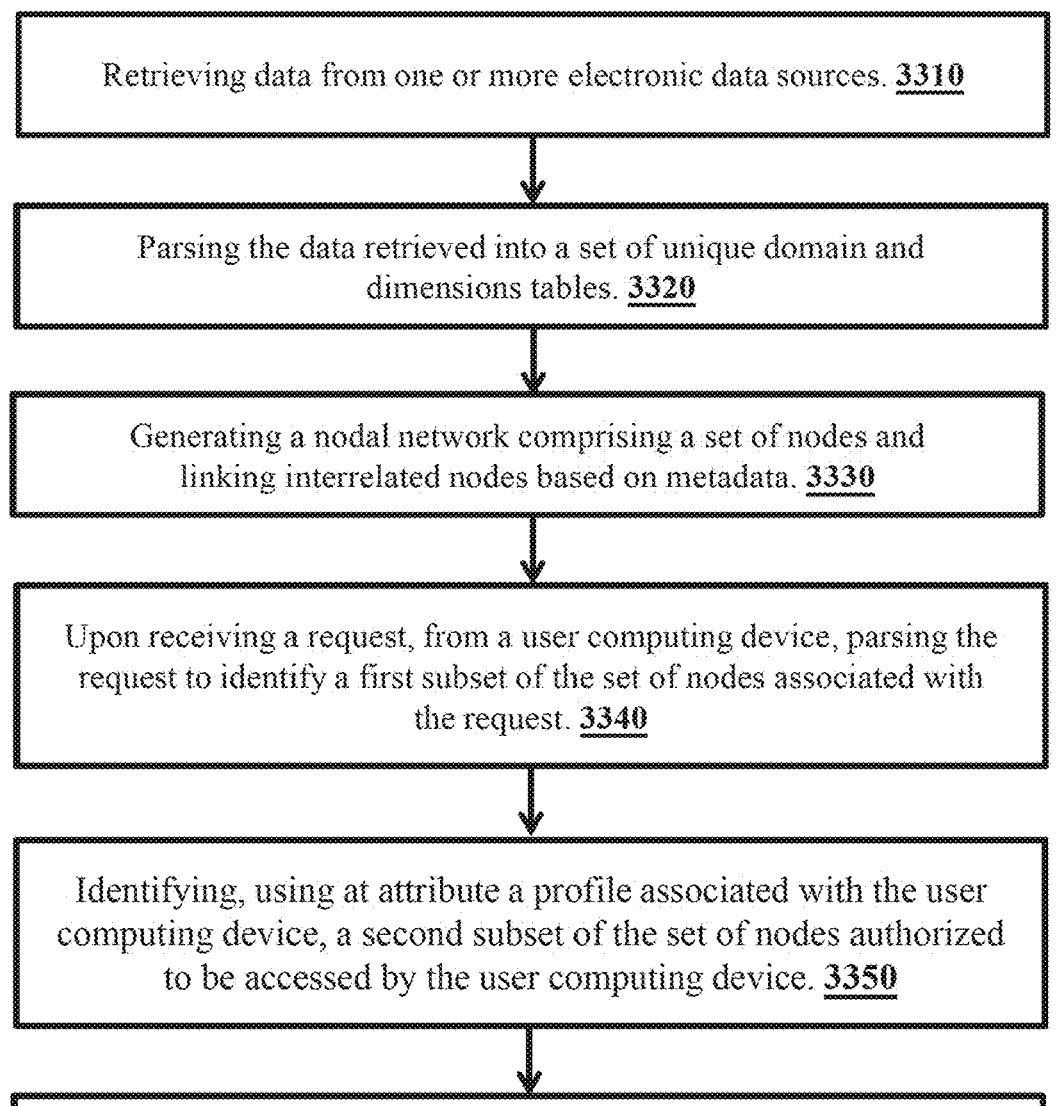

Retrieving data from one or more electronic data sources. 3310

Parsing the data retrieved into a set of unique domain and dimensions tables. 3320

Generating a nodal network comprising a set of nodes and linking interrelated nodes based on metadata. 3330

Upon receiving a request, from a user computing device, parsing the request to identify a first subset of the set of nodes associated with the request. 3340

Identifying, using at attribute a profile associated with the user computing device, a second subset of the set of nodes authorized to be accessed by the user computing device. 3350

Displaying, on a graphical user interface displayed on the user computer device, data associated with the second subset of the set of nodes. 3360

FIG. 33

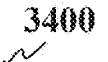
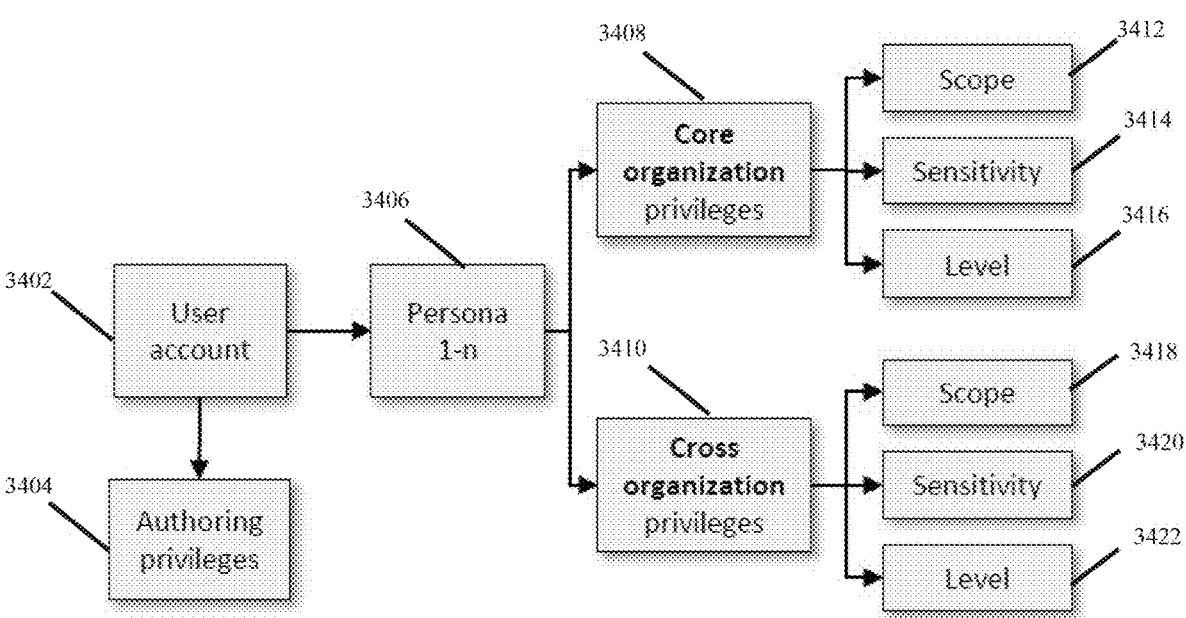
FIG. 34

| | Domain 1 | Domain 2 | Domain 3 | Domain N |
|---|---|---|---|---|
| Organization 1 3502 | | | | |
| Organization 1.1 3504 | | 2 | | |
| Organization 1.1.1 3506 | | | 3 | |
| Organization 1.1.2 3508 | | | | |
| Organization 1.1.3 3510 | ███ | ███ | ███ | ███ |
| Organization 1.1.A 3512 | | | | |
| Organization 1.2 3514 | | | | |
| Organization 1.3 3516 | | | | |
| Organization 1.B 3518 | | | | |
| Organization 2 3520 | | | | |
| Organization 3 3522 | ███ | ███ | ███ | ███ |
| Organization M 3524 | | | | |

3700

3800

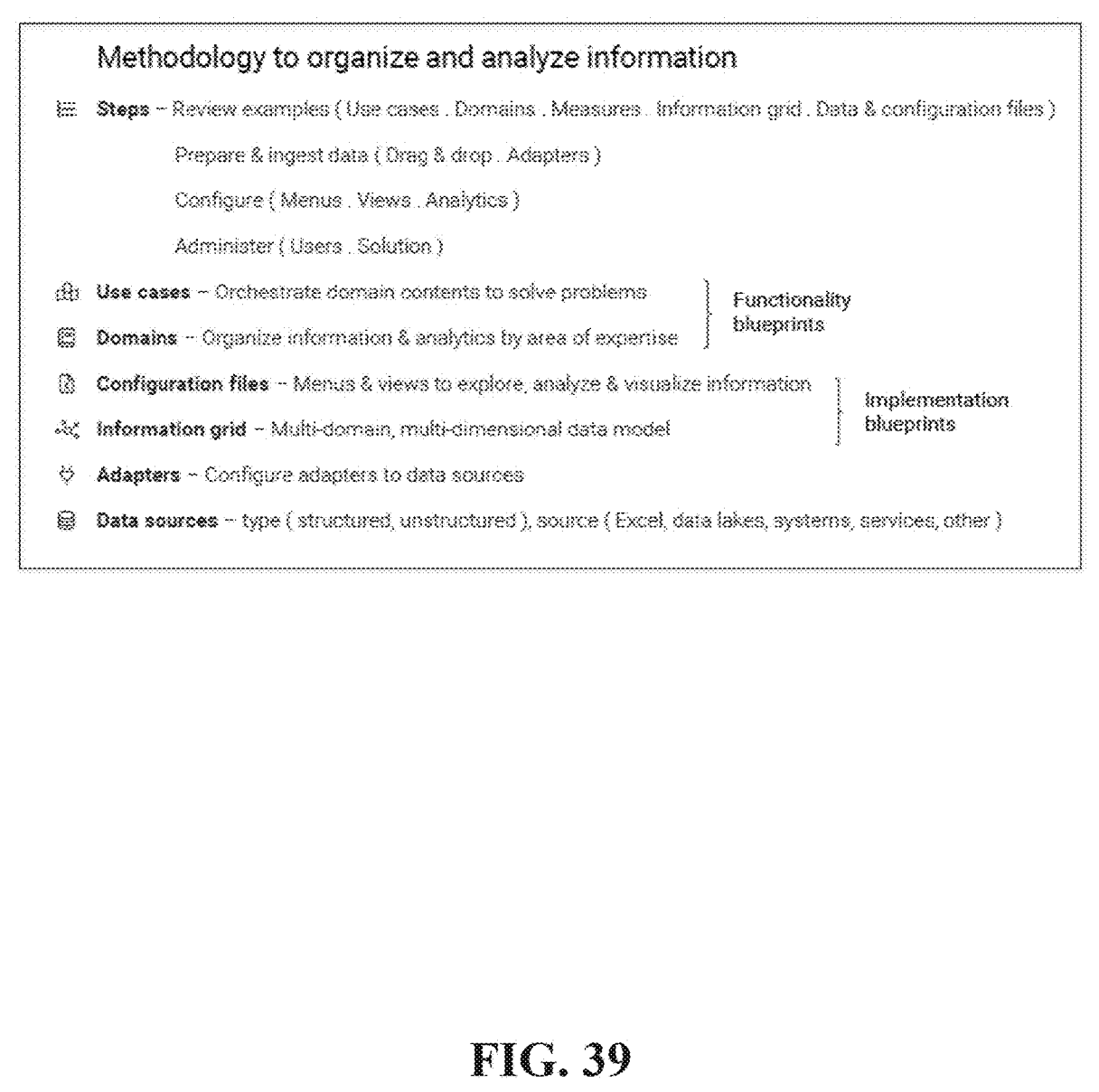

Methodology to organize and analyze information

Steps – Review examples ( Use cases . Domains . Measures . Information grid . Data & configuration files )

Prepare & ingest data ( Drag & drop . Adapters )

Configure ( Menus . Views . Analytics )

Administer ( Users . Solution )

Use cases – Orchestrate domain contents to solve problems

Domains – Organize information & analytics by area of expertise

} Functionality blueprints

Configuration files – Menus & views to explore, analyze & visualize information

Information grid – Multi-domain, multi-dimensional data model

} Implementation blueprints

Adapters – Configure adapters to data sources

Data sources – type ( structured, unstructured ), source ( Excel, data lakes, systems, services, other )

FIG. 39

Implementation blueprints
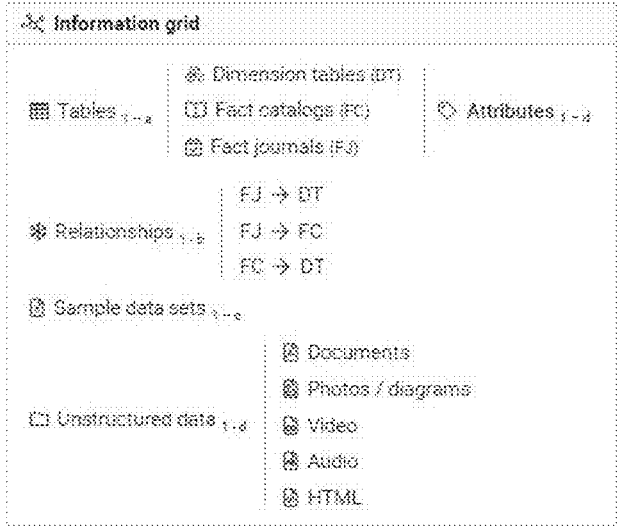
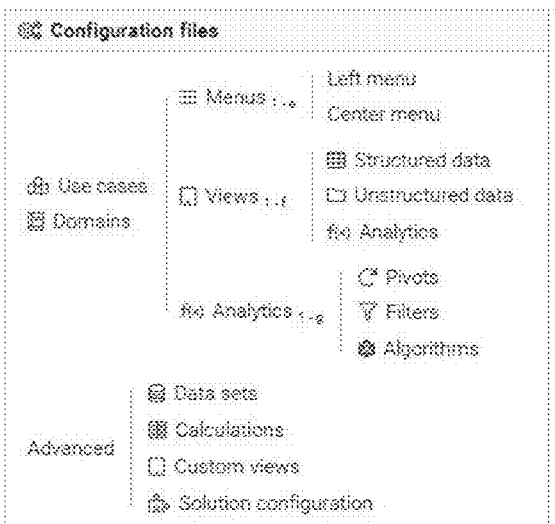
FIG. 40

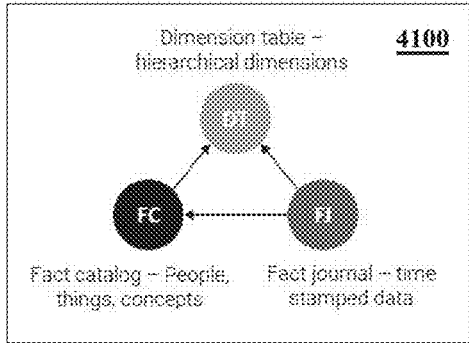
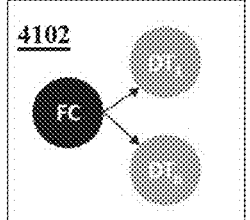
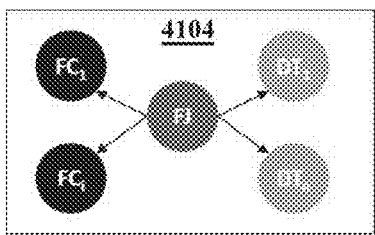
FIG. 41

Initiatives Domain

| FC_INITIATIVE |
| --- |
| INITIATIVE_ID |
| INITIATIVE_NAME |
| MAP_INITIATIVE_TYPE_ID |
| MAP_ORG_ID |
| INHERENT_RISK |
| DESCRIPTION |
| MAP_DESCRIPTION_TEXT_STRING |
| MAP_DESCRIPTION_URL |

| FC_INITIATIVE |
| --- |
| INITIATIVE_ID |
| FYEAR |
| FQTR |
| ST |
| STATUS |
| INVESTMENT |
| BENEFIT |
| MAP_INITIATIVE_BENEFIT_TYPE_ID |

| |
| --- |
| MAP_INITIATIVE_TYPE_ID |
| MAP_INITIATIVE_TYPE_L1_NAME |
| MAP_INITIATIVE_TYPE_L2_NAME |
| MAP_INITIATIVE_TYPE_L3_NAME |
| MAP_INITIATIVE_TYPE_L4_NAME |
| MAP_DESCRIPTION_TEXT_STRING |
| MAP_DESCRIPTION_URL |

| |
| --- |
| MAP_INITIATIVE_BENEFIT_TYPE_ID |
| MAP_INITIATIVE_BENEFIT_TYPE_L1_NAME |
| MAP_INITIATIVE_BENEFIT_TYPE_L2_NAME |
| MAP_INITIATIVE_BENEFIT_TYPE_L3_NAME |
| MAP_INITIATIVE_BENEFIT_TYPE_L4_NAME |
| MAP_DESCRIPTION_TEXT_STRING |
| MAP_DESCRIPTION_URL |

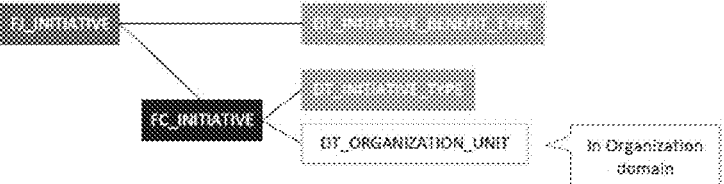

FC_INITIATIVE    BY_ORGANIZATION_UNIT    In Organization domain

FIG. 45

CUSTOMIZED DATA ANALYSIS AND VISUALIZATION USING STRUCTURED DATA TABLES AND NODAL NETWORKS

CROSS-REFERENCE TO RELATED APPLICATIONS

This application claims priority to U.S. Provisional Patent Application No. 63/232,585, filed Aug. 12, 2021, which is incorporated herein by reference in its entirety for all purposes.

This application is a continuation-in-part of U.S. patent application Ser. No. 16/838,905, filed Apr. 2, 2020, now U.S. Pat. No. 11,657,028, which is a continuation-in-part of U.S. patent application Ser. No. 16/383,122, now abandoned, which is a continuation of U.S. patent application Ser. No. 15/925,995, now U.S. Pat. No. 10,311,360, which claims priority to U.S. Provisional Patent Application No. 62/474,168, filed Mar. 21, 2017; U.S. patent application Ser. No. 16/838,905, filed Apr. 2, 2020, now U.S. Pat. No. 11,657,028, also claims priority to U.S. Provisional Patent Application No. 62/829,943, filed Apr. 5, 2019, each of which is incorporated herein by reference in its entirety for all purposes.

TECHNICAL FIELD

This application relates generally to data retrieval, storage, and display techniques using data tables and nodal networks. More specifically, this application is directed towards structuring data.

BACKGROUND

As the processing power of computers allow for greater computer functionality and the Internet technology era allows for interconnectivity between computing systems, many organizations collect large volumes of data. The wide range of data collected may include in-person customer transaction data, online transaction data, internal communication data, and the like. Many organizations analyze the data in order to have a better understanding of their organization, such as customer relations, organizational efficiency, and the like. For instance, an organization may analyze existing customer transactions in order to provide better services to customers and/or to perform more efficiently.

"Big data" includes data sets that are too large for traditional data-processing application software. The data sets may be structured, semi-structured, and unstructured data. There is value to the information in these data sets, but because of the volume and variety of data, conventional solutions are not able to navigate the data sets efficiently, thereby delaying decision-making and precluding solutions that rely on comprehending the information.

Conventional and existing methods analyze large volumes of data by executing various queries using different thresholds to identify insights. For instance, an administrator can access an online tool and identify unsatisfied customers or inefficient procedures performed at an organization. However, since the implementation of these online tools, several technical shortcomings have been identified and have created a new set of challenges. For instance, existing and conventional methods require high processing power and computing resources due to the high volume of data existing on different networks and computing infrastructures. Managing such information on different platforms is difficult due to number, size, content, or relationships of the structured and/or unstructured data associated with the customers.

Moreover, conventional visualization tools do not provide an efficient method of navigating large volumes of data. Conventional and existing visualization techniques only focus on filtering data. For instance, users must define various thresholds and filters in order to create a more granular view. These methods are inefficient for two reasons. First, these methods shift the burden of data navigation to users. Second, these methods do not provide a systematic and consistent approach to visualizing large volumes of data.

SUMMARY

For the aforementioned reasons, there is a need to develop an intelligent method to uniquely structure data and generate computer models based on the structured data in order to analyze data more efficiently. There is also a need to visualize data using a systematic and consistent approach. For instance, there is a need to visualize data in a manner that is consistent with nodal networks or other structured data modeled after large volumes of data.

In an embodiment, a method comprises parsing, by a processor, data into a set of domain data tables, each domain data table corresponding to a domain having a first criterion; parsing, by the processor, each domain data table into a set of dimension data tables, each dimension data table corresponding to a dimension having a second criterion; generating, by the processor, a nodal network comprising a set of nodes where each node represents at least a portion of the data, each node having metadata comprising an identifier corresponding to a particular domain data table and a particular dimension table corresponding to data associated with each node; linking, by the processor, one or more nodes based their respective metadata; and upon receiving a request from a user computing device, parsing, by the processor, the request to identify a first subset of the set of nodes associated with the request; identifying, by the processor using an attribute of a profile associated with the user computing device, a second subset of the set of nodes authorized to be accessed by the user computing device; and displaying, by the processor on a graphical user interface displayed on the user computer device, data associated with the second subset of the set of nodes.

The attribute may be associated with a user operating the user computing device corresponding to at least one of an identifier of the user or an identifier of the user's account.

The attribute may correspond to an identifier of the user computing device.

The profile may include a predetermined template identifying a type of data authorized to be accessed.

The processor may further execute an analytical protocol before displaying data associated with the second subset of the set of nodes.

The analytical protocol may correspond to the request.

The profile may indicate which domain data tables are accessible by the user computing device.

The profile may indicate a scope for data accessible by the user computing device.

The profile may indicate a data sensitivity level for data accessible by the user computing device.

In another embodiment, a system comprises a non-transitory storage medium having a set of instructions where when executed, the set of instructions cause a processor to parse data into a set of domain data tables, each domain data table corresponding to a domain having a first criterion; parse each domain data table into a set of dimension data tables, each dimension data table corresponding to a dimension having a second criterion; generate a nodal network comprising a set of nodes where each node represents at least a portion of the data, each node having metadata comprising an identifier corresponding to a particular domain data table and a particular dimension table corresponding to data associated with each node; link one or more nodes based their respective metadata; and upon receiving a request from a user computing device, parse the request to identify a first subset of the set of nodes associated with the request; identify, using an attribute of a profile associated with the user computing device, a second subset of the set of nodes authorized to be accessed by the user computing device; and display, on a graphical user interface displayed on the user computer device, data associated with the second subset of the set of nodes.

The attribute may be associated with a user operating the user computing device corresponding to at least one of an identifier of the user or an identifier of the user's account.

The attribute may correspond to an identifier of the user computing device.

The profile may include a predetermined template identifying a type of data authorized to be accessed.

The processor may further execute an analytical protocol before displaying data associated with the second subset of the set of nodes.

The analytical protocol may correspond to the request.

The profile may indicate which domain data tables are accessible by the user computing device.

The profile may indicate a scope for data accessible by the user computing device.

The profile may indicate a data sensitivity level for data accessible by the user computing device.

In another embodiment, a system comprises a user computer device in communication with a server, the server having a processor configured to: parse data into a set of domain data tables, each domain data table corresponding to a domain having a first criterion; parse each domain data table into a set of dimension data tables, each dimension data table corresponding to a dimension having a second criterion; generate a nodal network comprising a set of nodes where each node represents at least a portion of the data, each node having metadata comprising an identifier corresponding to a particular domain data table and a particular dimension table corresponding to data associated with each node; link one or more nodes based their respective metadata; and upon receiving a request from a user computing device, parse the request to identify a first subset of the set of nodes associated with the request; identify, using an attribute of a profile associated with the user computing device, a second subset of the set of nodes authorized to be accessed by the user computing device; and display, on a graphical user interface displayed on the user computer device, data associated with the second subset of the set of nodes.

The attribute may be associated with a user operating the user computing device corresponding to at least one of an identifier of the user or an identifier of the user's account.

BRIEF DESCRIPTION OF THE DRAWINGS

Non-limiting embodiments of the present disclosure are described by way of example with reference to the accompanying figures, which are schematic and are not intended to be drawn to scale. Unless indicated as representing the background art, the figures represent aspects of the disclosure.

FIG. 2 is a flow diagram of a process executed by an intelligent data analysis system, according to an embodiment.

FIG. 3A-B illustrate different embodiments of data tables and nodal networks modeled based on data, according to an embodiment.

FIGS. 5-7 illustrate examples of different graphical user interfaces displayed by the intelligent data analysis system, according to an embodiment.

Figure 8D:
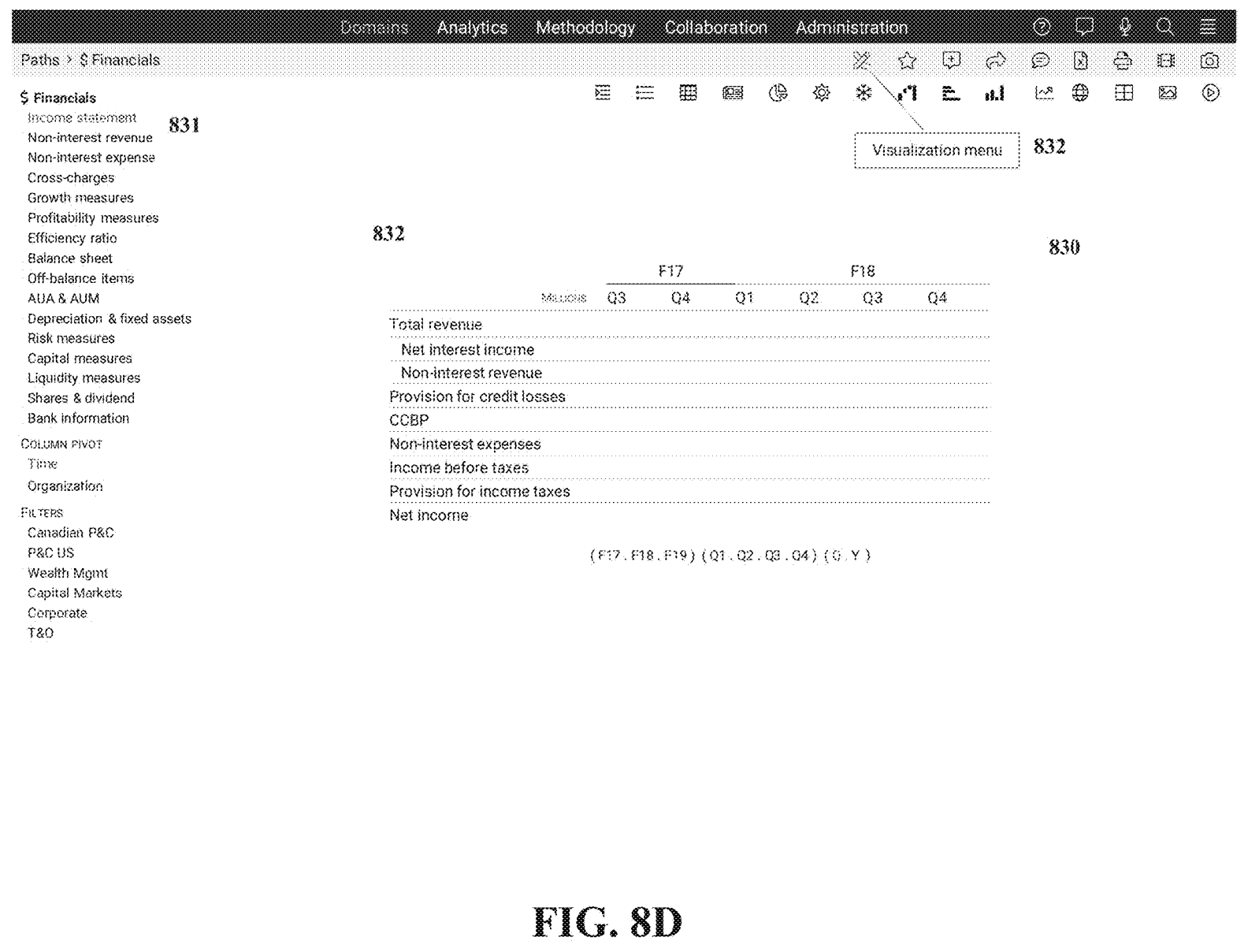

FIGS. 8A-F illustrate an example of traversing (analyzing and viewing) the data associated with the nodal data structure, according to an embodiment.

FIG. 9A is a flow diagram of a process executed by an intelligent data analysis system, according to an embodiment.

FIG. 9B illustrates an example of a graphical user interface displayed by the intelligent data analysis system, according to an embodiment.

FIG. 17 illustrates a flow diagram of a process executed by an intelligent data analysis system, according to an embodiment.

FIG. 18 illustrates a graphical representation of different data tables within a nodal network, according to an embodiment.

FIGS. 20A-B illustrates a graphical representation of different data tables within a nodal network, according to an embodiment.

FIG. 24 illustrates a graphical representation of different data tables within a nodal network, according to an embodiment.

FIG. 25 illustrates a data table representing interrelationships between other data tables, according to an embodiment.

FIG. 29 illustrates examples of identifying the relationships between request and different domains, according to an embodiment.

FIG. 30A-D illustrates a visual representation of iterative execution of an analytical protocol, according to an embodiment.

FIG. 31 illustrates a flow diagram of a process executed by an intelligent data analysis system, according to an embodiment.

FIG. 32 illustrates a visual representation of a non-limiting example of data prioritization, according to an embodiment.

FIG. 33 illustrates a flow diagram of a process executed by an intelligent data analysis system, according to an embodiment.

FIG. 34 illustrates a visual representation of a user account, according to an embodiment.

FIG. 39 illustrates a flow diagram of a process executed by an intelligent data analysis system, according to an embodiment.

FIGS. 40-41 illustrate different processes executed by an intelligent data analysis system, according to different embodiments.

FIGS. 42-45 visual representations of different data tables, according to different embodiment.

DETAILED DESCRIPTION

Figure 1:
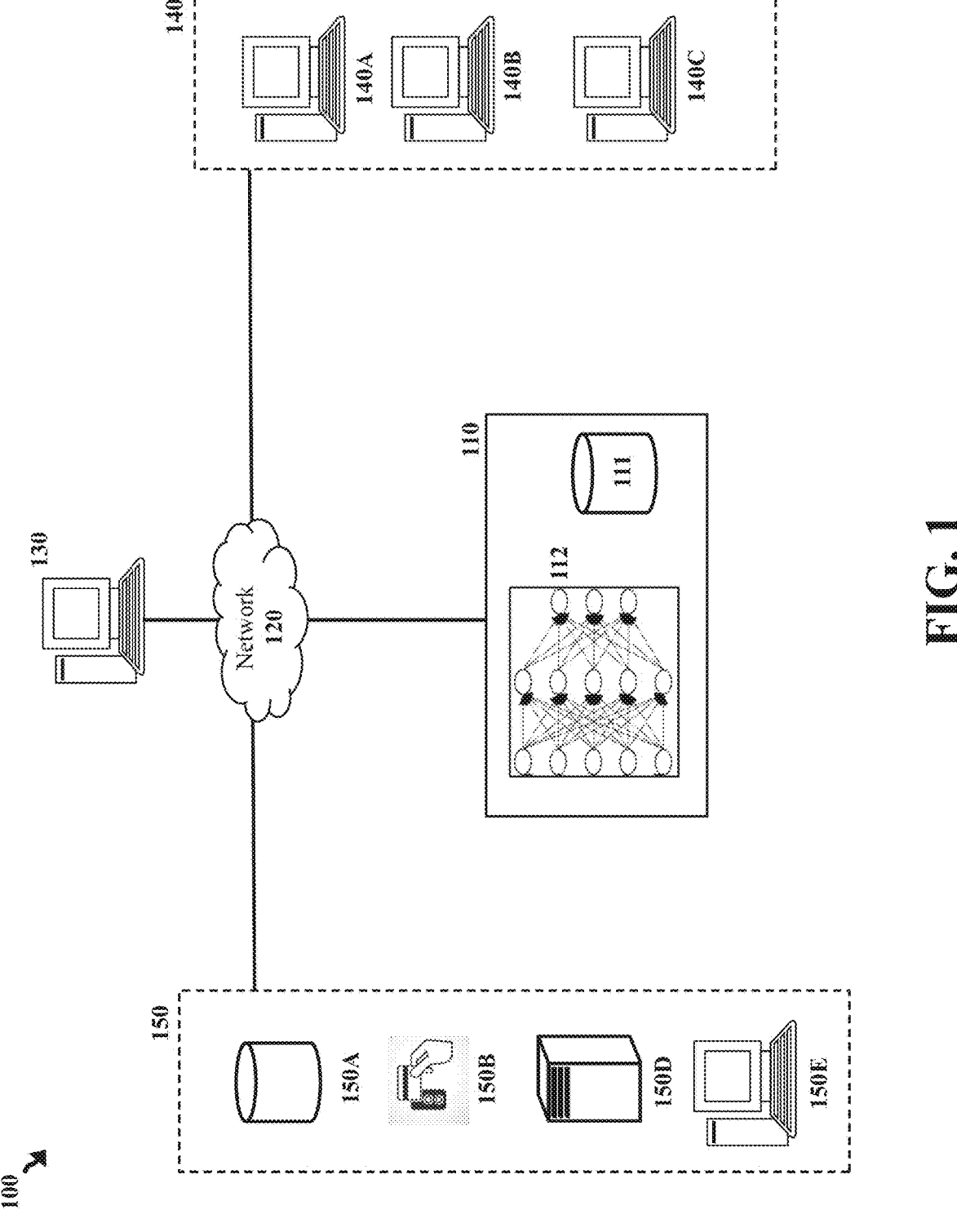
FIG. 1 illustrates components of an intelligent data analysis system, according to an embodiment.

References will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

FIG. 1 is a block diagram illustrating an intelligent data analysis system 100 that includes an analytics server 110 (having a database 111 and a nodal network 112), administrative computer 130, user computing devices 140, and electronic data sources 150. The above-mentioned components may be connected to each other through a network 120. Non-limiting examples of the network 120 may include private or public LAN, WLAN, MAN, WAN, and the Internet.

The network 120 may include both wired and wireless communications according to one or more standards and/or via one or more transport mediums. The communication over the network 120 may be performed in accordance with various communication protocols such as Transmission Control Protocol and Internet Protocol (TCP/IP), User Datagram Protocol (UDP), and IEEE communication protocols. In one example, the network 120 may include wireless communications according to Bluetooth specification sets, or another standard or proprietary wireless communication protocol. In another example, the network 120 may also include communications over a cellular network, including, e.g., a GSM (Global System for Mobile Communications), CDMA (Code Division Multiple Access), and EDGE (Enhanced Data for Global Evolution) network.

The analytics server 110 may be any computing device comprising a processor and non-transitory machine-readable storage capable of executing the various tasks and processes described herein. Non-limiting examples of such computing devices may include workstation computers, laptop computers, server computers, laptop computers, and the like. While the system 100 includes a single analytics server 110, in some configurations, the analytics server 110 may include any number of computing devices operating in a distributed computing environment to achieve the functionalities described herein. Furthermore, even though the database 111 is shown as an in memory database, in some configurations, the database 111 may be a remote database, cloud computing data storage, and/or data storage operationally controlled by a third party.

In an embodiment, the analytics server 110 may be configured to continuously and/or periodically retrieve data from different electronic sources 150, structure the retrieved data by generating various domain and dimension tables, and generate/revise the nodal network 112 accordingly. The analytics server 110 may also store all relevant data into the database 111. The analytics server 110 is also program to parse and unify data collected from the electronic data sources 150. For instance, data collected from the electronic data sources 150 may be in different formats. As a result, the analytics server may unify and/or normalize the data before generating and/or revising the nodal network 112.

As will be described below, the nodal network 112 is a computer model that uniquely structures the retrieve data. The data uniquely structured may be consumed by different electronic sources, user interfaces, user-computing devices, and the like. Therefore, the data structured by the analytics server 110 is uniform and unified, thereby avoiding the need to configure data to different computing systems. For instance, different computing devices belonging to different computing infrastructures may consume data structured by the analytics server 110 without needing to modify or revise their system architecture or configurations.

As will be described below, upon retrieving data, the analytics server 110 may first generate multiple data structures/tables by disaggregating data based on identifying a domains and dimensions for the retrieve data. The analytics server 110 may then generate the nodal network 112 based on the data tables (e.g., domain data tables and dimension data tables).

Upon generating the nodal network 112, the analytics server 110 may display a graphical user interface (GUI) on the user computing devices 140 and/or administrative computer 130. An example of the GUI generated and hosted by the analytics server 110 may be a web-based application or a website, as depicted in FIGS. 5-15. The analytics server 110 may also host a website accessible to end-users (e.g., an employee operating computer 140A-C), where the content presented via the various webpages may be controlled based upon each particular user's role.

The analytics server 110 may execute software applications configured to display the GUI (e.g., host a website), which may generate and serve various webpages to each user computing devices 140 and/or the administrative computer 130. Different users operating the user computing devices 140 may use the website to generate, upload, access, and store data (e.g., files) stored on database 111 and the nodal network 112.

The analytics server 110 may be configured to require user authentication based upon a set of user authorization credentials (e.g., username, password, biometrics, cryptographic certificate, and the like). In such implementations, the analytics server 110 may access the database 111 configured to store user credentials, which the analytics server 110 may be configured to reference in order to determine whether a set of entered credentials (purportedly authenticating the user) match an appropriate set of credentials that identify and authenticate the user. In some implementations, the analytics server 110 may incorporate the GUI into a third-party application, such as an internal customer relation management application, third-party email application, and/or organization management application while preserving the "look and feel" of the third-party application.

The analytics server 110 may generate and host webpages (displaying the GUIs) based upon a particular user's role within the system 100 (e.g., administrator, employee, or the employer). In such implementations, the user's role may be defined by data fields and input fields in user records stored in the database 111. The analytics server 110 may authenticate each user and may identify the user's role by executing an access directory protocol (e.g., LDAP). The analytics server 110 may generate webpage content, access, or generate data stored onto the nodal network 112, according to the user's role defined by the user record in the database 111. For instance, a user may be defined as a lower level employee who may not be authorized to view all related content to a particular sensitive file. Therefore, the analytics server 110 may customize the GUI according to the user's authentication level. Furthermore, the analytics server 110 may customize the GUI according to a user's role (e.g., function type). For instance, the analytics server 110 may customize the GUI based on whether a user is a designer or an account manager.

User computing devices 140 may be any computing device comprising a processor and a non-transitory machine-readable storage medium capable of performing the various tasks and processes described herein. Non-limiting examples of a user-computing device 140 may be a workstation computer, laptop computer, tablet computer, and server computer. As depicted in FIG. 1, the user computing devices 140 may each be operated by a user within an organizational network. For instance, user-computing devices 140 may represent all computing devices operated by all employees of an organization. User computing devices 140 may be internally interconnected via an internal and/or private network (not shown). For instance, a company's intranet or any other private network may connect all the company's computing devices 140.

Electronic data sources 150 may represent any electronic data storage 150A (e.g., local database, computing devices within an organization, cloud computing systems, third-party data storage systems, and homegrown data repositories). These storages may store customer interaction, system configuration, and interactions and other information related to all computing systems utilized via an organization. For instance, electronic data storage 150A may store data associated with monetary transfers between different branches and/or all teller transactions at a bank.

The electronic data sources 150 may also include various devices configured to transmit data to the analytics server. For instance, the electronic data sources 150 may include ATM machines or other point-of-sale terminals 150B. The ATMS or point-of-sale terminals may include local databases and/or may directly transmit transaction data (e.g., customer information, transaction amount, transaction time)

to the analytics server 110. The transmission of transaction data may be done in real-time or in batches on periodic basis. In some configurations, the analytics server 110 may retrieve transaction data at any time from one or more ATMS or point-of-sale terminals.

The electronic data sources may also include a webserver 150D configured to store online interactions or other customer facing websites. In some configurations, a webserver may be configured to store all interactions between a website (whether internal or customer facing). For instance, the webserver 150D may store all information associated with the website or any other electronic application of an organization within a database. Non-limiting examples of data stored within the database may include data associated with cyber-attacks, website maintenance data, data associated with updating the website, and the like.

The electronic data sources 150 may also include a computer 150E which represents an employee computer. As described throughout this disclosure, the analytics server 110 may actively monitor interactions between an organization and its customers/users. Furthermore, the analytics server 110 may also monitor internal interactions between employees. Computer 150E represents an employee computer.

When retrieving data from different electronic sources 150, the analytics server 110 may execute various scanning and crawling protocols to identify and map data stored onto each electronic data source 150.

As discussed above, upon collecting data from different electronic data sources 150, the analytics server 110 may generate different data tables and a computer model comprising a nodal network 112 (or nodal data structure) where each node represents an identified file or relevant data. The analytics server 110 may store the nodal network 112 in the database 111 or any other electronic data repository, such as a cloud bases storage, local/internal data storage, distributed storage, blockchain, and the like.

The nodal network 112 may be a complete map of all data identified as a result of scanning and crawling different electronic data sources 150. Each node may also contain metadata further comprising historical (e.g., context) data associated with the collected/retrieved data. For instance, if the analytics server 110 identifies a file stored on to an employee computer, the analytics server 110 may designate a node to the identified file wherein the node comprises metadata corresponding to the file, such as title, mime type, file permissions, comments, date/time of creation, and the like. The metadata may also include a unique identifier (e.g., user ID, IP address, MAC address and the like) of the user and/or the computing device who created/revised/and or accessed the file. The unique identifier may identify the user and/or the user's computer. The unique identifier may identify all computers and/or users within a certain department of an organization (e.g., accounting, IT, or bank tellers).

As will be described below, the metadata may also include an identification of one or more data structures/tables (e.g., domain tables and dimension tables). The analytics server 110 may parse and disaggregate the data and generate different data structures/tables. The nodes within the nodal network 112 may correspond to the hierarchical structure of the data. For instance, the analytics server 110 may model the nodal network 112 in accordance with how data is distributed within different data structures/tables (e.g., domain tables and dimension tables). Moreover, as will be described below, when the analytics server 110 identifies that data represented by two node are related, the analytics server 110 may link the related nodes.

In operation, the analytics server 110 may continuously or periodically retrieve data from the electronic data sources 150 and may continuously or periodically revise the data structures/tables and the nodal network 112. Therefore, the knowledge obtained via the nodal network 112 may never be complete and is continuously updated by the analytics server 110.

To efficiently access a node and to retrieve all related data, the analytics server 110 may index each node based on its associated metadata and/or links. The analytics server 110 may also make each node searchable based on its metadata and/or links. To identify a node and/or to traverse the nodal network 112, the analytics server may utilize one or more existing methodologies (e.g., Solr®). Indexing the nodes within the nodal network 112 allows the nodes to be searchable by their associated metadata and/or links. In this way, as opposed to all files stored in a central data repository, the analytics server 110 can identify nodes and retrieve related metadata in real-time or near real-time using less computing power and resources.

FIG. 2 is flow diagram of a process executed by the intelligent data analysis system, according to an embodiment. The method 200 includes steps 210-250. However, other embodiments may include additional or alternative execution steps, or may omit one or more steps altogether. The method 200 is described as being executed by a server, similar to the analytics server described in FIG. 1. However, in some embodiments, steps may be executed by any number of computing devices operating in the distributed computing system described in FIG. 1. For instance, part or all the steps described in FIG. 2 may be locally performed by one or more user computing devices or an administrative computing device. Furthermore, even though some aspects of the method 200 are described in the context of collecting data associated with banking computing systems, it is expressly understood that method 200 is applicable to collecting, structuring, and analyzing any data.

At step 210, the analytics server may retrieve data from one or more electronic data sources. The analytics server may continuously/periodically scan the electronic data sources and/or crawl electronic data repositories accessible to the electronic data sources to collect data. The analytics server may scan and/or crawl the electronic data sources to identify and collect all files stored onto the electronic data sources and/or data repositories accessible to the electronic data sources. For instance, the analytics server may transmit an instruction to one or more ATMS where the instruction is configured to cause a local database of the ATMS to transmit all transaction data to the analytics server. In another example, the analytics server may transmit an instruction to a database associated with a customer-facing website where the instruction is configured to cause the database to transmit all customer interactions with the website, such as all online transactions or purchases. In another example, the analytic server may crawl one or more employee computers to identify all files accessible/stored onto the employee computers and/or data repositories accessible to such computers (e.g., third party database or a cloud storage system accessible to the employee computers).

In some configurations, the analytics server may require all users to create accounts and grant permission to the analytics server to periodically monitor files and other data accessible to each user. The analytics server may provide a web-based application displaying various prompts allowing each user to grant the analytics server permission to periodically monitor all data (e.g., files) accessible and/or stored onto each user's computer. During the account registration process, the web-based application may display one or more prompts allowing each user to connect his or her email accounts, messaging tools, task management tools, project management tools, calendars, organizational or knowledge management tools, other collaborative tools and/or electronic repository systems (e.g., local database, cloud storage systems, and the like) to the analytics server.

The prompt may also include one or more text input fields where each user can input identification and authentication credentials for his email accounts, messaging tools, electronic repository systems, and/or third party applications, such as project management tool, time tracking applications, billing, issue tracking, web accounts, and other online applications. For example, a user may enter his email address and password in the input fields displayed by the analytics server. Upon receipt, the analytics server may use the authentication credentials to remotely login the above-described portals and monitor all files accessible and/or revised by each user and/or all files saved on the electronic data repositories.

Upon receiving permission from users, the analytics server may scan the one or more electronic data sources including electronic data repositories accessible to each user. The analytics server may execute a scanning or crawling protocol where the analytics server crawls different databases to identify all files accessible to each user (e.g., collecting data).

As discussed above, an electronic repository may represent any electronic repository storing files that are accessible to one or more computers within an organization. Non-limiting examples of an electronic repository may include a database, cloud storage system, third-party shared drives, third-party application as described above, internal file transfer protocol (FTP), and internal or external database operated by the analytics server, email storage, HR systems, accounting systems, customer relationship management (CRM) systems, and the like. In some configurations, the data may be inputted by one or more users. For instance, an administrator operating the administrative computer (described in FIG. 1) may access a web-based application to input relevant data (e.g., account collectables, cybersecurity related data). In some embodiments, a user (e.g., an administrator) may upload various files/data onto an electronic repository (e.g., FTP) to be analyzed by the analytics server.

The analytics server may retrieve data using an application programming (API) interface in communication with the electronic data sources. The analytics server may use an API configured to communicate with the electronic data sources and/or electronic data repositories in communication with the electronic data sources to collect data.

At step 220, the analytics server may parse the data retrieved to generate a set of uniform data tables. The analytics server may parse and disaggregate the collected data into a set of unique domain data tables, each domain data table corresponding to a predetermined domain having a first criterion. Furthermore, the analytics server may also parse and disaggregate each unique domain table into a set of unique dimension tables, each dimension data table corresponding to a predetermined dimension having a second criterion.

The analytics server may parse the collected data in accordance with the data tables described in FIG. 3A. For instance, the analytic server may first determine one or more domains applicable to the collected data. The domain table 310 illustrates different domains categories used to subdivide data into different domain tables. Once the data is distributed among one or more domain tables, the analytics server may further distribute the collected data among five building blocks. For instance, collected data that belong to ATM domain is further divided among information, dimensions, analytics, archive, and grid building blocks, as depicted in building blocks 320.

Different domains described in the domain table 310 may represent different categories of data satisfying a specific predetermined criterion. For instance, the customer journeys domain may refer to all data related to user experiences of customer-facing applications (e.g., customer-facing website and/or other electronic applications). Therefore, all data within the data table corresponding to the customer journey will satisfy this criterion. In another example, ATM domain may refer to all collected data relevant/associated with ATMS. Therefore, all collected data parsed, by the analytics server, into the ATM domain table, will share at least that one criterion.

The analytics server may then distribute the collected data into six different data structures, as depicted in data structure table 330. The data structure table 330 includes the following data tables, catalogs, and journals:

A dimension table for views (DTV) describes the format and content of views to present specific information to the user. One or more DTV files are created for each domain thereby creating a catalog of views that may be requested by the user. In a given domain, a DTV may point to core dimension tables (DTs) and/or dimension tables for information (DTIs).

A dimension table for information (DTI) specifies information, which may be a metric (e.g., FTE, NIX, NIX/FTE, gross spend) or any other information that is available in the given domain (e.g., name, address, photos, videos, documents). One or more DTI files are created for each Domain to specify a catalog of information that is available to create views. In a given domain, a DTI may point to dimension table(s) for keywords (DTK), fact catalog(s) (FCs), and/or fact journal(s) (FJs).

A dimension table for keywords (DTK) specifies keywords that may be combined to name metrics. Keywords are used as "clues" by the user command-processing algorithm (voice or search). For example, voice commands may include multiple keywords referring to information and dimensions.

Core dimension tables (core DT) specifies the structure of concepts. A concept is disaggregated into "N" levels using an L1, L2, L3, LN structure.

Meta-data for unstructured data (DTU) specifies the meta-data for unstructured data items. Examples may include the type of file such as audio, video, spreadsheet as well as the specific type of file: Word®, Excel®, Power Point®, as well as the concepts and sub-concepts to which the unstructured data item belongs.

An FC specifies the list of items corresponding to a concept along with their associated attributes. Examples may include facilities catalog, IT application catalog, and employee catalog. In a given domain, FCs may point to core DTs, other FCs, and unstructured data items (UDIs). DTs, FCs, UDIs may be in the current domain or another domain.

An FJ specifies time stamped event information. Examples may include financial transaction (revenue, expense), customer interactions (branch visit, digital transactions). In a given domain, FJs may point to core DTs, FCs, and unstructured data items (UDIs). DTs, FCs, and UDIs may be in the current domain or other domains.

Unstructured Data Items (UDIs) contain unstructured data items. Examples include photos, videos, audio files, documents, etc. In a given domain, UDIs may point to the DT describing the DTU, Core DTs, FCs, and DTIs. DTs, FCs, and DTIs may be in the current domain or other domains.

As described above, the analytics server may first parse and disaggregate the collected data and identify/generate one or more domain data tables corresponding to the collected data. Subsequently, the analytics server may further disaggregate each domain data table into one or more dimension data. As will be described below, the analytics server may use the identified data tables to generate a nodal network for the collected data. In some embodiments, the analytics server may generate multiple data tables where each data table is structured in accordance with one or a combination of the above-mentioned dimensions and/or domains. For instance, the analytics server may generate a data table for each domain illustrated in the domain table 310. Each data table may comprise sub data tables where the data is distributed in accordance with the dimensions and structures depicted in the data structure table 330.

By generating the above-described data tables (e.g., by dividing the data in accordance with the specific rules described above), the analytics server may generate multiple data tables unique to each set of collected data and/or each organization. The unique data tables and the or nodal network described herein (sometimes referred to as the knowledge grid) allow the analytics server to store, analyze, and retrieve data in a more efficient manner, when compared to conventional methods of data storage, such as storing the data onto one or more databases (e.g., data lake method).

In some configurations, the analytics server may receive an instruction from a user (or based on predetermined rules) to generate the above-described data tables for only a selection of the domains and/or dimensions. For instance, a user operating an administrative computer may select one or more domains and instruct the analytics server to generate data table in accordance with the selected domains only. Therefore, even though 33 different domains are described in the domain table 310, the analytics server may not always use all 33 domains.

The analytics server may use a variety of techniques to identify the domains and/or dimensions associated with the collected data. In some configurations, a team of experts (e.g., integration team) can designate an appropriate domain and/or dimension to the collected data. In another example, this task may be accomplished as a user inputs/uploads the data. For instance, when uploading data, the user can designate and/or tag a file with an appropriate domain or dimension. In another example, the analytics server may automatically identify an appropriate domain and/or dimension for the collected data. For instance, the analytics server may identify the source of the collected data and may designate a domain based on the source (e.g., ATM domain is identified when the data is retrieved from an ATM). In another example, the analytics server may identify an appropriate domain table in accordance with the context data associated with a file. For example, if the filename contains "sales," the analytics server may assign the file to a sales domain data table.

Referring back to FIG. 2, at step 230, the analytics server may generate a nodal network based on the collected data. The analytics server may generate a nodal network comprising a set of nodes where each node represents at least a portion of the collected data (e.g., a file), each node having metadata comprising a unique identifier corresponding to a unique domain table and a unique dimension table corresponding to the data associated with each node.

The analytics server may generate a nodal network where each node represents at least a portion of collected data classified and identified as corresponding to a uniquely generated data table. The collected data may correspond to a wide range of categories and a wide range of electronic data sources. For instance, while one node may represent a file collected from an employee computer, another node may represent transaction data associated with a particular transaction conducted at a particular ATM, and a third node may represent data associated with cyber-attack activity detected at a customer-facing application. Organizing the collected data using the methodologies described herein allows the analytics server to retrieve, analyze, and visualize the data efficiently.

As described above, the analytics server may identify and store context information as metadata for each node. For instance, if a node represent a file retrieved from an employee computer, the node's metadata may include file information (e.g., timestamp of the file, different computers who access the file, and/or a department to which the computers belong). The analytics server may also use metadata to store an indication of whether the node is associated with one or more of the data tables described above. For instance, metadata associated with a node may indicate a domain table and/or dimension table corresponding to the data represented by that particular node.

Figure 3B:
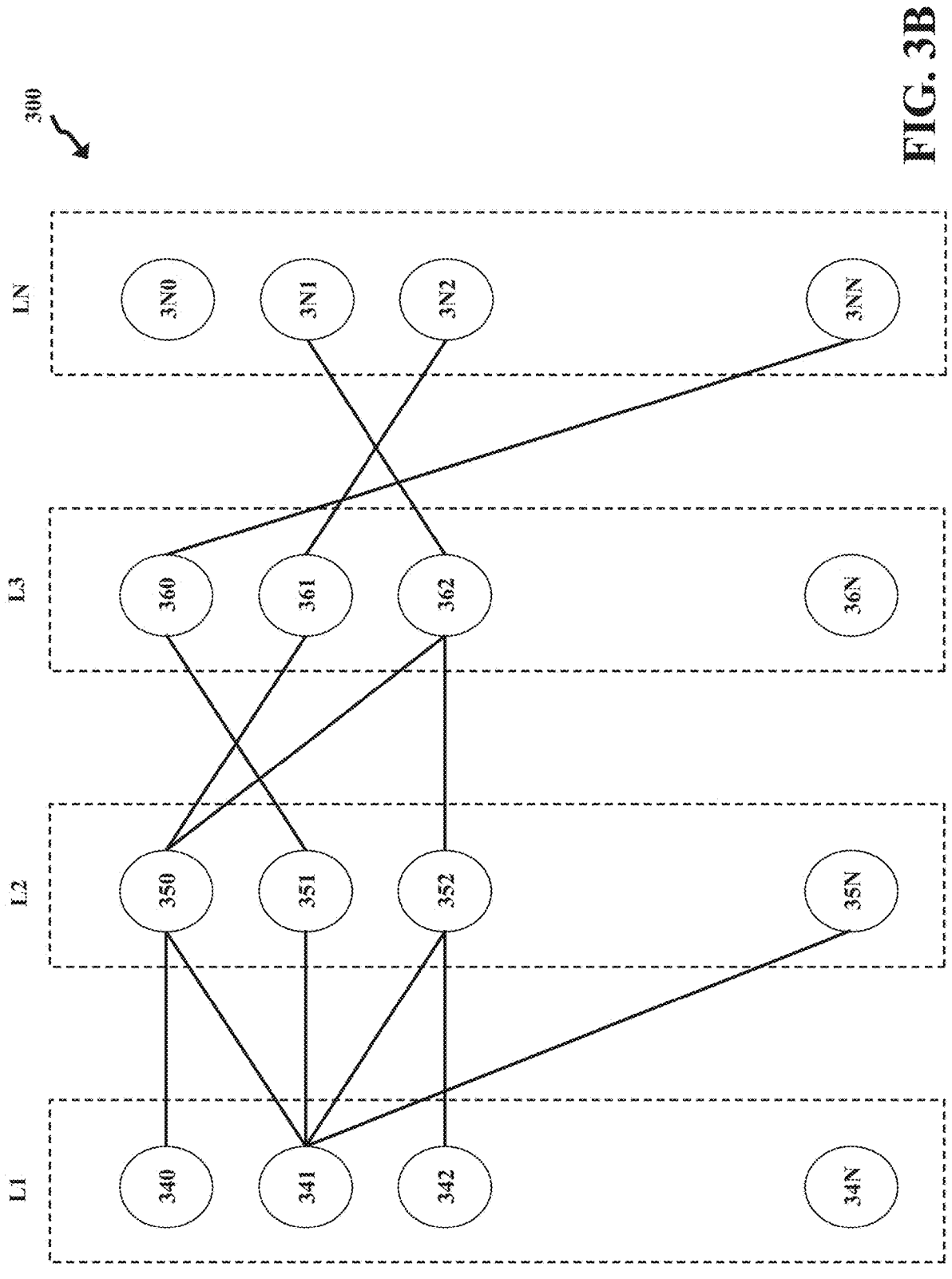

Referring now to FIG. 3B, an example of a nodal structure is illustrated, in accordance with an embodiment. The analytics server may also link one or more nodes based their respective metadata. As depicted, the nodal structure 300 includes multiple layers (L1-LN) where each layer includes multiple nodes. In some configurations, every layer may represent a domain table. For instance, L1 may represent a sales domain table, and L2 may represent an ATMs domain table. Therefore, the number of layers in the nodal network may depend on the number of domains identified or used by the analytics server.

The depicted nodes may each represent at least a portion of the collected data (e.g., each node may represent a file or an input by a user). For example, node 340 may represent a file retrieved from an employee computer where the file was generated as a result of a customer conducting a transaction. Also as depicted, the nodes are interconnected using various links. For instance, node 341 is connected to nodes 350-35N. A link (or edge) may connect similar or associated nodes within the nodal data structure, such as the nodal network. By linking different nodes, the analytics server may retrieve data corresponding to each node and the context metadata more efficiently. Edges can be directed, meaning they point from one node to the next, or undirected, in which case they are bidirectional. The analytics server may use different directed or undirected edges to link different nodes.

In one embodiment, the analytics server may designate a path/address for each link connecting multiple nodes in accordance with the following table:

| Name-path | <L1-name>.<L2-name>.<L3 -name> |
|---|---|
| ID-path | <TN> <ID> where <TN> is a unique number assigned to the dimension table and <ID> is a unique number within the table corresponding to the row for this node. |

The analytics server may use the character "." to delineate distinct names in a node path/address. Using different paths allows the analytics server to identify related nodes (and thereby related content) in a more efficient manner. The analytics server may also utilize a dimensional tree grammar to traverse the nodal network. Parameter values and corresponding tree scope, in one embodiment, are described below, in Table 2:

TABLE 2

| Parameter value | Scope |
|---|---|
| (blank) | Entire tree |
| Level = LN | Entire tree up to Level LN |
| Node = name.name | A specific node in the tree |
| Node + 1 = name.name | A specific node in the tree and 1 level below |
| Node + N = name.name | A specific node in the tree and N levels below |
| Node++ = name.name | A specific node in the tree and all levels below |

The analytics server may use different grammatical rules to identify different paths and addresses for one or more nodes. These grammatical rules may be domain-specific and/or dimension-specific. The grammatical rules are further described in U.S. patent application Ser. No. 15/925,995, which is incorporated herein in its entirety. As described above, each node within the nodal network may be enriched with metadata from multiple sources (internal, external) and of multiple types (structured, unstructured, and/or streaming).

Upon generating the nodal network and creating the edges and links, the analytics server may efficiently intake data. For instance, the analytics server may retrieve data where the data is automatically parsed and disaggregated (e.g., placed into a uniquely created data table) and then assigned to a node. The nodal network (loaded using various configurators) may define the structure of concepts and declared relationships between concepts.

Once the analytics server configures the nodal network, the analytics server may continuously update the nodal network to reflect the latest information/state of the collected data. As described above, this process may be an automated process using various data entry techniques, or automatic data feeds including RSS feeds or other feeds from internal, external, or homegrown book of record transaction systems, collaboration applications (e.g., mail, text, social), derived data systems (e.g., risk, or AML) as well as external data sources (paid services—e.g., financial data, government, etc.). As the nodal network is updated, the analytic server may continuously monitor state changes to detect issues that should be presented to the user. The detection of issues can be achieved using all analytic models and services. Once an issue is detected, it can be presented as an alert to the user in the alert panel of the graphical user interfaces described below.

Upon generating the nodal network, various analytic/heuristic algorithms may enrich the nodal network with additional facts attached to each node (e.g., metadata). The analytics server may use the nodal network to enable multiple types of analytic models and algorithms (e.g., arithmetic/statistical, computational, rule-based, and machine learning). These algorithms may also create new relationships, which are not pre-defined in the nodal network, or predict insights. Therefore, the methods and systems described above may autonomously and iteratively create new relationships and refine the nodal structure by refining the relationships and links between different nodes. As a result, with each iteration, the nodal network may improve, thereby having a better and more accurate representation of the data collected.

When data corresponding to a node is unstructured (not readily identifiable as associated with a certain data table), the analytics server may also use artificial intelligence and machine-learning techniques to revise the nodal network and identify a node for the collected data. For instance, the analytics server may use a random forest modeling techniques. Random forest modeling may include several nodal hierarchical structures (e.g., trees). In some configurations, the AI model may incorporate other machine learning techniques, such as gradient boosting, support vector machines, deep neural networks, and logistic regression.

By identifying and mapping relationships between different nodes, the analytics server may generate "knowledge" specific to a domain and/or a dimension. Knowledge may refer to an identification of previously unknown relationships between one or more nodes. The knowledge identified for a specific domain and/or a dimension, may be applied to other domains and/or dimensions. Furthermore, the knowledge can be applied to other organizations and/or different parts and groups within the same organization.

Figure 4:
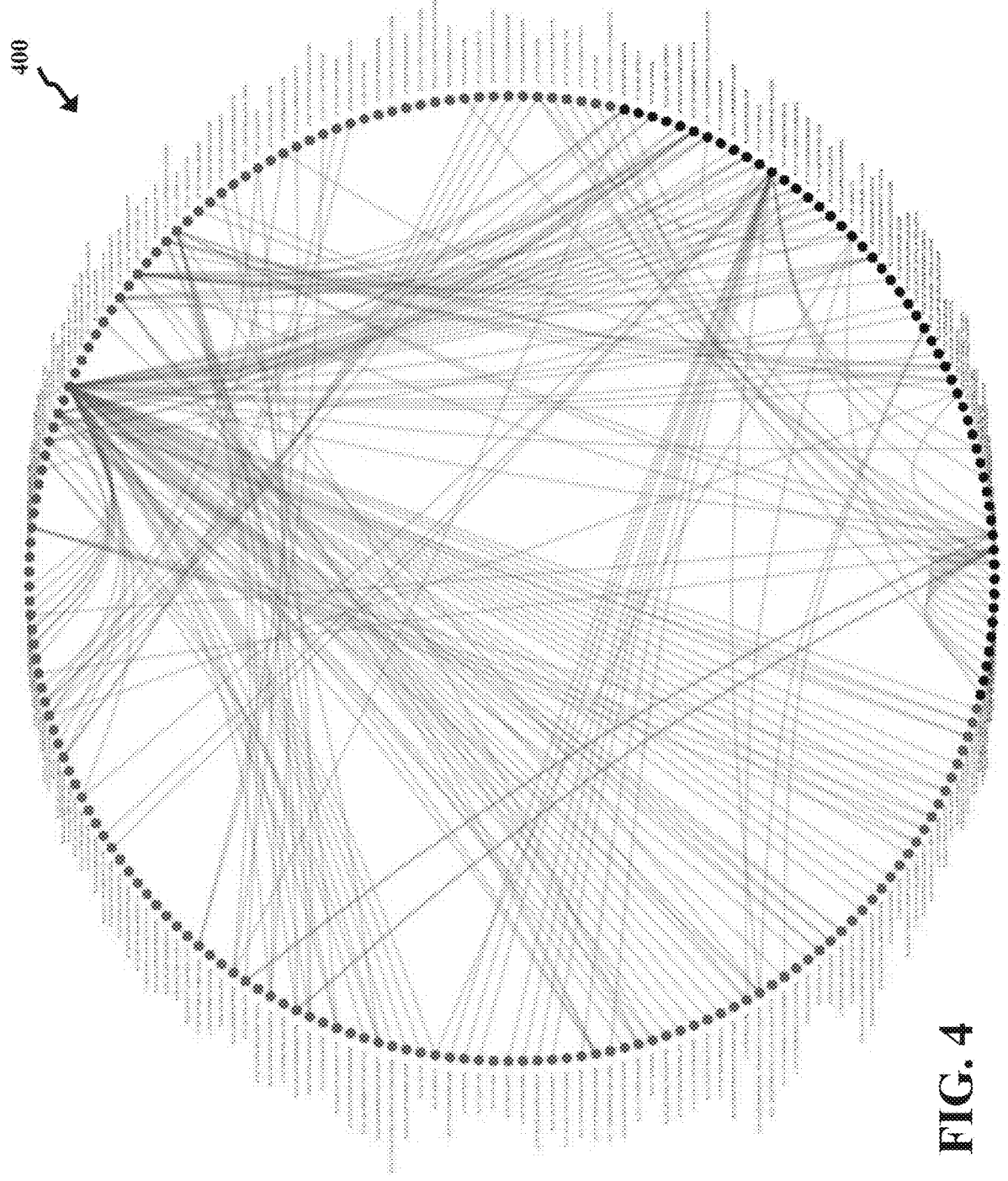
FIG. 4 illustrates a visual representation of the nodal network modeled based on data, according to an embodiment.

Referring now to FIG. 4, a visual representation of the nodal network is illustrated, according to an embodiment. For instance, each point within the circle 400 may represent a node or collected data. As depicted, the nodes within the nodal network are interrelated via links represented by lines inside the circle 400 connecting different points. Moreover, as depicted, some nodes may not be connected to other nodes and certain nodes may be connected to multiple other nodes.

Referring back to FIG. 2, at step 240, the analytics server may receive a request from a user. The analytics server, upon receiving a request from a user-computing device, may parse the request to identify a node associated with the request. The request may be an instruction to display collected data associated with a certain category, domain, or an event. The analytics server first parse the request to identify a node or a category of nodes to be displayed. The user request may inputted by a user accessing a graphical user interface provided by the analytics server. For instance, a user may execute a web application or access a webpage generated by the analytics server. The user may then input a request to view a category of data (e.g., cybersecurity for the organization website). Upon receiving the request from the user, the analytics server may identify one or more nodes related to the request using the methodologies described above.

At step 250, the analytics server may display, on a graphical user interface displayed on the user computer device, data associated with the identified node. Upon identifying one or more related nodes, the analytics server may retrieve data corresponding to the identified nodes and may display the data on a dynamic graphical user interface. The dynamic graphical user interface is further described in FIGS. 5-15.

Figure 5:
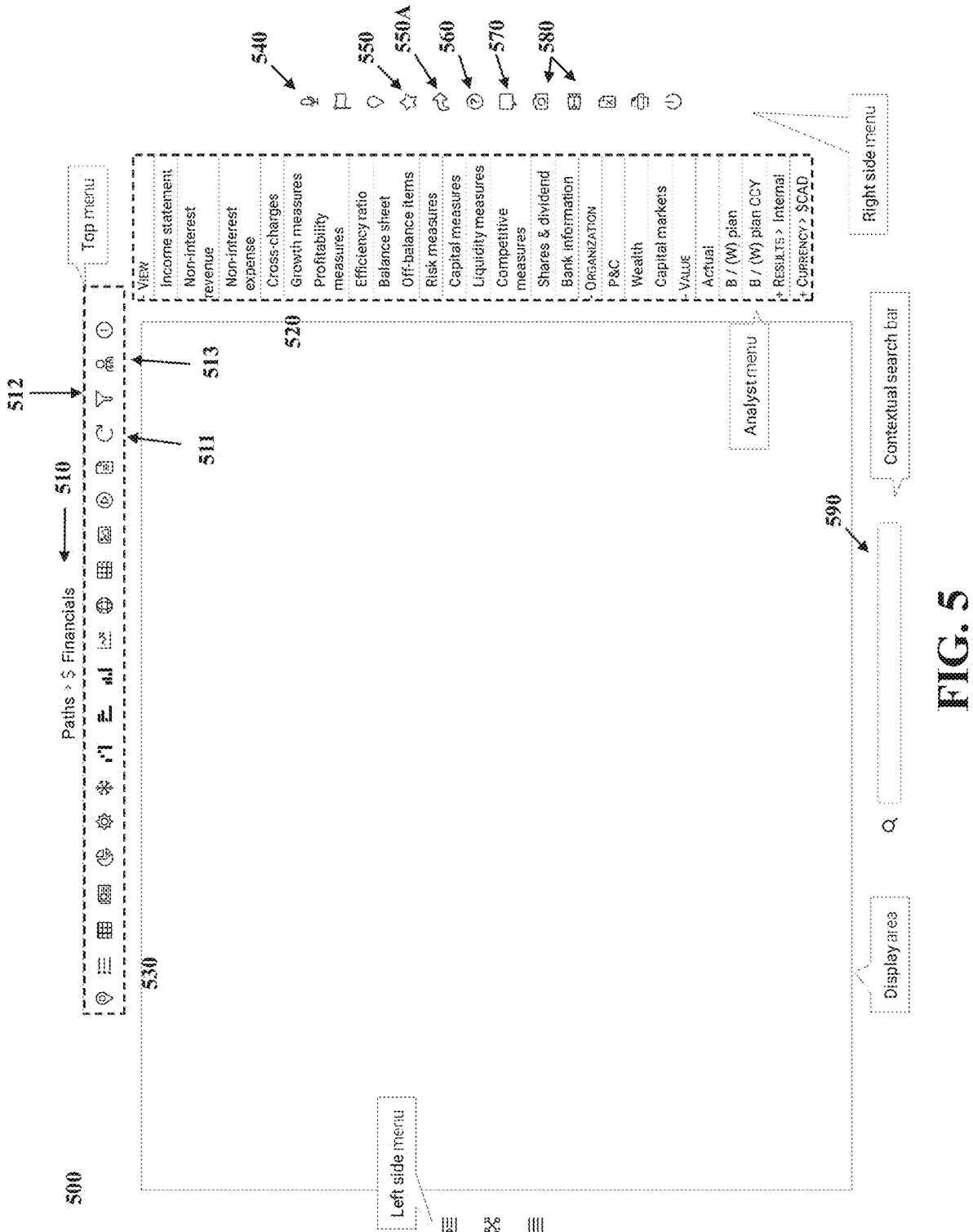

Referring now to FIGS. 5 and 6, an example of a GUI screenshot illustrates how a user can efficiently view content of the above-described nodal network. As depicted, GUI 500 includes multiple interactive icons and menu options positioned and designed to create a user experience that allows the user to have fast access and insight to the data uniquely structured, as described above. Using the GUIs described herein, the user may reach the desired information/insight using as few steps (e.g., clicking or otherwise activating a link) as possible. The GUIs described herein also provide simple and intuitive means of navigating the nodal network and reaching the desired information quickly.

Among other technical advantages provided, the GUIs described herein provide a navigation method that corresponds to the nodal network. Therefore, a user can navigate through data (e.g., moved from a broad view to a granular view or vice versa or move cross domains and dimensions) in a more efficient manner than provided by conventional and existing GUIs For instance, some conventional graphical user interfaces allow users to set multiple thresholds and filters in order to view data that are more granular. This method is undesirable because it shifts the burden of data navigation to the user. Furthermore, this method is also undesirable because it is not as efficient as the navigation methods described herein. The multiple navigation methods provided herein may work together in an integrated fashion. For instance, a user may use multiple navigation methods described below:

Paths navigation method: this provides a set of options for the "next step" when any part of the nodal network is displayed. The path navigation method suggests one or more answers to questions that the user may wish to inquire. This particular method of "drilling-down" the information is helpful because it allows the user to efficiently move along and traverse the nodal network. The path traversed by the user is displayed in the top menu (510). The path itself may represent the nodes (and their corresponding information) being displayed. The path (e.g., next step) options may be viewed and accessed via the path menu or analyst menu (520). As described below, a user may use the analyst menu 522 to view data associated with any particular section, dimension, or domain of the nodal network.

Interact with a view method: this method enables the user to interact directly with the widget (e.g., interactive graphical components) displayed in the view area. For instance, graphical component 530 may include the following options: List, Table, News, Pie, Sunburst, Relationship, Waterfall, Horizontal Bar, Vertical Bar, Line, Geo-Map, Matrix, Diagram, Video, Document, Diagnostic, Alert. This navigation method is efficient as the user simply interacts (e.g., clicks) with active areas of the widget (e.g., "+" to expand a table row or column) to view more information, zoom-in, or move to another address in the nodal network.

Voice command method: this method provides a very efficient way to get to a specific address in the nodal network. The user can click on (or otherwise activate) the voice command icon displayed as the interactive component 540 to issue a voice command. The analytics server may then parse the voice command using various voice recognition techniques and may display the specific view or a drill-down that corresponds to the given command. In some embodiments, if the command is a broad statement that results in multiple valid answers, the analytics server may display a list of views that correspond to the voice command.

The GUI 500 also provide an interactive component 550 where the user can bookmark the path and/or viewed information. The analytics server may store the bookmarked (e.g., favorite) paths for each user thereby allowing each user to quickly access a specific address within the knowledge grid via a few clicks.

The GUI 500 also displays interactive component 550A. When the user interacts with the interactive component 550A, the analytics server stores the path and generates an interactive address representing the path. The interactive address may be a hyperlink or a uniform resource locator (URL). As will be described below, the interactive address may be shared with other users where, upon the second user interacting with the interactive address, the analytics server displays data corresponding to the stored path. This feature is particularly useful when collaborating with other users.

For example, an address may be copied and then sent to another user for his or her review.

Furthermore, interactive component 560 (e.g., help icon) and interactive component 570 (narrative icon) are also available to further explain the meaning of each item as needed. For instance, when a user interacts with the interactive component 570, the analytics server displays window (e.g., pop up window) describing the path and/or the view displayed on GUI 500.

The GUI 500 also displays interactive components 580. When the user interacts with the interactive components 580, the analytics server enables the user to record and replay a sequence of views displayed along the path. For instance, the analytics server may generate a screenshot of the view. The analytics server may also generate a movie-like or animation like file where the sequence of views (e.g., a progression of different paths viewed by the user) is digitally recorded and stored onto a file. The analytics server further provides the user with the option of storing and/or sharing the file with another user.

As discussed above, the top menu displayed in the graphical component 530 allows the user access to visualization, analytics (widgets or interactive components, such as pivot 511, filter icon 512, and diagnostics 513) and alert features. In addition, the top menu 510 specifies the path traversed to reach the current view and enables the user to move back to a specific location in the path. Visualization widgets that are accessible at the given location in the path may be highlighted (icon color). The user may access the widgets by clicking on the corresponding icon.

The GUI 500 may also include an analyst menu 520. The analyst menu 520 (similar to the top menu displayed in the graphical component 530) enables the user to select, pivot (e.g., go to a previous view) and filter the information displayed in the viewing area. The Analyst menu 520 allows the user to visually navigate the nodal network. The analyst menu 520 further enables the user to select a view to display in the view area (e.g., all or a portion of the GUI 500). For example, GUI 500 provides a list of different views under the "view" header where a user may interact with each sub-header to see specific information relating to that sub-header. The "value" header displayed on the GUI 500 displays a set of sub-options for the given view. Under the "currency" header, the GUI 500 displays a set of sub-options for currency (e.g., US$ or Canadian $).

Filter icon 512 filters the information displayed in a particular customizable manner. In addition, the user may use the analyst menu to filter certain information. Selecting an item under this heading may result in narrowing the scope of the information displayed in the view to a specific organization unit. Filtering, as described herein, is implemented using DTs and follows the above-described L1-LN data structure format (e.g., moving from a parent node to a related child node).

Because of this specific filtering technique, the user may filter a view by a specific nodal address or path (not by thresholds, as performed by conventional graphical user interfaces). Using the filtering options provided by the GUI 500, a user might set a specific filter by navigating the L1-LN hierarchy and selecting a specific item (e.g., a specific line of business in the Canadian organization hierarchy). The GUI 500 may also include a contextual search bar 590 enabling the user to search for specific content using unstructured search methods. Referring now to FIG. 6, a list of all the icons displayed on GUI 500 is illustrated.

Figure 7:
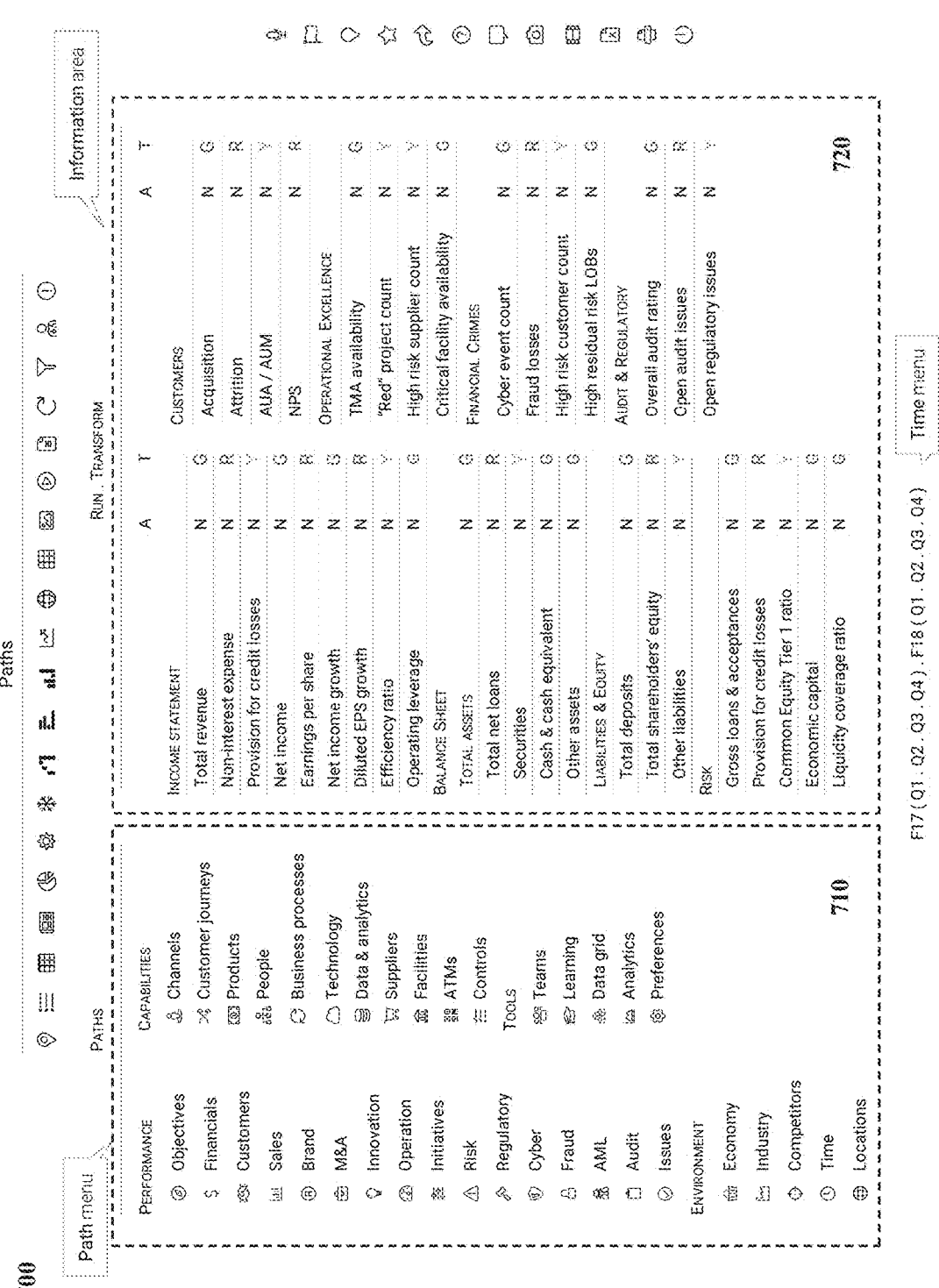
Figure 8A:
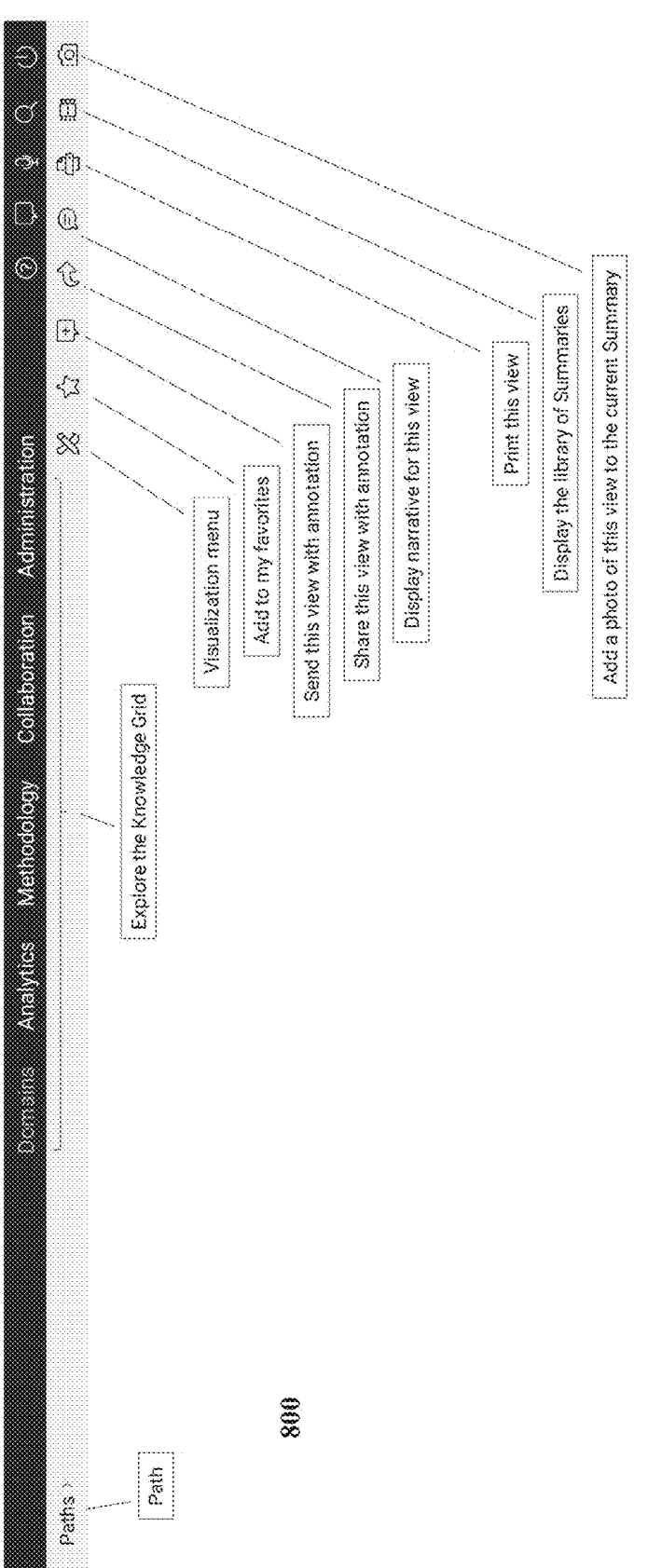
Figure 8B:
Figure 8C:
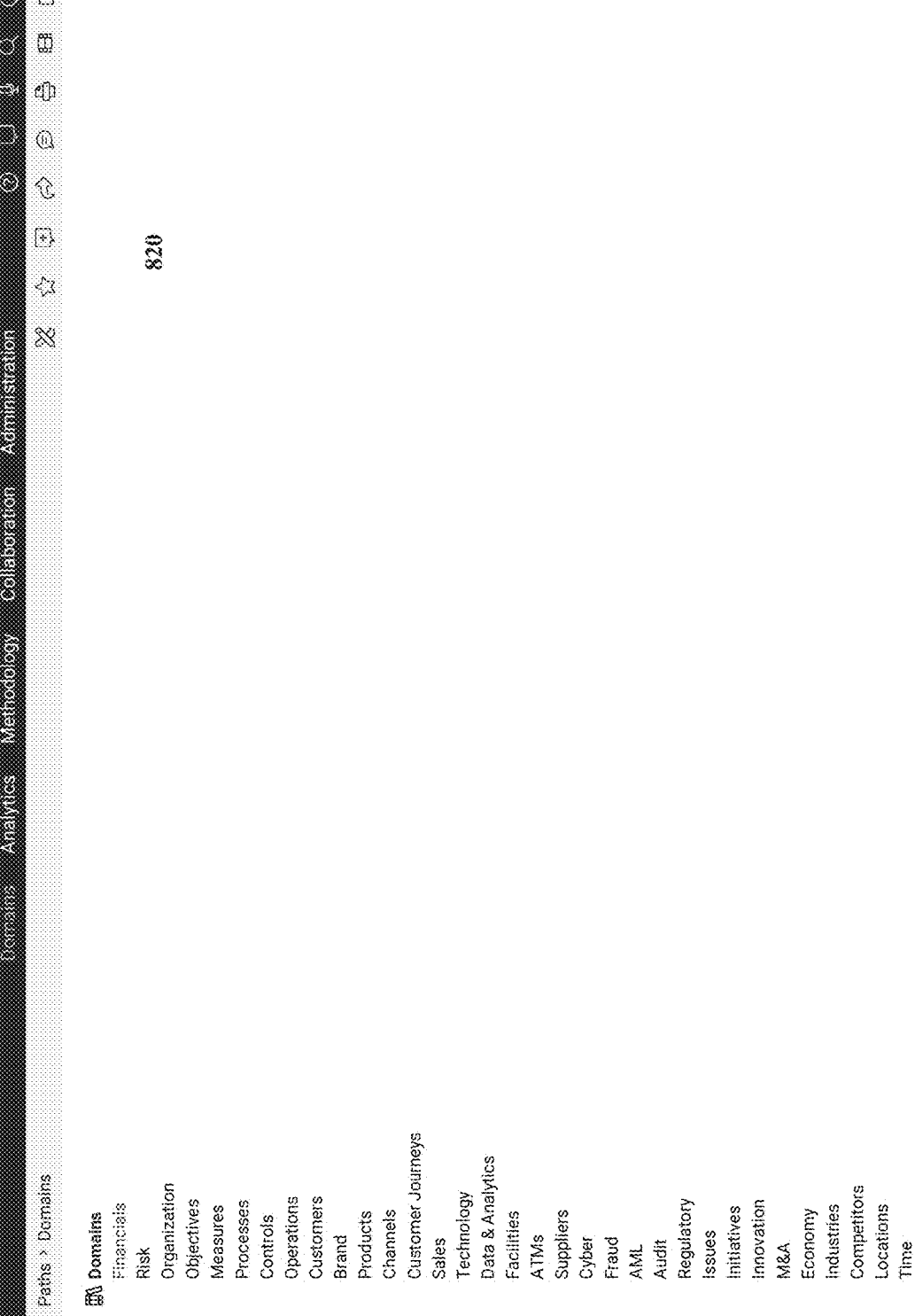
Figure 8E:
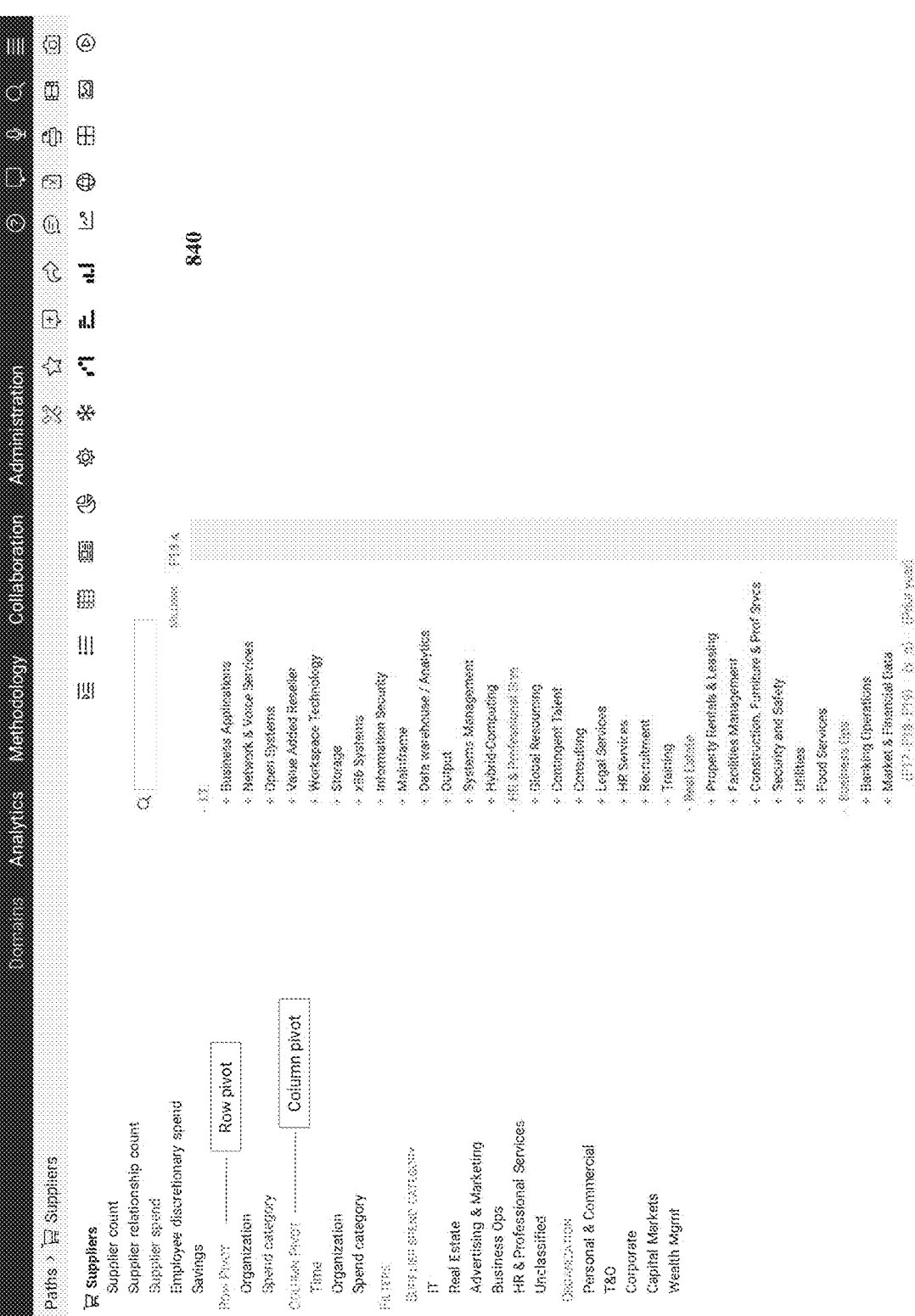
Figure 8F:
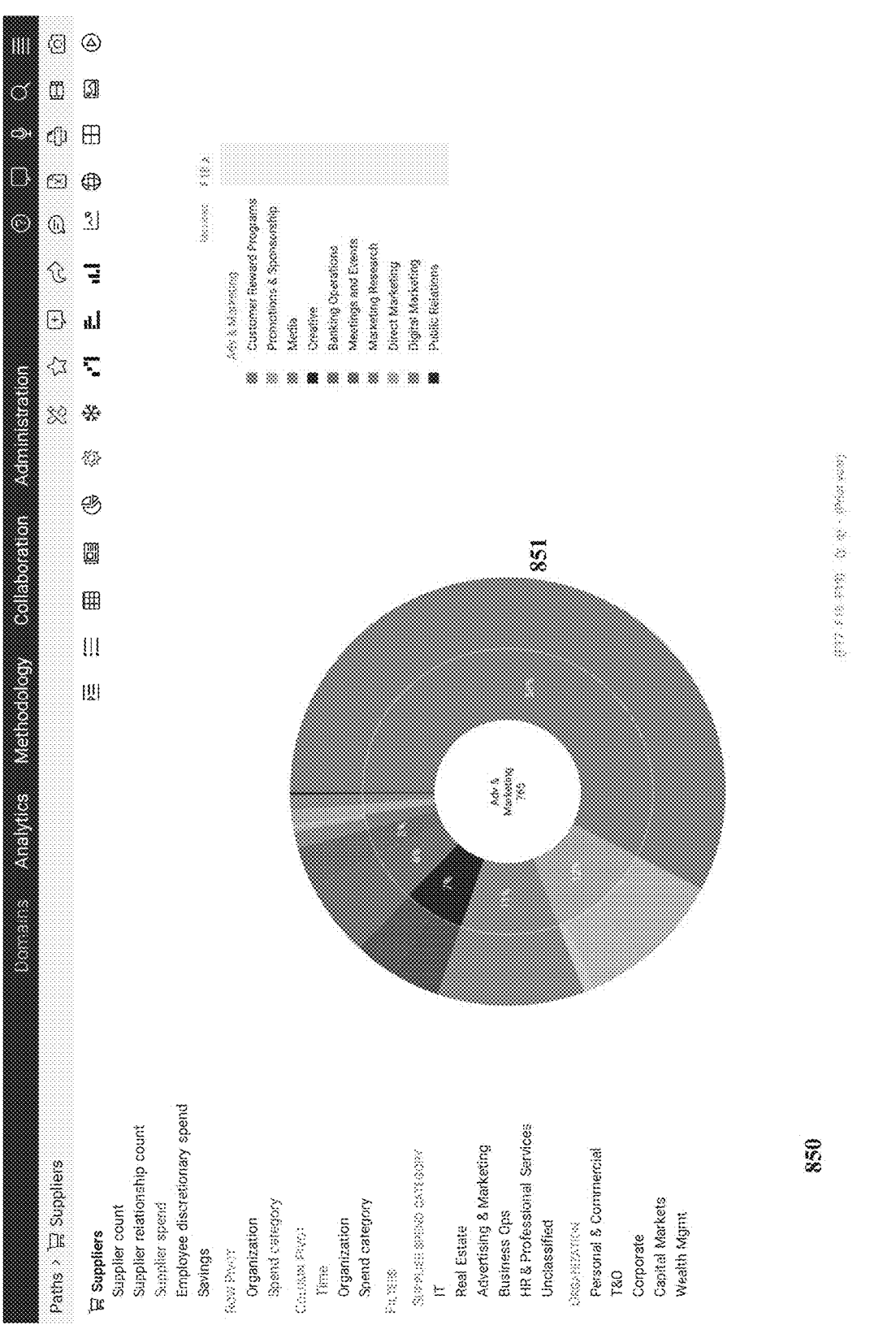
Figure 10:
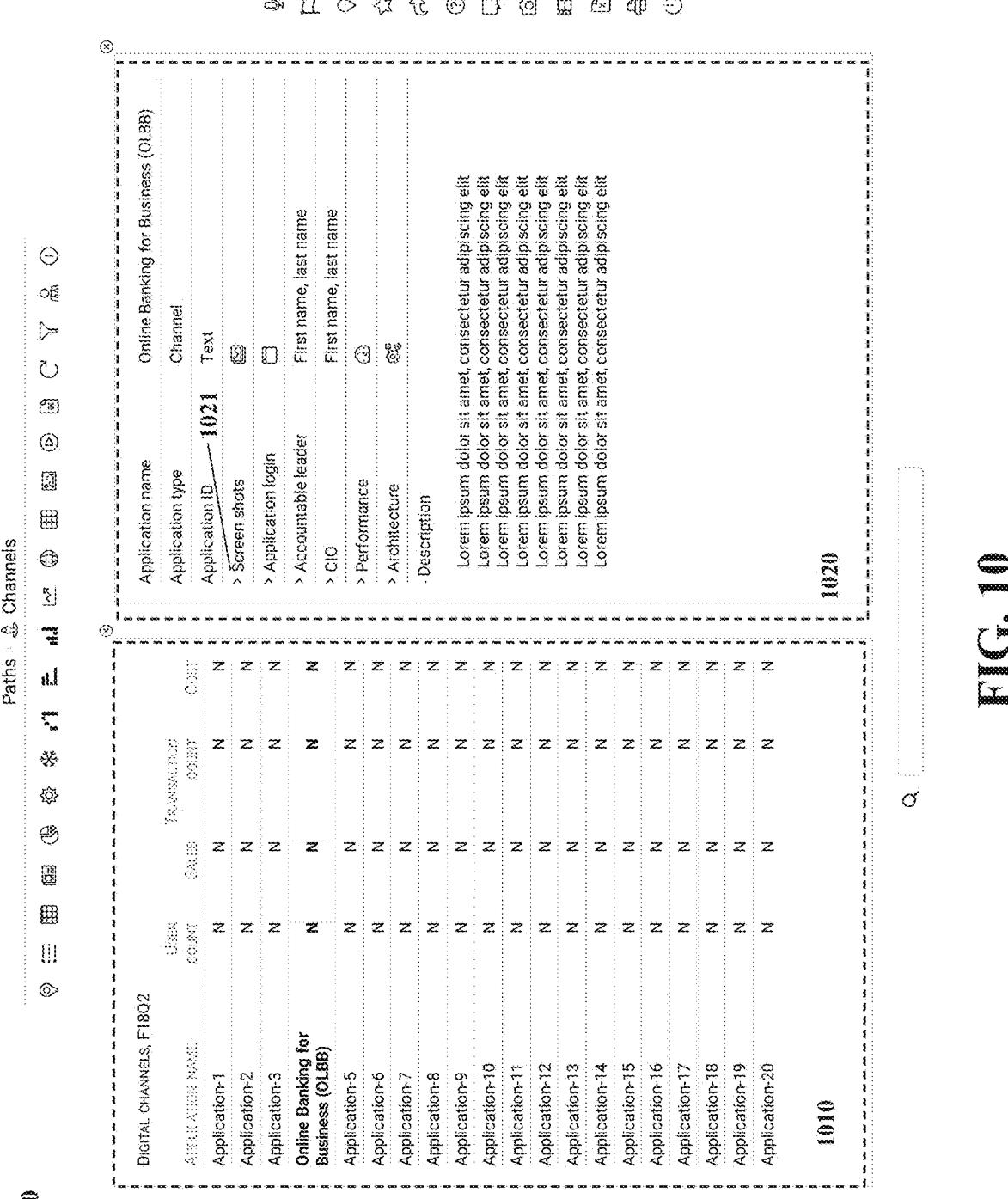
FIGS. 10-14 illustrate examples of different graphical user interfaces displayed by the intelligent data analysis system, according to an embodiment.
Figure 11:
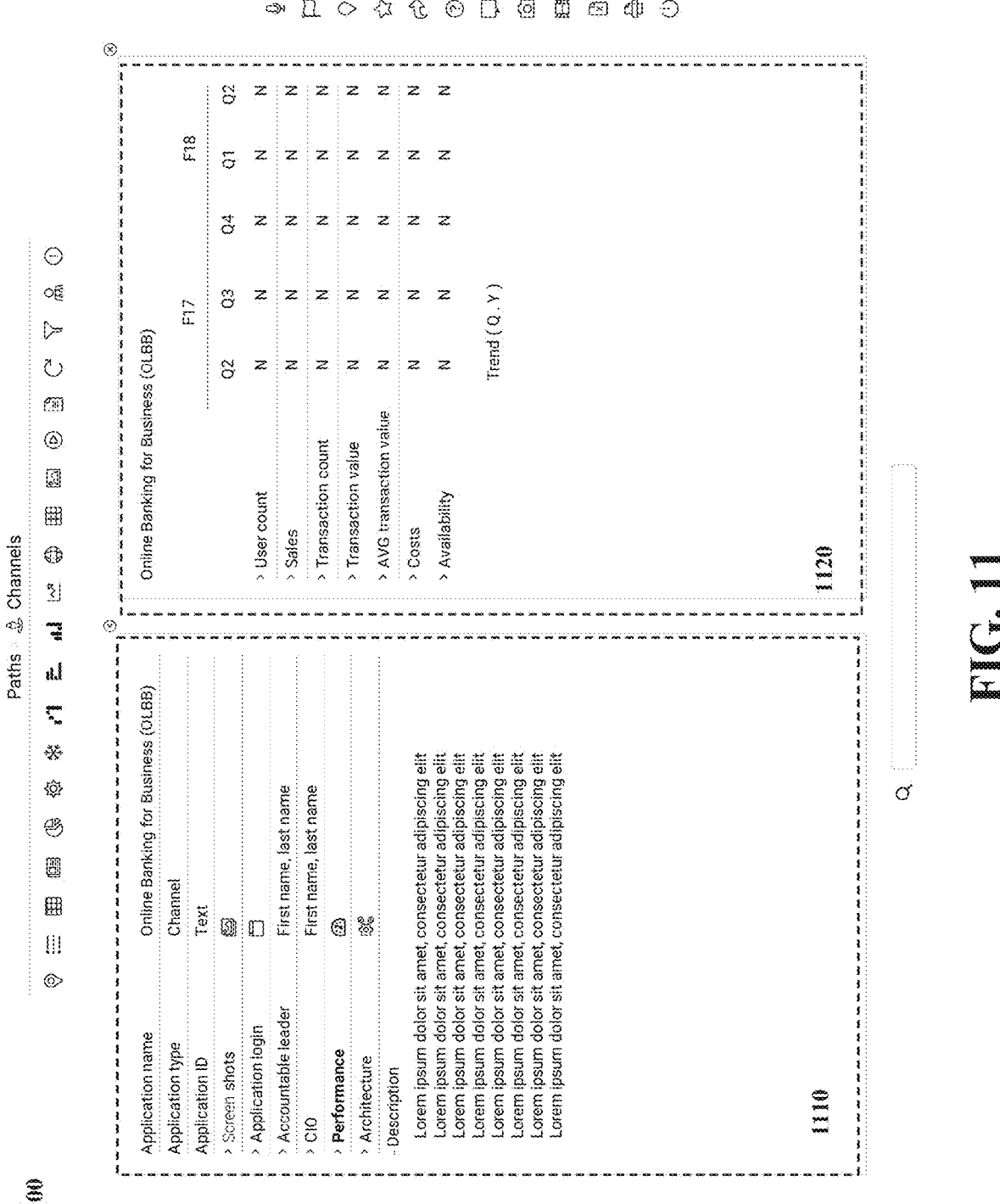
Figure 12:
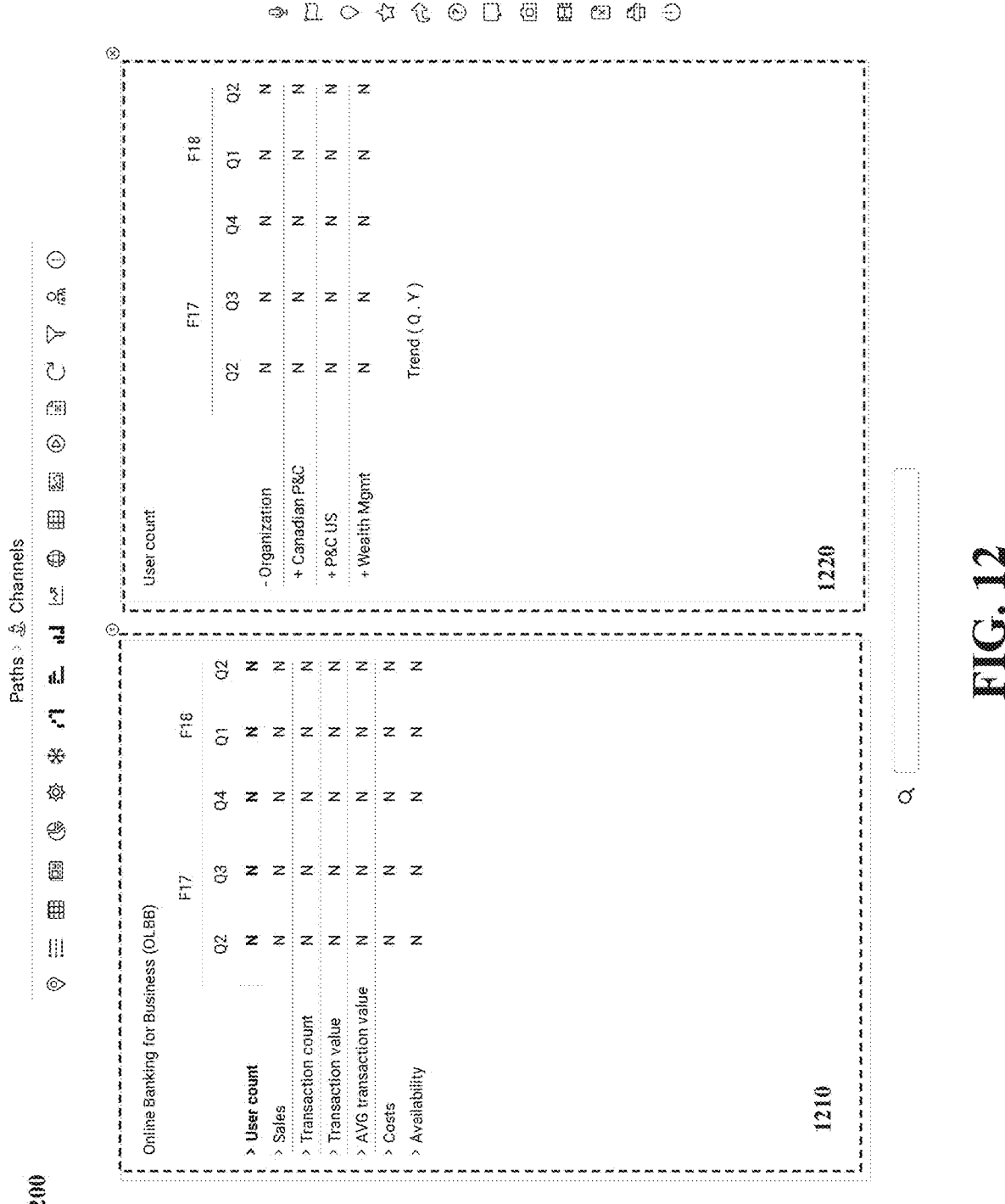

Referring now to FIG. 7, a graphical user interface start page is illustrated, according to an embodiment. The GUI 700 is divided into two sections of path graphical component 710 and information graphical component 720. The path graphical component 710 may display multiple interactive hyperlinks each configured to direct the user to domains and tools available. The paths graphical component 710 may be organized by categories. For instance, in the depicted embodiment, the path graphical component 710 is divided into four categories: performance, capabilities, environment, and tools. When a user interacts with a path hyperlink, the analytics server may display the start page for the given domain or tool.

The GUI 700 also displays information graphical component 720, which displays metrics along with value and trend indicators. As illustrated, the metrics may be visually distinct based on one or more predefined thresholds (e.g., red, yellow, or green). The metrics can be customized for each user based on user preferences and/or user permissions. Each metric may be visually distinct and designed to engage the user in exploring the given domain by providing key facts along with the ability to instantly view information that is more detailed. For instance, in the displayed domain of the GUI 700, the user may instantly identify that "fraud losses" is in critical condition and needs to be addressed. The GUI 700 also displays two hyperlinks ("run" and "transform"). When the user interacts with "run" hyperlink, the analytics server pivots to view additional information (e.g., operations of the enterprise). When the user interacts with "transform" hyperlink, the analytics server displays a list of improvement opportunities and/or initiatives across the enterprise (e.g., in accordance with the knowledge and pre-mapped relationships identified using the nodal network). The user can also filter the information displayed. For instance, the user can implement a filter to only view metrics that satisfy a threshold (e.g., fraud losses, open audit issues, NPS, attrition, provision for credit losses, total shareholder equity, diluted EPS growth, and non-interest expenses).

In another example, FIGS. 8A-F illustrate how a user can efficiently explore/navigate the knowledge grid (nodal structure) and view customized data. As illustrated, the analytics server may display GUI 800 where a user can select a "domain" to explore. The analytics server may also display various options allowing the user to visualize certain data, add data or a path to a favorites list for expedited access, send a specific view to another user, share data with other users, display the narrative associated with a view, print, display the library of summaries, or add data (e.g., photos) to the knowledge grid.

As illustrated in GUI 810, the analytics server may also display different options for the user to input his or her request. For instance, the user may input a voice command or interact with a search bar. The analytics server may also provide an internal communication system allowing users to communicate with each other (e.g., messaging application). The analytics server may display a list of all domains (as illustrated in GUI 820) where the user can select a domain to drill down or view customized data. The analytics server may allow users to generate customized visualizations. For instance, as depicted in GUI 830, when a user interacts with the visualization menu 832, the analytics server displays options 831 allowing the user to customize the visualization 833. For example, as depicted in GUI 840, a user may select the column and row pivots for visualization 833. The analytics server may also display the same data in different formats. For instance, the analytics server may display a chart visualizing the selected data or a pie chart visualizing a customized selection of data (e.g., visualization 851 depicted in GUI 850).

Various GUIs depicted and described herein illustrate a drill-down feature provided by the analytics server. More specifically, the GUIs depicted herein illustrate drill-down features for the channel domain. However, it is expressly understood that the methods, systems, and graphical user interfaces described herein apply to any domain or other features. A distinctive feature of the graphical user interfaces described herein is the ability of the analytics server to provide drill-down information in an efficient and seamless manner. Using this feature, users may efficiently navigate through granular data. Users may gradually narrow data in an efficient manner without using multiple thresholds or filters or requiring multiple interfaces.

The graphical user interfaces depicted herein illustrate how a user may use the functionality of the analyst menu in conjunction with the drill-down features to navigate the nodal network. Using the drill-down feature, users may navigate within a given domain (e.g., from one metric or concept to another), move laterally across domains (e.g., from one domain to another domain), and/or move up/down in level of abstraction (e.g., from the macro view to the atomic view). These technical advantages over conventional graphical user interfaces allow users to visualize data efficiently.

Referring now to FIGS. 9A-B, a flow diagram of a process executed by the intelligent data analysis system is illustrated, in accordance with an embodiment. The method 900, in conjunction with the graphical user interfaces illustrated in herein, illustrate the drilling-down techniques executed by the analytics server. The method 900 includes steps 910-970. However, other embodiments may include additional or alternative execution steps, or may omit one or more steps altogether. The method 900 is described as being executed by a server, similar to the analytics server described in FIG. 1. However, in some embodiments, steps may be executed by any number of computing devices operating in the distributed computing system described in FIG. 1. For instance, part or all the steps described in FIG. 9A may be locally performed by one or more user computing devices or an administrative computing device.

At step 910, the analytics server may divide a display screen into a first and a second graphical component. Furthermore, at step 920, the analytics server may dynamically populate the first graphical component with data corresponding to a node where the analytics server displays a first set of hyperlinks corresponding to one or more child nodes of the node. The GUI 901 illustrates that users can simultaneously view multiple metrics (channel count, sales, transaction count, etc.) across channels. Users can activate the drill-down feature by clicking on a cell in the table displayed in GUI 901.

The drill-down feature is implemented by dividing the display in two areas: left and right, each of which contains an information block dynamically populated by the analytics server. For example, in FIG. 10, the left area (graphical component 1010 of the GUI 1000) displays a list of digital channels. Digital channel may represent a node within the nodal network generated by the analytics server. The digital channel node may have multiple child nodes. For instance, each hyperlink displayed within the graphical component 1010 may represent a child node of the digital channel node.

As depicted, the right area (graphical component 1020) displays detailed information related to a specific (selected) digital channel. When the user clicks on a specific feature (e.g., row or icon) in the graphical component 1010 to select a digital channel, the analytic server displays (dynamically populates) the related information on the graphical component 1020. The analytics server may display icon 1021 to indicate that further drill-down options is available. For example, in the graphical component 1020, the following items have available drill-down information:

Screen shots: drill-down option will display screen shots for the selected application;

Application login: drill-down option will display the login page for the selected application;

Accountable leader: drill-down option will display demographic data relating to the leader who is accountable for the selected application (e.g., name, address, or contact information);

CIO: drill-down option will display demographic data relating to the chief information officer who is accountable for the selected application (e.g., name, address, contact information, etc.);

Performance: drill-down option will display information related to the performance (e.g., user count, sales, or transaction count) of the selected application; and Architecture: drill-down option will display information related to the architecture (e.g., database, operating system, software package, or data center) of the selected application.

At step 930, the analytics server may, upon receiving an indication that a user has interacted with a first hyperlink of the first set of hyperlinks, identify a child node corresponding to the first hyperlink. Furthermore, at step 940, the analytics server may dynamically populate the second graphical component with data corresponding to the identified child node where the server displays a second set of hyperlinks corresponding to one or more subsequent child nodes of the identified child node. As illustrated in GUI 1100 (a subsequent graphical user interface displayed after GUI 1000), when a user selects an item for drill-down from the right information block, the analytics server dynamically moves the selected information block to left area of the subsequent graphical user interface. The analytics server further displays the subsequent drill-down information in the right area of the subsequent graphical user interface. This method enables a drill-down feature that is unconstrained by the number of levels.

For example, when the user clicks on online banking for business in GUI 1000, the analytics server identifies a node associated with the OLBB in a nodal network (parent node). The analytics server also dynamically populates the graphical component 1020 with information related to OLBB. The information may include multiple hyperlinks where each hyperlink is associated with a related and/or child node of the parent node. For instance, graphical component 1020 includes hyperlinks corresponding to screenshots, application login, account leader, and other child nodes.

If the user clicks on a hyperlink associated with a child node (e.g., "performance" displayed on the graphical component 1020), the analytics server then directs the user to GUI 1100 where OLBB information is dynamically relocated from the graphical component 1020 to graphical component 1110 and the graphical component 1120 is dynamically populated by OLBB performance data. The analytics server may further remove data displayed in the graphical component 1010. Moreover, in the depicted embodiment, the analytics server may display data corresponding to one or more subsequent child nodes to the child node ("performance) in the graphical component 1120.

At step 950, the analytics server may, upon receiving an indication that a user has interacted with a second hyperlink of the second set of hyperlinks, identify a subsequent child node corresponding to the second hyperlink. Furthermore, at step 960, the analytics server may dynamically populate the second graphical component with data corresponding to the identified subsequent child node. For example, when the user clicks on "user count" displayed on the graphical component 1120 (subsequent child node), the analytics server first identifies the subsequent child node within the nodal network and retrieves data associated with the subsequent child node. The analytics server then directs the user to GUI 1200. As depicted in GUI 1200, the analytics server removes the data displayed within the graphical component 1210, dynamically populates the graphical component 1210 with data previously populated in the graphical component 1220. The analytics server also displays data corresponding to user account (subsequent child node) in the graphical component 1220.

Figure 13:
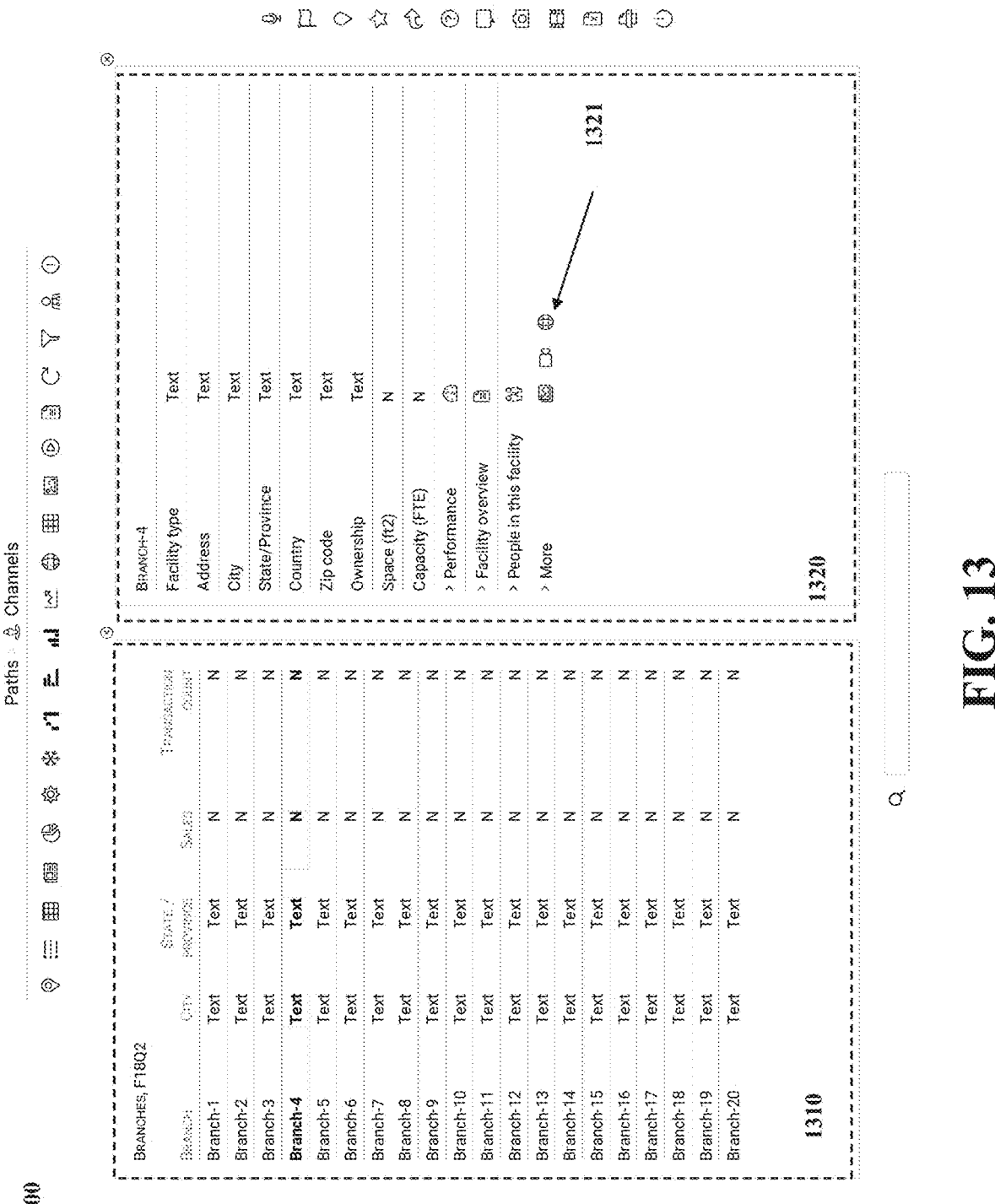
Figure 14:
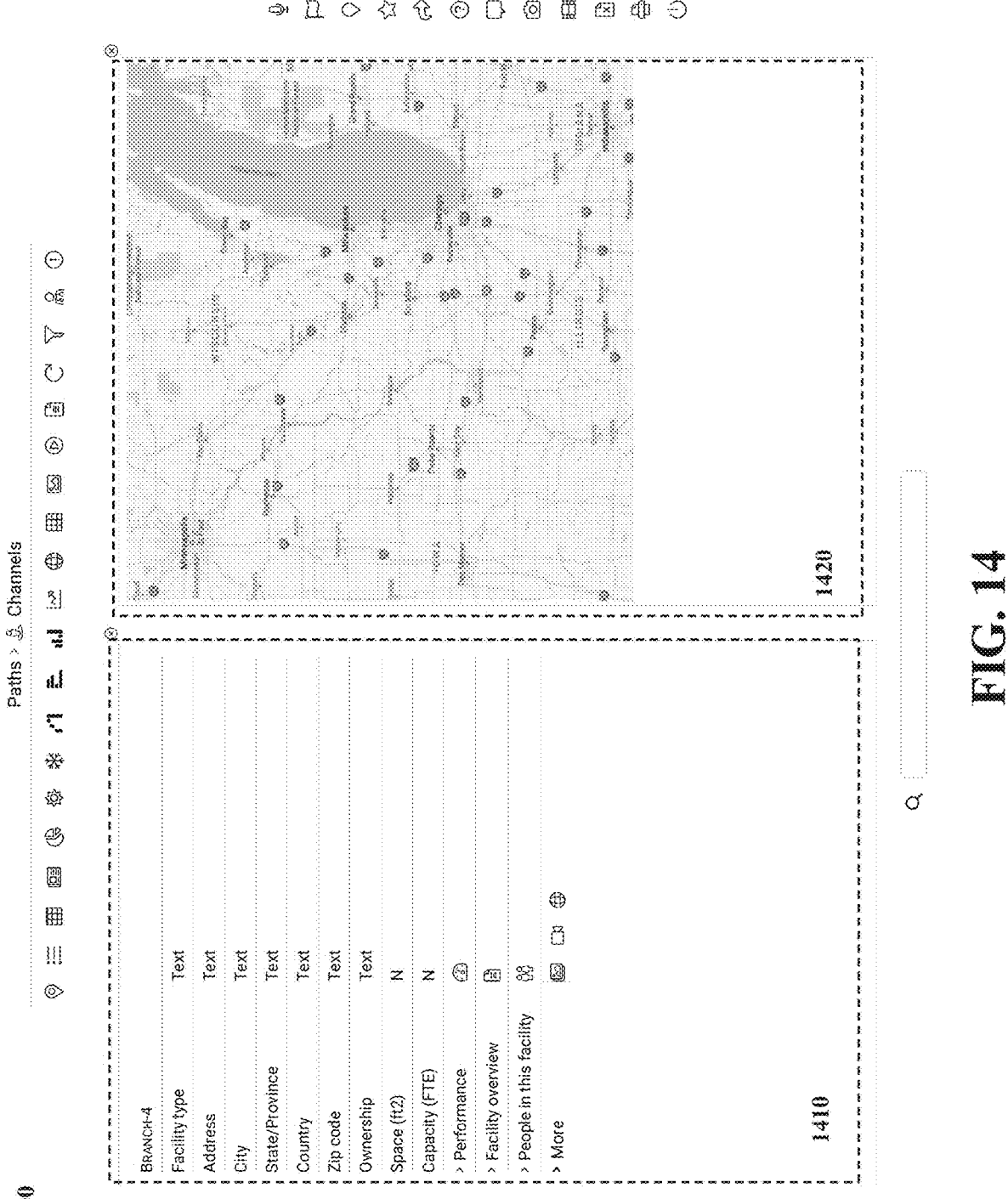

Referring now to FIG. 13, in the GUI 1300, when the user clicks on branch-4 in graphical component 1310, the analytics server dynamically populates graphical component 1320 with data associated with branch-4. Upon receiving an indication that the user has interacted with the icon 1321, the analytics server directs the user to the GUI 1400 (FIG. 14) where the data displayed in the graphical component 1320 is now dynamically relocated to graphical component 1410 and data corresponding to the icon 1321 (e.g., map) is displayed on the graphical component 1420.

Figure 15:
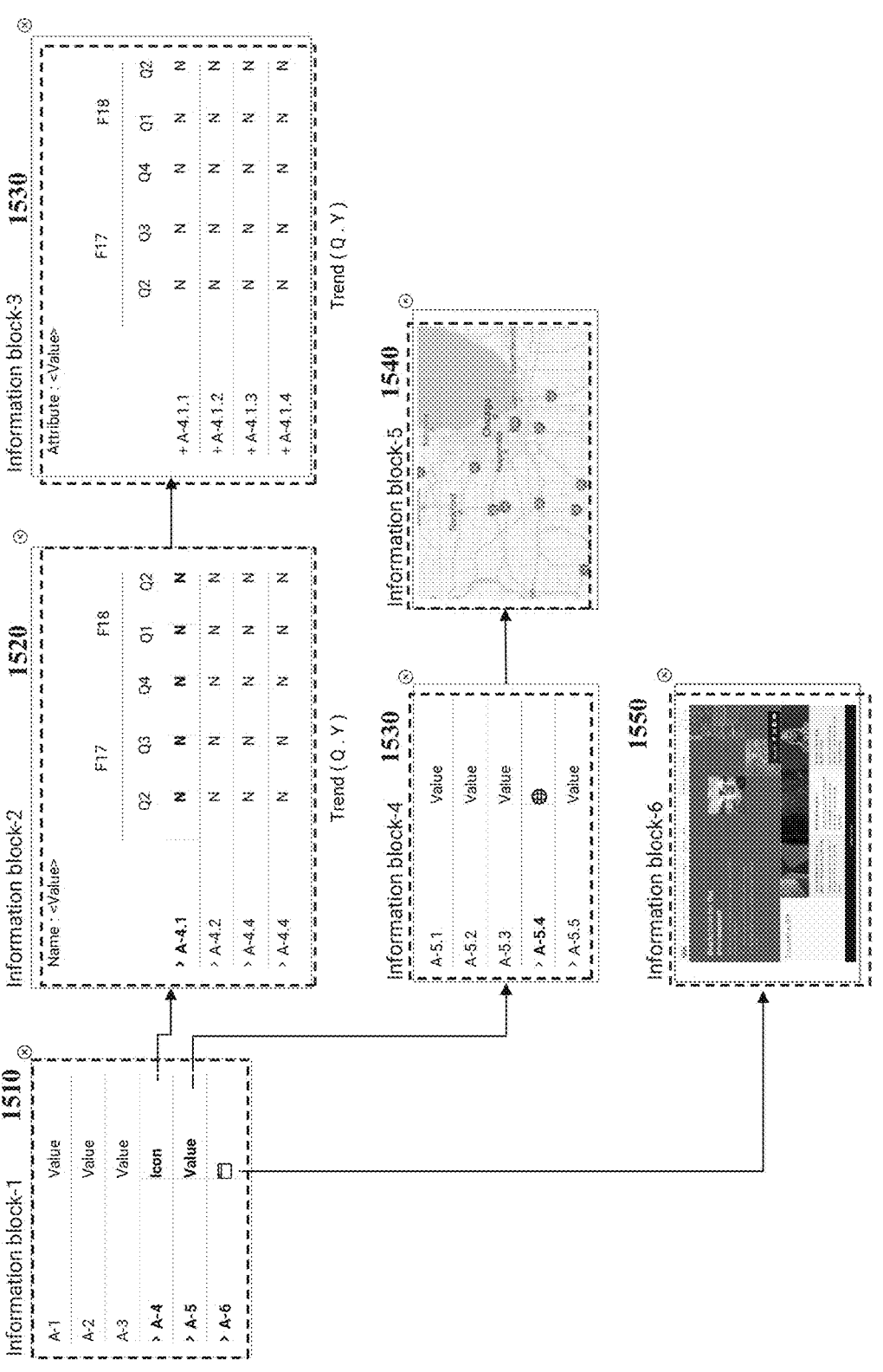
FIG. 15 is a schematic diagram illustrating operational steps of a drill-down, according to an embodiment.

FIG. 15 is a schematic diagram illustrating operational steps of a drill-down, according to an embodiment. FIG. 15 illustrates that a user may efficiently move (e.g., command the analytics server to display information corresponding to) from data block 1510 to data block 1520, 1530, 1530, 1540, and/or 1550. Each data block may contain "N" attributes along with corresponding values (e.g., number, text string, icon, picture, and/or web page address). Each data block may also display the content of a URL (e.g., a web page generated and operated by the analytics server) or a graphical component dynamically populated by the analytics server. For example, data block 1540 displays a geo-map whereas data block 1550 displays a web page containing information on a company. The content of a data block may be displayed using any of the visualization widgets/icon displayed above (e.g., list, table, bar chart, pie chart, diagram, document, or video).

The drilling-down methods are not limited to the embodiments described herein. For instance, some embodiments described herein described the drill-down technique as having two screen portions being dynamically updated based on user interactions. However, in other embodiments the analytics server may create three or more portions where each portion is dynamically populated. Furthermore, instead of right side and left side example described above, the analytics server may use any other configuration (e.g., top half and bottom half or top ⅓ middle ⅓ and bottom ⅓). Moreover, even though the progression of drilling-down techniques are described as the analytics server displaying multiple graphical user interfaces, in some embodiments the analytics server may dynamically relocate data within a graphical component within the same graphical user interface. For instance, when a user drills-down on a component displayed on the right side of the screen, the analytics server may move the right side to the left side and dynamically populate the right side with new data.

In some configurations, the analytics server may also generate and display free-form diagrams. The analytics server may display the free-form diagrams in addition to or as an alternative to the drill-down functionality described herein. For example, a user/administrator may desire to view a free-form diagram instead of drilling down data associated with different domains and other tables.

A free-form diagram may be any diagram or image that is included in the user interfaces described herein. Free-form diagrams may not be generated using widgets described above (e.g., table, chart, or diagram widget). This plane free-form diagrams is useful because some concepts require more complex images and diagrams for explanation purposes. The analytics server may create free-form diagrams with one of many software applications such as POWER-POINT, VISIO, and other visualization software. The analytics server may also generate a scalable vector graphics file using the visual file where the SVG can be repurposed and easily displayed in other graphical user interfaces described herein.

Upon generating the free-form diagrams, the analytics server may generate a menu associated with the free-form diagrams. For example, the analytics server may create an SVG based on a photo of a data center to create a free-form diagram. The analytics server may then create a menu to access information in the data grid (e.g., data center space, data center IT assets, data center network description). The analytics server may use the menu path configuration file to create this menu and may further link the free-form diagram to any other relevant content in the knowledge grid.

Figure 16:
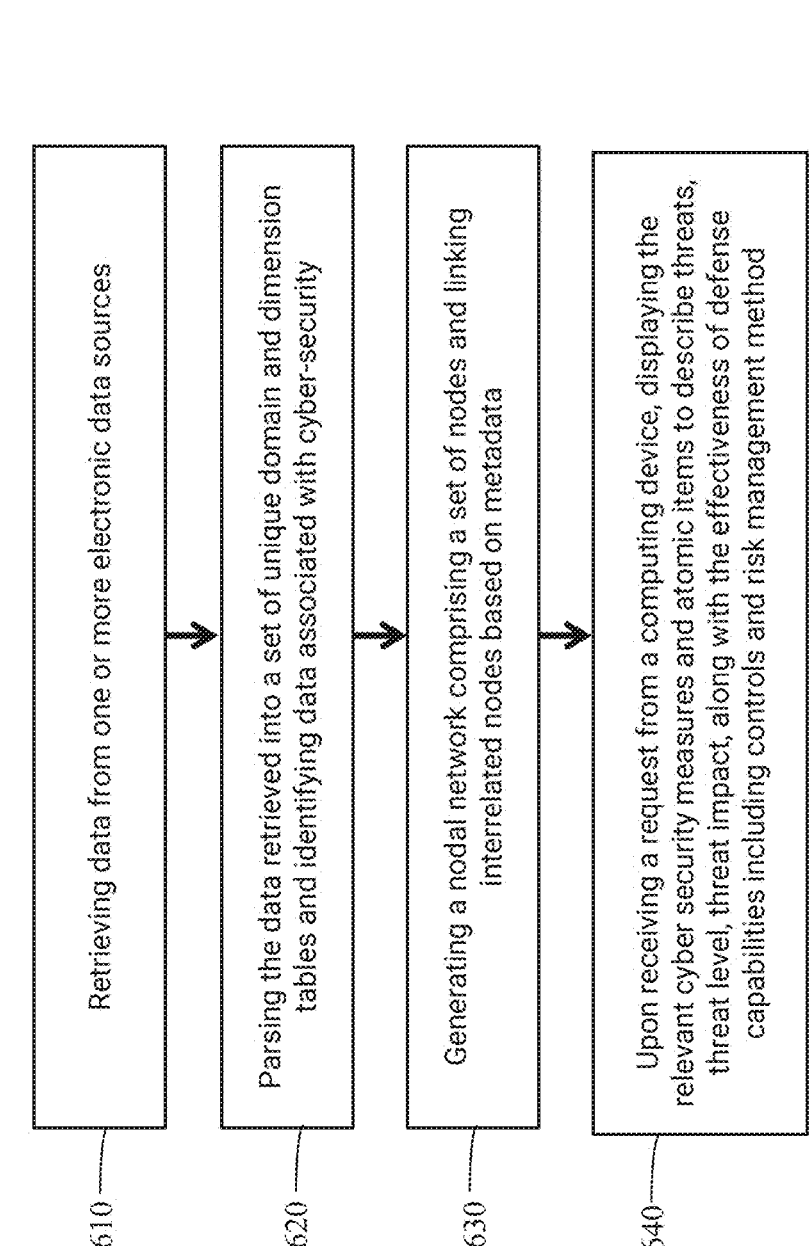
FIG. 16 illustrates a flow diagram of a process executed by an intelligent data analysis system, according to an embodiment.

Referring now to FIG. 16, an embodiment of the methods, systems, and graphical user interfaces described herein is illustrated. More specifically, method 1600 is a flow diagram of a process executed by the intelligent data analysis system, in an embodiment related to cybersecurity data. The method 1600 includes steps 1610-1640. However, other embodiments may include additional or alternative execution steps, or may omit one or more steps altogether. The method 1600 is described as being executed by a server, similar to the analytics server described in FIG. 1. However, in some embodiments, steps may be executed by any number of computing devices operating in the distributed computing system described in FIG. 1. For instance, part or all the steps described in FIG. 16 may be locally performed by one or more user computing devices or an administrative computing device.

Even though some aspects of the method 1600 are described in the context of collecting cybersecurity data associated with banking computing systems, it is expressly understood that method 1600 is applicable to collecting, structuring, analyzing, and visualizing any data.

At step 1610, the analytics server may retrieve data from one or more electronic data sources. As described above, the analytics server may continuously/periodically scan various electronic data sources and electronic data repositories to collect data. The analytics server may scan and/or crawl the electronic data sources to identify all files stored onto the electronic data sources and/or data repositories accessible to the electronic data sources. For instance, the analytics server may transmit an instruction to one or more ATMS where the instruction is configured to cause local databases of the ATMS to transmit all transaction data to the analytics server.

In another example, the analytics server may transmit an instruction to a database associated with a customer-facing website where the instruction is configured to cause the database to transmit all cybersecurity-related data associated with the website, such as all malware detected, a list/log of all failed login attempts, and the like. In another example, the analytic server may crawl one or more employee computers to identify all files accessible/stored onto the employee computers and/or data repositories accessible to such computers (e.g., third party database or a cloud storage system accessible to the employee computers).

In addition to the various examples of data collection described in FIG. 2, the analytics server may also generate a web application or a user-facing interface (e.g., website) allowing users to input data on an ongoing basis. For instance, a user operating a computer (e.g., administrative computer described in FIG. 1) may execute a web application generated by the analytics server to input data (e.g., upload files). The web application may include multiple graphical input components configured to receive data. For instance, the web application may have text input components, radio buttons, drop-down menus, and other input components that allow the user to upload and describe attributes of the data inputted. Upon completion of this task, the analytic server may receive the data and any attributes (if any inputted by the user).

The inputted data may correspond to a wide range of organization's data. For instance, the analytics server may receive data from a branch manager where the branch manager uploads all transactions for a predetermined amount of time (e.g., a day or a week) or a supplier/vendor inputting data associated with services rendered to an organization. For instance, a software vendor may input data associated with different software provided to an organization or a log of malware attacks detected.

The data received (via one or more users directly inputting the data or via the analytic server automatically collecting the data) may also correspond to different categories of data. For instance, data collected may range from project management data to account receivable data to cybersecurity data and other software diagnostics.

At step 1620, the analytics server may parse the collected data into a set of unique domain data tables, each domain data table corresponding to a predetermined domain having a first criterion, wherein the analytics server identifies data associated with cybersecurity activity and generates a unique data table for the cybersecurity domain.

As described above on the analytics server may parse the data and generate different unique data tables (also referred herein as data structures). Each unique data table may correspond to a domain (as described in FIGS. 2-3). Each domain may refer to a category of data. Therefore, each domain refers to a predetermined criterion/attribute of data (e.g., ATM, sales, risk). The analytics server may use a variety of techniques to identify a domain associated with data. For instance, when a user uploads a file, the analytics server may parse the file and identify a domain associated with the file based on the inputted attributes by the user when uploading the file. For instance, when uploading a file, a user may designate the file as associated with cybersecurity. Therefore, the analytics server may generate a unique data table for cybersecurity domain and may assign the file to the cybersecurity domain data table. The analytics server may use different tagging and/or indexing techniques to assign a file to a data structure.

In another example, the analytics server may identify a domain associated with an uploaded file based on the uploaded file's context data. As described above, when collecting data, the analytics server may also collect context data associated with the collected files. The context data may include historical data associated with files and other data collected. Examples of context data may include file title, mime type, file permissions, comments, date/time of creation, and the like. The metadata may also include a unique identifier (e.g., user ID, IP address, MAC address and the like) of the user and/or the computing device who created/ revised/and or accessed the file. Using the context data, the analytics server may identify a domain associated with the collected data.

In a non-limiting example, the analytics server collects a file by crawling databases associated with an organization. The analytics server identifies that the file is associated with cybersecurity domain because the file was created by an employee who is associated with the information technology and/or technical support department. In another example, the analytics server determines that a file belongs to cybersecurity domain because the file title include the word cybersecurity.

In another example, the analytics server may transmit the collected data to a subject team of experts (e.g., integration team) where the experts can identify a domain associated with each file or other data collected. For instance, when the analytics server collects a file, the analytics server may transmit the file to a subject matter expert team by displaying the file on a computing device operated by a subject matter expert. Upon reviewing the file, the subject matter expert may use an application provided/generated by the analytics server to input different attributes associated with the file. For instance, the subject matter expert may designate a file as belonging to the cybersecurity domain.

Once the collected data is identified as being associated with a (or multiple) domains, the analytics server may generate a unique data table where data is organized based on each respective domain. The analytics server may generate one unique domain data table for each domain where the unique domain data table includes all collected data associated with a domain. Therefore, the analytics server may generate as many unique data tables as domains available. In some embodiments, all data associated with a domain may be tagged accordingly using various tagging/indexing techniques.

At step 1630, the analytics server may parse each unique domain data table into a set of unique dimension tables, each dimension data table corresponding to a predetermined dimension having a second criterion. As described above, the analytics server may further disaggregate each unique domain data table into multiple unique dimension data tables. For instance, at step 1620, the analytics server parses and disaggregates the collected data and generates multiple unique domain data tables.

At step 1630, the analytics server may further disaggregate each unique domain data table into multiple unique dimension data tables. The analytics server may identify a dimension associated with the collected data within a unique domain data table based on a predetermined set of dimensions. As described above, each dimension may be defined as having a particular criterion and/or category of data. Therefore, data identified as being associated with a particular dimension will share at least one criterion corresponding to the dimension. A list of different dimensions are provided in FIG. 3A (data structure table 330).

At step 1640, the analytics server, upon receiving an instruction from a user-computing device to display cybersecurity data, may display a multi-dimensional cybersecurity matrix indicating a likelihood of a cyber-attack and an impact value of the cyber-attack. The analytics server may also display relevant cyber security measures and atomic items to describe threats, threat levels, threat impact, along with the effectiveness of defense capabilities including controls and risk management method.

The analytics server, upon receiving an instruction from a user-computing device, may parse the instruction to identify a node associated with the request. The request may be an instruction to display collected data associated with a certain category, domain, dimension, or an event. The analytics server may first parse the request to identify a node or a category of nodes to be displayed. For instance, a user may drill-down to the cybersecurity and request to view cyber-security data associated with an organization or a branch (or any other customizable granular sub-section of an organization, such as a region or a selection of branches). Upon receiving the request from the user, the analytics server may identify one or more nodes related to the request using the methodologies described above.

For instance, when the analytics server identifies that the user has requested to view all cybersecurity threat data associated with branch X, the analytics server may then identify any node associated with "branch X" and "cyber-security." The analytics server may also identify any related nodes by identifying one or more linked nodes. The analyt-ics server may identify the following categories of data relating to cybersecurity and/or cyber-attacks that are also designated to be related to branch X: malware targeting customers, ransomware for workstations, denial of service attack, mobile malware, ransomware for network, malware targeting banks, physical ATM attacks, malware ATM attacks, information leak, data espionage, data sabotage, and data exfiltration.

Upon identifying the requested nodes and other related nodes, the analytics server may retrieve data associated with the identified nodes and may analyze the retrieved data using predefined rules/models. In some embodiments, the analyt-ics server may also use additional (or third party) analytical modeling to analyze the retrieved data. The analytics server may also use pre-mapped relationships (e.g., knowledge from other branches and/or other domains) to identify a likelihood or an impact value for different cyber-attack protocols/methods for branch X. For instance, if branch Y has similar attributes (e.g., number of employees, amount of transactions, or amount of network activity), the analytics server may use pre-mapped relationships between cyber-activity related to branch Y to predict cybersecurity threats for branch X.

Referring now to FIG. 17, a flow diagram of a process executed by the intelligent data analysis system is illus-trated, according to an embodiment. The method 1700 includes steps 1710-1750. However, other embodiments may include additional or alternative execution steps, or may omit one or more steps altogether. The method 1700 is described as being executed by a server, similar to the analytics server described in FIG. 1. However, in some embodiments, steps may be executed by any number of computing devices operating in the distributed computing system described in FIG. 1. For instance, part or all the steps described in FIG. 17 may be locally performed by one or more user computing devices or an administrative comput-ing device. Furthermore, even though some aspects of the method 1700 are described in the context of collecting and analyzing data associated with banking computing systems, it is expressly understood that method 1700 is applicable to collecting, structuring, and analyzing any data.

As described above, the analytics server may collect data from various computing devices and electronic data sources to generate a nodal network (knowledge grid). Having this nodal network and organizing the data according to the various data tables described herein (e.g., domain tables, dimension tables, and various fact journals described herein) allows the user to navigate vast structured and/or unstruc-tured data in a more systematic and efficient manner than possible with conventional methods and systems. In addition to structuring the data and as described in method 1700, the analytics server may also create relationships and identify insights using the data structure described above. These insights may be generated in a systematic and standardized method and may be used cross entities and/or domains.

The analytics server may generate mental models and/or physical data models to better create insights and apply those insights to data. For instance, a user may request the analytics server to analyze how a marketing campaign has affected sales in a specific branch. The analytics server may implement the methods and systems described herein (e.g., method 1700) to analyze relevant portions of the nodal network and develop insights. The analytics server may also apply the mental models to other domains. For instance, the analytics server may generate a domain-specific mental model comprising related nodes and data tables that repre-sent an analytic solution. The analytics server can execute analytical protocols to develop insights by using data cor-responding to the mental model. Once the mental model is developed and iteratively refined, the analytics server may use this model to identify insights for other domains. The analytics server may also use the mental model to collect data more efficiently.

The nodal network is a logical data model that is created using various data structures described herein. On the other hand, the mental model is a framework to understand insights from the data stored within the nodal network. The mental models are illustrated using diagrams described herein (e.g., widgets or free form). In some configurations, the analytics server may link the nodal network (logical data model) to provide facts to support the understanding of the given mental model. The same approach may also be used for methods (e.g., steps to solve a problem). Finally, physical data models consist of the technical implementation of the logical data model using an existing software platform (relational database systems (RDMBS) or big data tools, such as HADOOP HIVE). A mental model is a data model (e.g., nodal structure) of a specific problem domain expressed independently of a particular database manage-ment product or storage technology but in terms of data structures such as relational tables and columns, object-oriented classes, or XML tags.

Even though this disclosure refers to different models as mental models, it is expressly understood that these models are computer-generated and are utilized by the analytics server to artificially replicate human understanding and intelligence. Therefore, these models are collections and subsets of data nodes described in FIGS. 1-4. The data models described herein comprise a set of tables populated with data collected and represented by the nodal network described in FIGS. 1-4.

At steps 1710-20, the analytics server may disaggregate the data into a set of data tables (e.g., domains). The analytics server may parse the data within the nodal network (e.g., retrieved from various electronic sources) or other collected data to generate a set of uniform data tables. The analytics server may parse and disaggregate the collected data into a set of unique domain data tables, each domain data table corresponding to a predetermined domain having a first criterion. Furthermore, the analytics server may also parse and disaggregate each unique domain table into a set of unique dimension tables, each dimension data table corresponding to a predetermined dimension having a sec-ond criterion.

Disaggregation of data into different data tables is described in FIGS. 3A-B. For instance, the analytic server may first determine one or more domains applicable to the collected data. A domain is a category of collected data or
knowledge. The domain table in FIG. 3A illustrates different
domains categories used to subdivide data into different
domain tables. Once the data is distributed among one or
more domain tables, the analytics server may further dis-
tribute the collected data among five building blocks. For
instance, collected data that belong to ATM domain is
further divided among information, dimensions, analytics,
archive, and grid building blocks, as depicted in building
blocks 320. Different domains described in the domain table
310 may represent different categories of data satisfying a
specific predetermined criterion. For instance, the customer
journeys domain may refer to all data related to user
experiences of customer-facing applications (e.g., customer-
facing website and/or other electronic applications). There-
fore, all data within the data table corresponding to the
customer journey will satisfy this criterion. In another
example, ATM domain may refer to all collected data
relevant/associated with ATMS. Therefore, all collected data
parsed, by the analytics server, into the ATM domain table,
will share at least that one criterion.

Referring now to FIG. 18, table 1800 includes a graphical
representation of multiple domains. Table 1810 represents a
non-limiting example of domains to which different files are
assigned. The analytics server may assign a domain to the
data collected/retrieved. Therefore, in some configurations,
the analytics server may assign all data (e.g., each collected
file) to a domain identified in table 1810. As described
throughout this disclosure, the analytics server may continu-
ally/iteratively execute various protocols to divided and
disaggregate data into different domains and domain tables.
Therefore, the method described in step 1710 may be
continuously executed by the analytics server.

The analytics server may also specify a measure catalog
for each domain to organize measures into logical group-
ings. Upon identifying the relevant domains, the analytics
server may also identify relevant measure catalogs (MCs)
for each identified domain. A catalog of measure or measure
catalog is implemented for each domain. MCs allow the
analytics server to quantify the absolute and relative size of
concepts. Non-limiting examples of MCs include revenue
expenses net income, number of facilities, number of ATMs,
gross loans and acceptance, write-offs, provisions for credit
losses. For each domain, MCs may be implemented in a fact
catalog. A fact catalog is associated with each MC to update
the value of measures over time. MCs may also be associ-
ated with different dimension tables (DTs) to enable users to
pivot, filter, and drill-down. For instance, MCs of Full time
equivalents (FTEs that indicate the hours worked by one
employee on a full time basis) is associated with the fol-
lowing dimensions: organization unit, job family, grade
level, and location. In some configurations, MCs may be
specified by an administrator. For instance, an administrator
may assign various MCs for each domain or other data table.

Figure 19:
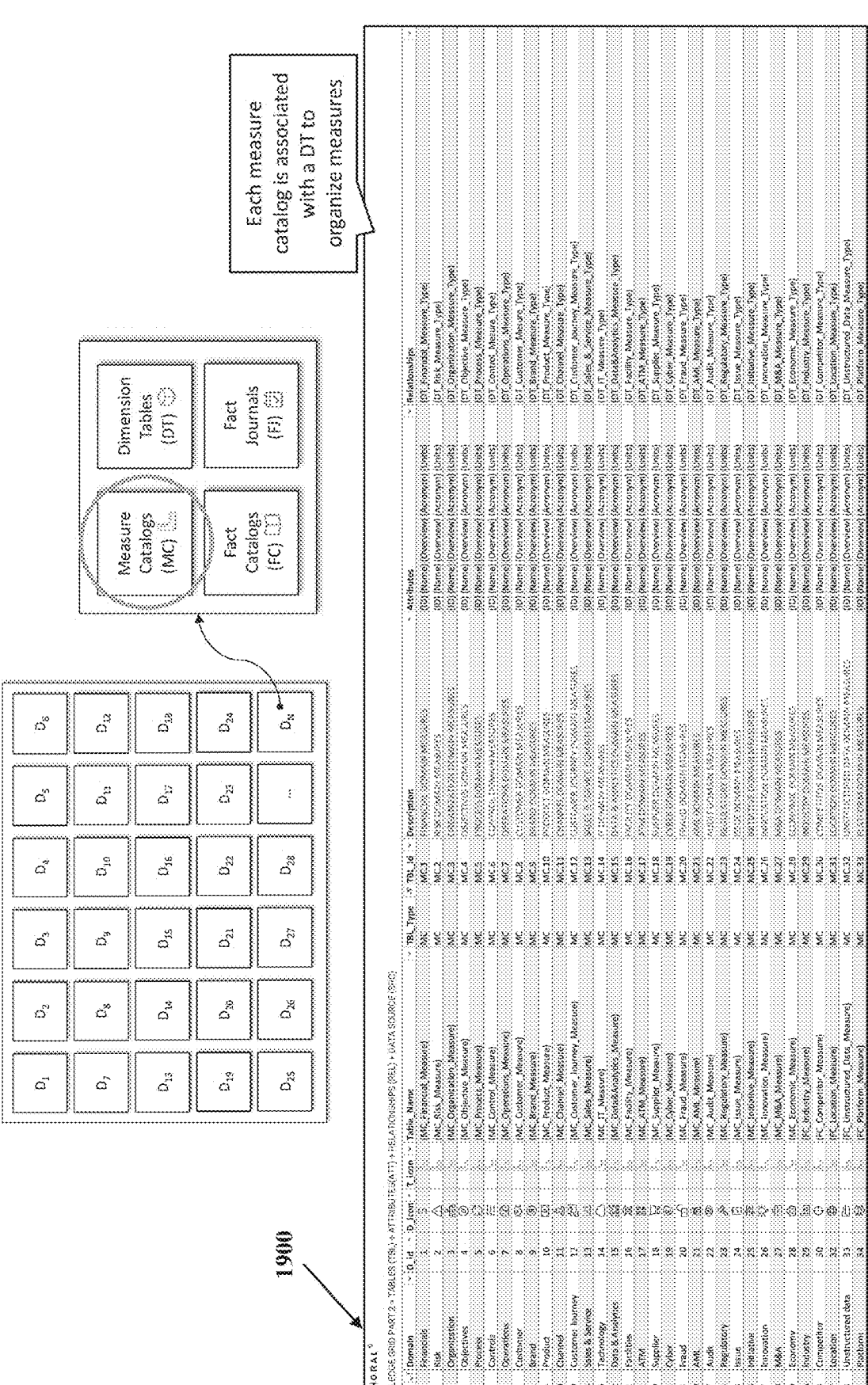
FIG. 19 illustrates a graphical representation of different data tables within a nodal network, according to an embodiment.
Figure 21:
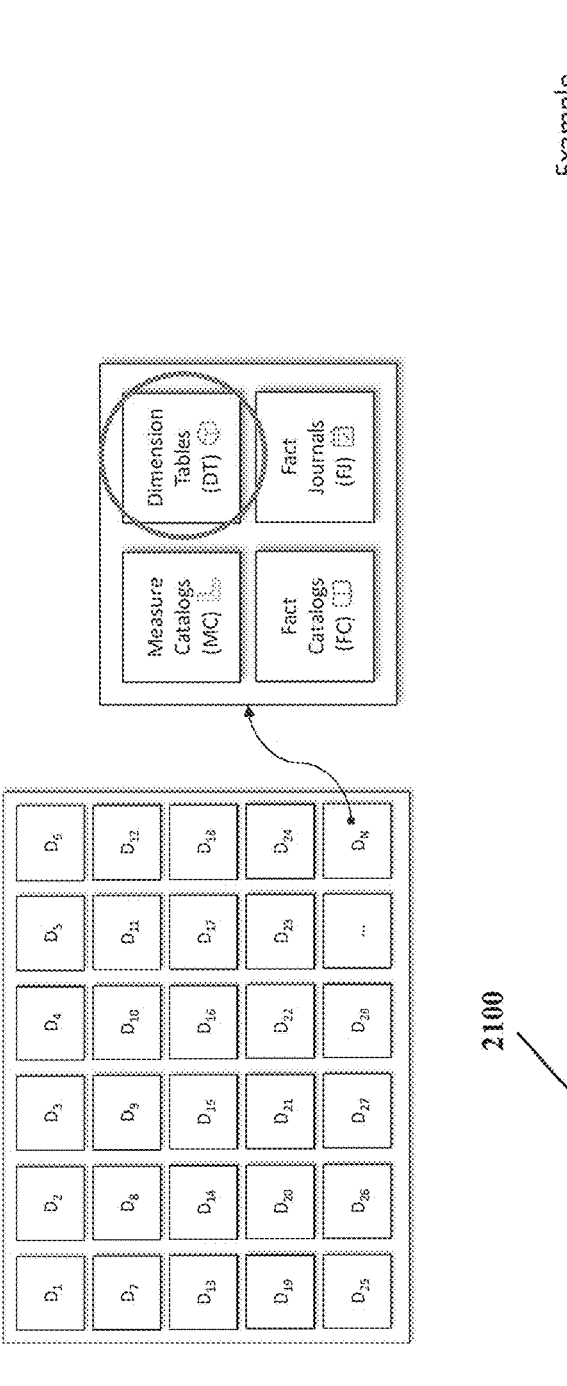
FIG. 21 illustrates a graphical representation of different data tables within a nodal network, according to an embodiment.
Figure 22:
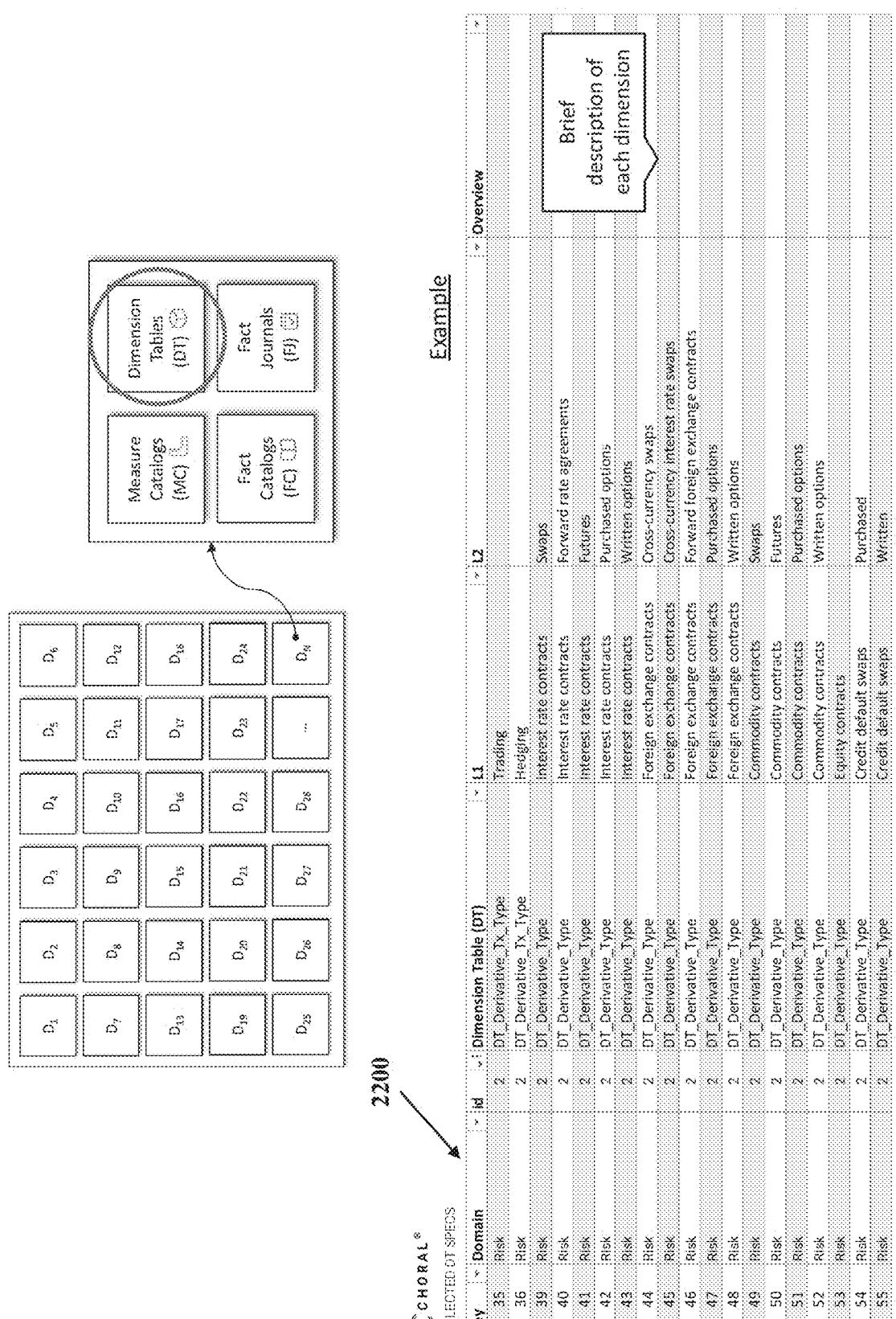
FIG. 22 illustrates a graphical representation of different data tables within a nodal network, according to an embodiment.

FIG. 19 illustrates a non-limiting example of MCs iden-
tified by the analytics server, according to an embodiment.
Table 1900 illustrates different MCs related to a domain.
Table 1900 also describes attributes of each MC. For
instance, the financials domain (key No. 1) may have a
domain id, domain icon, table name (MC_financial_mea-
sures), table type (MC), table ID (MC_1), description (fi-
nancial domain measures), attributes (name, overview, acro-
nyms, units), and relationships
(DT_Financial_Measure_Type). The analytics server may
use the description to tag the collected data accordingly and
link them to different MCs. FIG. 20A illustrates another
example of MCs where the analytics server uses the MCs to retrieve/compute the measure value. Additional examples of
MCs are also illustrated in FIG. 20B. Referring now to FIG.
21-22, tables 2100 and 2200 illustrate different domain
tables to be selected by the analytics server, as described
above.

Figure 23:
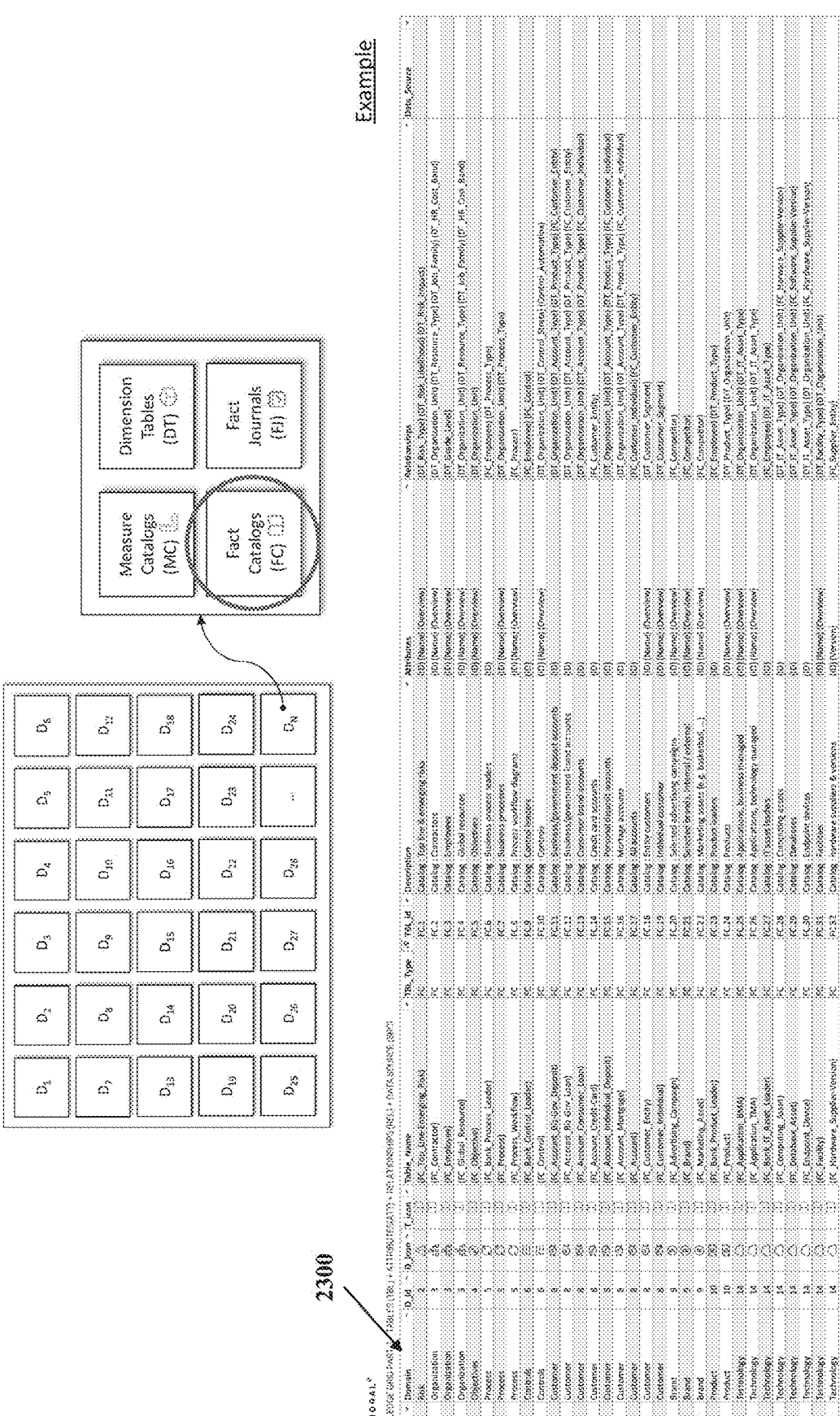
FIG. 23 illustrates a graphical representation of different data tables within a nodal network, according to an embodiment.

Referring now to FIG. 23, table 2300 illustrates different
fact catalogs related to different domains. As described
above, the analytics server may further disaggregate the
collected data to identify different fact catalogs related to
each request. As depicted in table 2300, different fact
catalogs may have different attributes and relationships. The
analytics server may use these relationships to efficiently
retrieve data and to create a mental model by identifying
related data (e.g., related data tagged as associated with
other fact journals, DT, and other data tables). For instance,
employee fact catalog (table ID FC_3) is related to organi-
zation domain (DT_ID 3 and Table name FC_Employee).
The employee fact catalog may also be related to other
dimension tables and their corresponding fact catalogs, such
as DT_Grade-Level.

Figure 24:
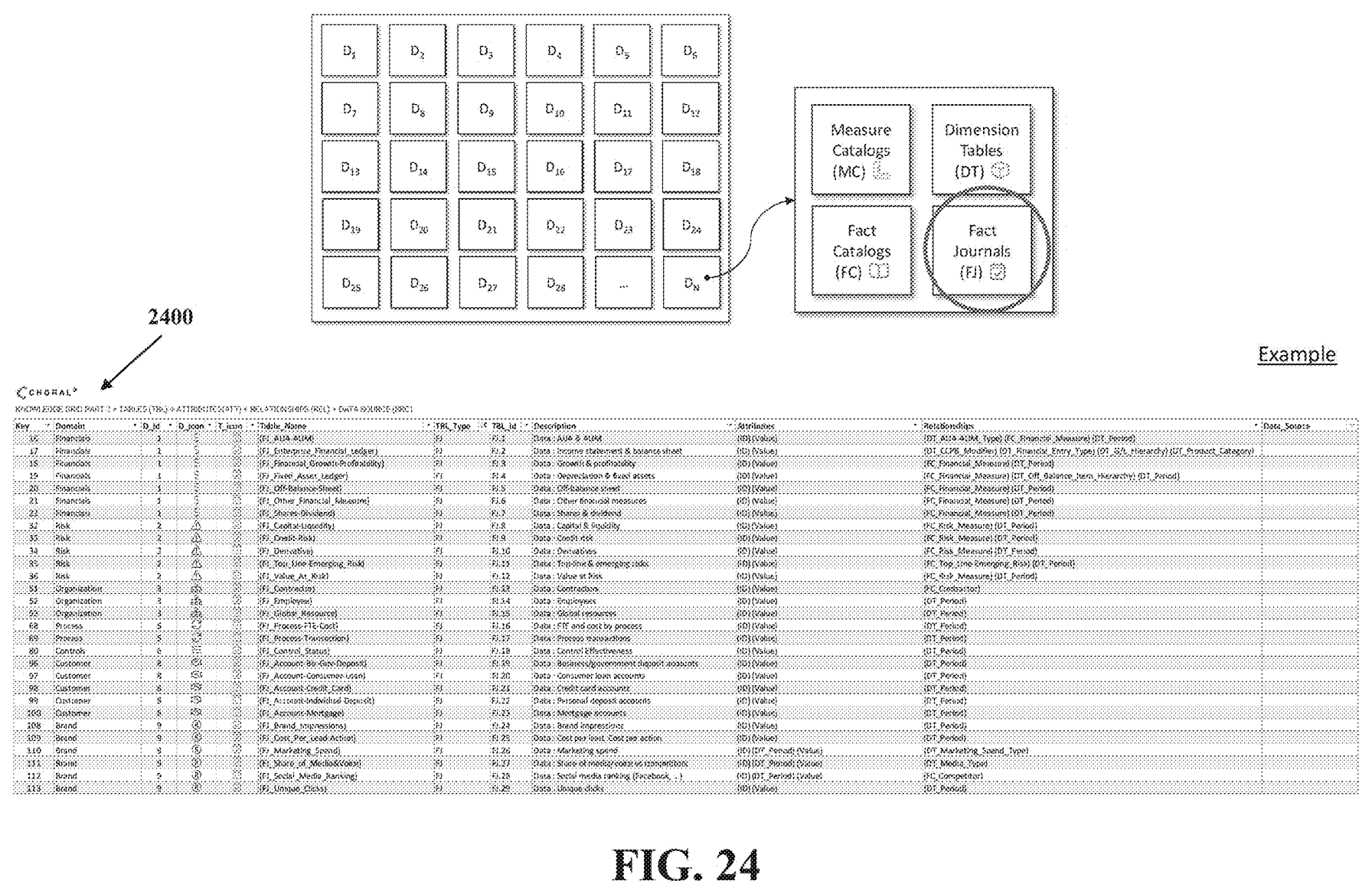

Referring now to FIG. 24, table 2400 illustrates different
fact journals related to different domains. As described
above, the analytics server may further disaggregate the data
(e.g., data corresponding to the nodal network and/or the
request) to identify different fact journals related to the
collected data. As depicted in table 2400, different fact
journals may have different attributes and relationships. The
analytics server may use these relationships to efficiently
retrieve data and create a mental model by identifying
related data (e.g., related data tagged as associated with
other fact journals, DT, and other data tables). For instance,
capital liquidity fact journal (table ID FJ_8) is related to the
risk domain. The capital liquidity fact journal may also be
related to other dimension tables and their corresponding
fact catalogs, such as DT_Risk_Measure and (DT_Period).

Referring back to FIG. 17, at step 1730, the analytics
server may generate an analytics solution model (mental
model) using the identified related data tables. The analytics
server may generate a set of nodal networks comprising a set
of nodes where each node represents at least a portion of the
retrieved data, each node having metadata comprising a
unique identifier corresponding to a unique domain table and
a unique dimension table corresponding to data associated
with each node, wherein the one or more nodes within each
nodal network is linked based on its respective metadata.
The analytics server may generate an analytical solution for
different categories by linking different nodes representing
data within the identified data tables (steps 1710-1720).
Accordingly, a mental model is a computer model compris-
ing a subset of nodes that are linked together for a common
purpose (e.g., analyzing a specific domain or satisfying a
request/category). For instance, a mental model may be
tailored towards identifying how money spent on marketing
has affected sales. Another mental model may be directed to
identifying cybersecurity shortcomings. As described above,
the analytics server may store context data (e.g., a related
data table) as metadata to a collected file.

The analytics server may translate the related data tables
into a mental model using SQL tables that define indexes,
attributes, and relationships between the collected data. The
analytics server may generate multiple SQL tables that
define the mental model by describing how various data
tables (e.g., DTs, FCs, FJs, and their corresponding data
nodes) are related. Referring now to FIG. 25, SQL table
2500 illustrates an example of an SQL table that identifies
how different data tables are related. SQL Table 2500 is a formulaic representation of a mental model because it identifies how various data tables can be analyzed.

Figure 26A:
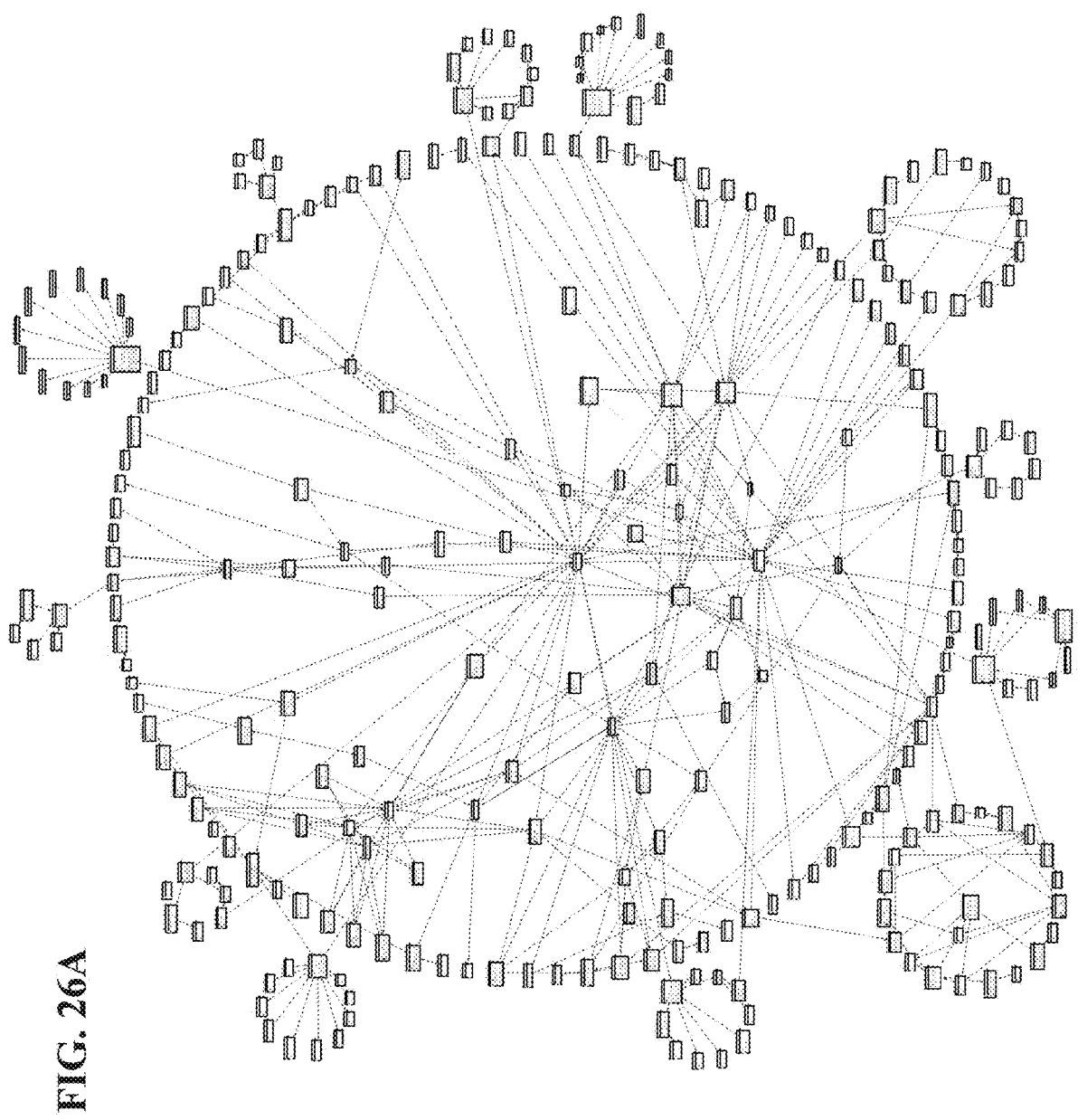
FIG. 26A-B illustrate a visual representation of a mental model, according to an embodiment.

Referring now to FIG. 26A, a graphic representation of a mental model is illustrated. Mental model 2600 represent how different dimension tables, fact catalogs, fact journals, measure catalogs, and unstructured data catalogs are interconnected. For instance, every rectangle represents a dimension table, every circle represents a fact journal and every triangle represents a fact catalog or measure catalog. Upon identifying relevant data tables to an analytical request/problem, the analytics server may generate a nodal structure specific to that analytical request/problem. The mental model 2600 is a representation of how different data tables relevant to a request are connected. Therefore, the mental model 2600 is a nodal structure (similar to the nodal structure described in FIGS. 2 and 3A-B and referred to as the knowledge grid) that is specific to a request, category, or problem.

Figure 26B:
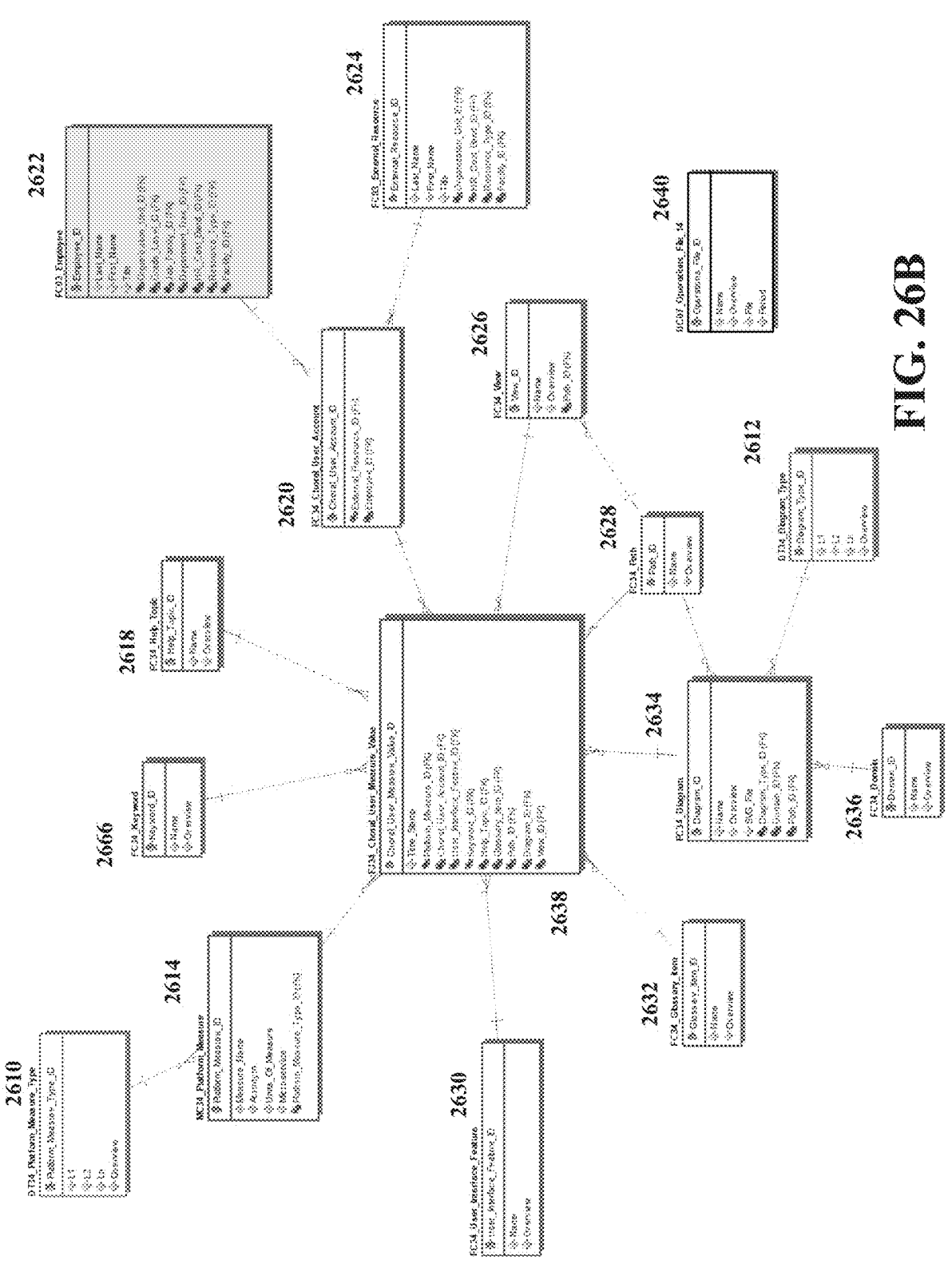

FIG. 26B is another graphical representation of how the analytics server connects different data tables in order to generate the mental model or the analytical solution. To clarify the mental model 2600, a limited number of interconnected data tables are illustrated in FIG. 26B. However, it is expressly understood that data tables illustrated in FIG. 26B are only a small and limited portion of the mental model 2600. Upon identifying relevant data tables, the analytics server may use tagging/indexing or other methodologies to create relationships between different nodes that represent data within each data table. For example, the analytics server may generate various SQL tables that designate and define relationships between the identified tables. FIG. 26B visually illustrates these connections and relationships. For instance, domain tables 2610 and 2612, measure catalog 2614, fact catalogs 2616-2636, unstructured data tables 2640, and fact Journal 2638 are interconnected as part of a mental model.

As illustrated, not all data tables are connected to each other. For instance, domain table 2610 is only connected to measure catalog 2614, which is connected only to fact journal 2638. However, domain tables 2610 is not connected to other fact journals or data tables. On the other hand, fact catalog 2628 is connected to fact catalog 2634, fact catalog 2626, and fact Journal 2638. By minimizing the number of connections, the analytics server may increase efficiency of data retrieval and/or analysis.

In some configurations, the analytics server may generate one or more mental models for various requests, problems, and/or categories. For instance, the analytics server may generate a mental model specific to understanding how sales affects productivity and another mental model specific to understanding levels and types of fraudulent cyber activity. Upon receiving a request from a user, the analytics server may retrieve a mental model associated with the request and analyze the data according to the data tables/relationships described within the retrieved mental model. For instance, if the analytics server receives a request regarding analyzing the effects of marketing on sales, the analytics server may retrieve a mental model specific to marketing and sales and may analyze the data represented by the nodes within the retrieved model. In this way, the analytics server can efficiently analyze data only specific to the requested category, which allows the analytics server to provide responses faster, more efficiently, and using less computing power.

Data tables identified within mental models may also define how data is to be collected, extracted, analyzed, and/or verified. For instance, a data table may define one or more data adapters that define how and from where data is to be collected. The analytics server may use the data adapters (e.g., application programming interfaces) to extract data from various data sources (both internal and external). The data adapters may connect to the data sources (e.g., database, application, and/or micro service data sources). For example, when an entity has multiple databases of different types (e.g., ORACLE, MICROSOFT, or IBM), a large amount of data is available externally through micro services, external APIs, and electronic listeners. A data table within the nodal structure and/or a mental model may identify and describe the micro services connected to those external data sources, whereby the analytics server may efficiently collect data from the identified micro services. The analytics server may also use the data adapters to efficiently load the collected data onto the nodal structure and/or the mental model. When the analytics server collects data using a defined data adapter, the analytics server may load data in accordance with descriptions of the data adapter.

In a non-limiting example, a domain table may define one or more data adapters. The data table may define an application-programming interface connected to an internal database configured to monitor sales figures for a branch. The data table may also include a micro service configured to monitor FTEs in an external accounting database. The data table may also designate a related data table (e.g., FC or FJ) associated with the data collected from each data adaptor. The analytics server may then automatically collect the data using the defined adaptors and tag/index the data accordingly (e.g., translate the data).

The analytics server may also use the adapters to validate data. For instance, each data table may define a set of validation rules to determine if the data collected via an adapter is valid. For example, if certain required fields in a table are missing for several items (rows), the adapter may generate a message in the administrative console to inform an administrator of the analytics server that the data collected via a particular adapter is not valid or needs to be reviewed. The analytics server may also generate an automatic message and transmit the collected data (that is purportedly not valid) to the administrator's computer and display a prompt to the administrator requesting a second level review of the collected data.

As depicted in FIG. 26B, the mental model may also define how to translate the collected data into different data tables. For instance, a DT may include a set of adapters and identify how, from where, and when to collect data. The DT may also identify how to translate data into related data tables (e.g., FCs and/or FJs). Translation of data refers to mapping data and its attributes to different tables. For instance, the analytic server may translate the data and map the data to the appropriate data table based on pre-configurations and set of rules received from each data table. As described above, these translation rules can be populated within the mental model. For instance, the SQL table corresponding to a mental model may include a set of translation rules.

The analytics server may use the translation rules to assign a data table (e.g., FC, FJ, and/or MC) to the collected data. For instance, the analytics server may retrieve attributes of each fact catalog (e.g., table 2300 in FIG. 23). The analytics server may use these attributes to populate each row of the SQL data table (e.g., the SQL file that represents the mental model) when data is collected. For instance, facilities data, data on applications, data on IT infrastructure assets may be designated to a particular fact catalog because of their attributes (e.g., content, source, and timestamp). When the analytics server identifies that a file or other collected data has an attribute consistent with the translation rules, the analytics server may designate the file accordingly. In another example, the analytics server may retrieve attributes of each fact journal (e.g., table 2400 in FIG. 24). The analytics server may also use these attributes to populate each FJ row of the SQL data table.

At step 6040, the analytics server may parse the request to identify one or more nodes and/or domains tables associated with the request. Upon receiving a request from a user-computing device, the analytics server may parse the request to identify a nodal network associated with the request. The analytics server may receive a request from the user to identify insights by analyzing the data collected from an entity. The analytics server may use a variety of technologies to identify different nodes (or categories) associate with the request. For instance, the analytics server may execute a natural language processing protocol to identify words and phrases used in the request. In some configurations, the analytics server may receive the categories of the request from the user. For instance, an administrator may select one or more domain tables, FJs, FCs, and/or MCs as related to a request. In some configurations, the analytics server may automatically identify these data tables.

Figure 27:
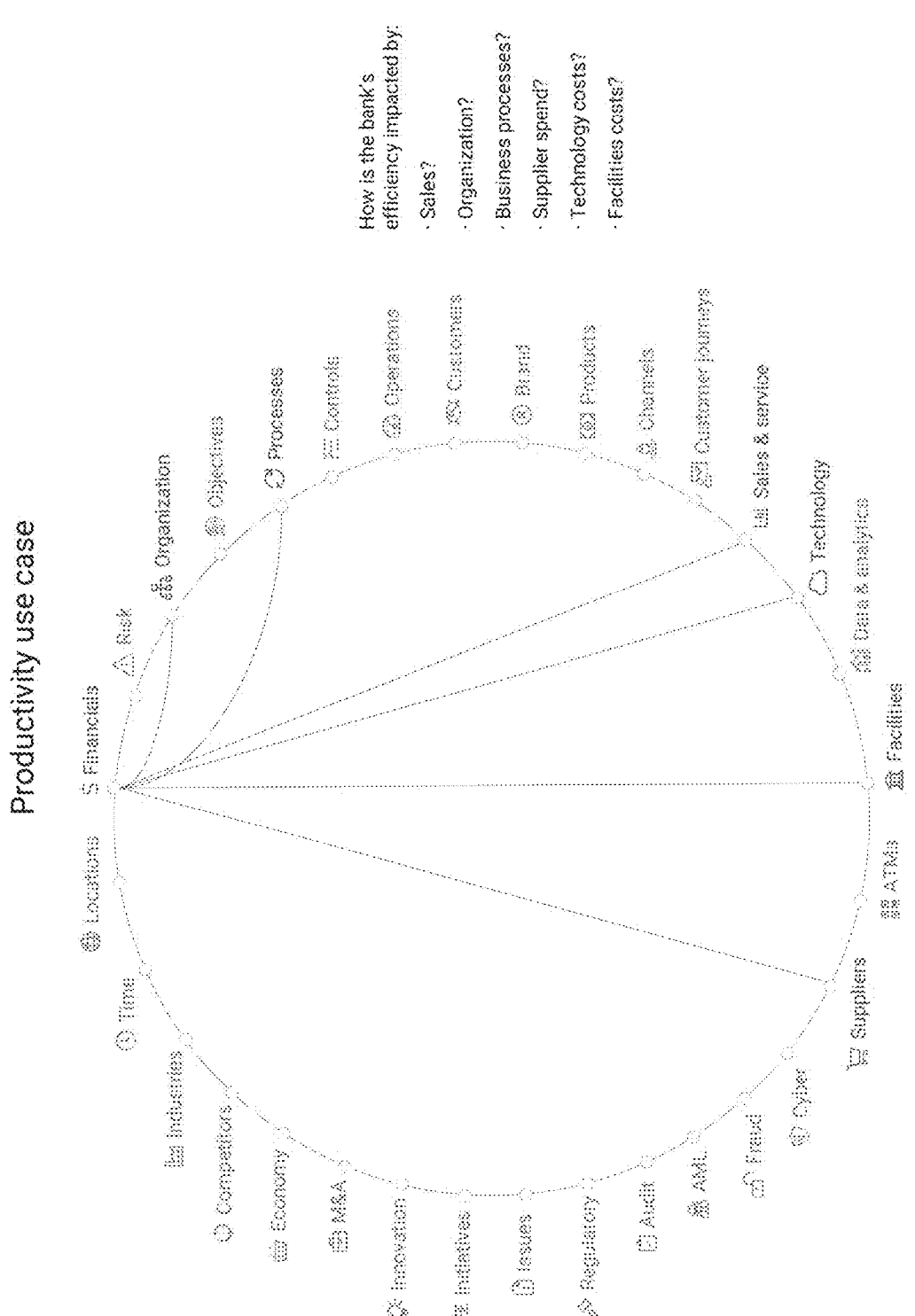
FIG. 27 illustrates examples of identifying the relationships between request and different domains, according to an embodiment.
Figure 28:
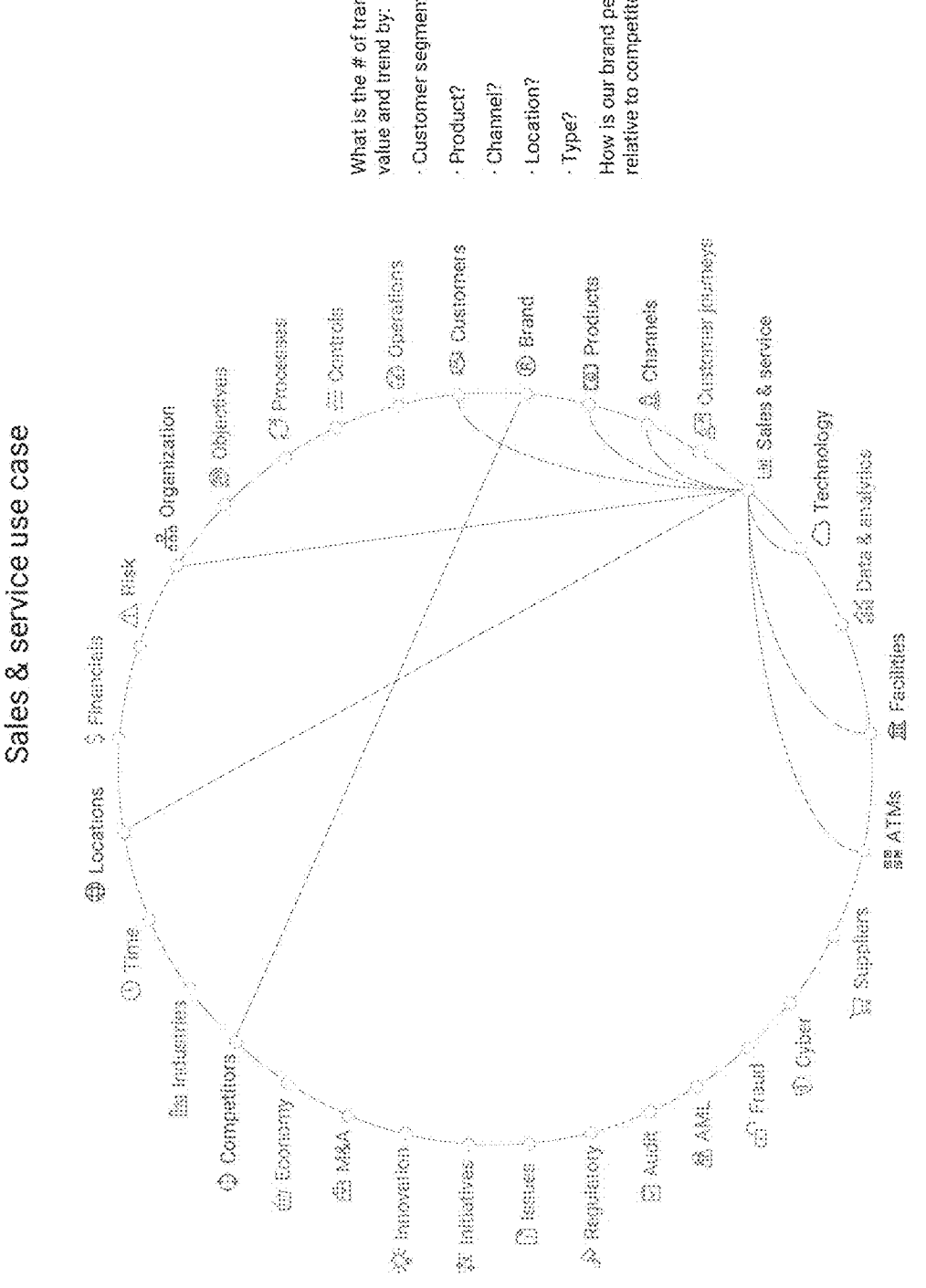
FIG. 28 illustrates examples of identifying the relationships between request and different domains, according to an embodiment.

Referring now to FIGS. 27-29, examples of the analytics server identifying the relationships between request and different domains are illustrated. While these non-limiting examples illustrate how the analytics server identifies related domains, each figure illustrates requests pertaining to a different category. For instance, FIG. 27 illustrates domains related to "productivity," FIG. 28 illustrates domains related to "sales and customer experience," and FIG. 29 illustrates domains related to "cybersecurity and financial crimes."

As depicted in FIG. 27, when the analytics server receives a request ("how is the bank's efficiency impacted by technology cost"), the analytics server identifies that the request is related to the "technology" and "financial" domains. In another example and depicted in FIG. 28, when the user requests "how is our brand performing relative to competitors' brands?" the analytics server identifies the "competitors" and "brand" domains to be relevant to the user's request. In some configurations, the analytics server may also identify "sales" as a relevant domain. In yet another example and as depicted in FIG. 29, when the analytics server receives the depicted request ("How many IT/data assets do we have? Which ones are high value?"), the analytics server identifies "technology," "data & analytics," and "ATMs" domains as related to the user's request.

Figure 30A:
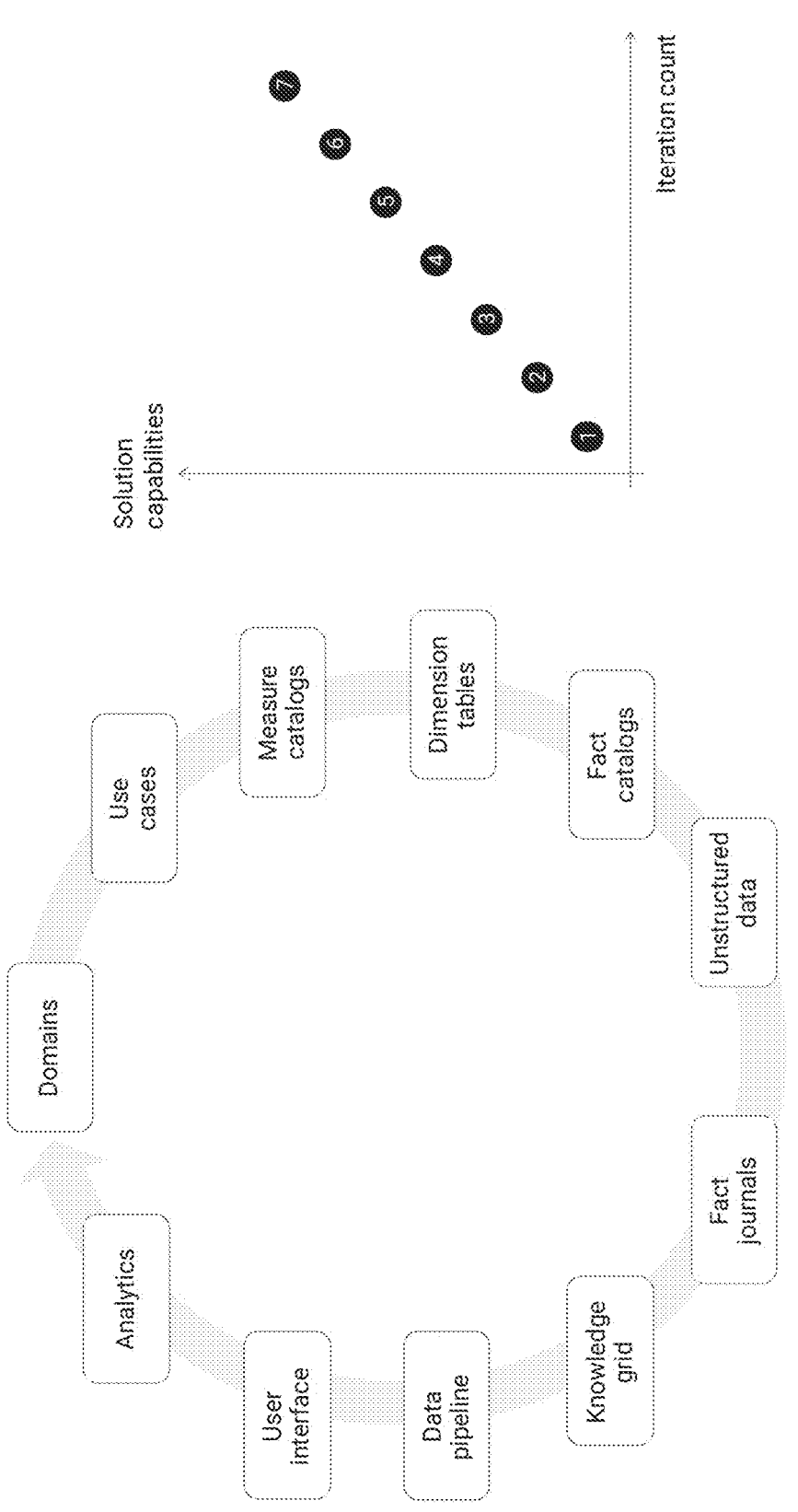
Figure 30C:
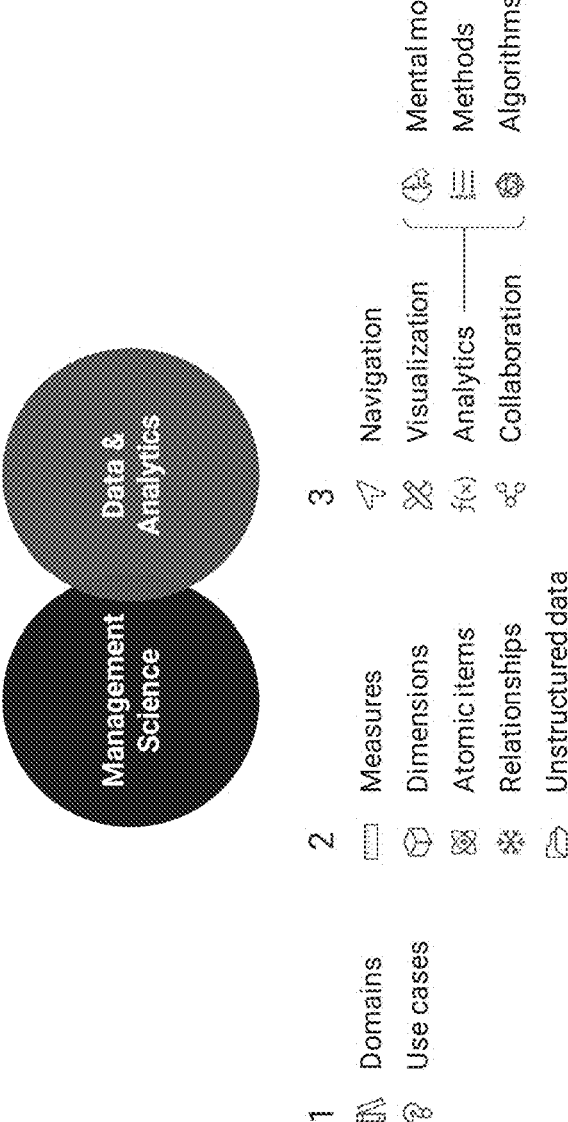
Figure 30D:
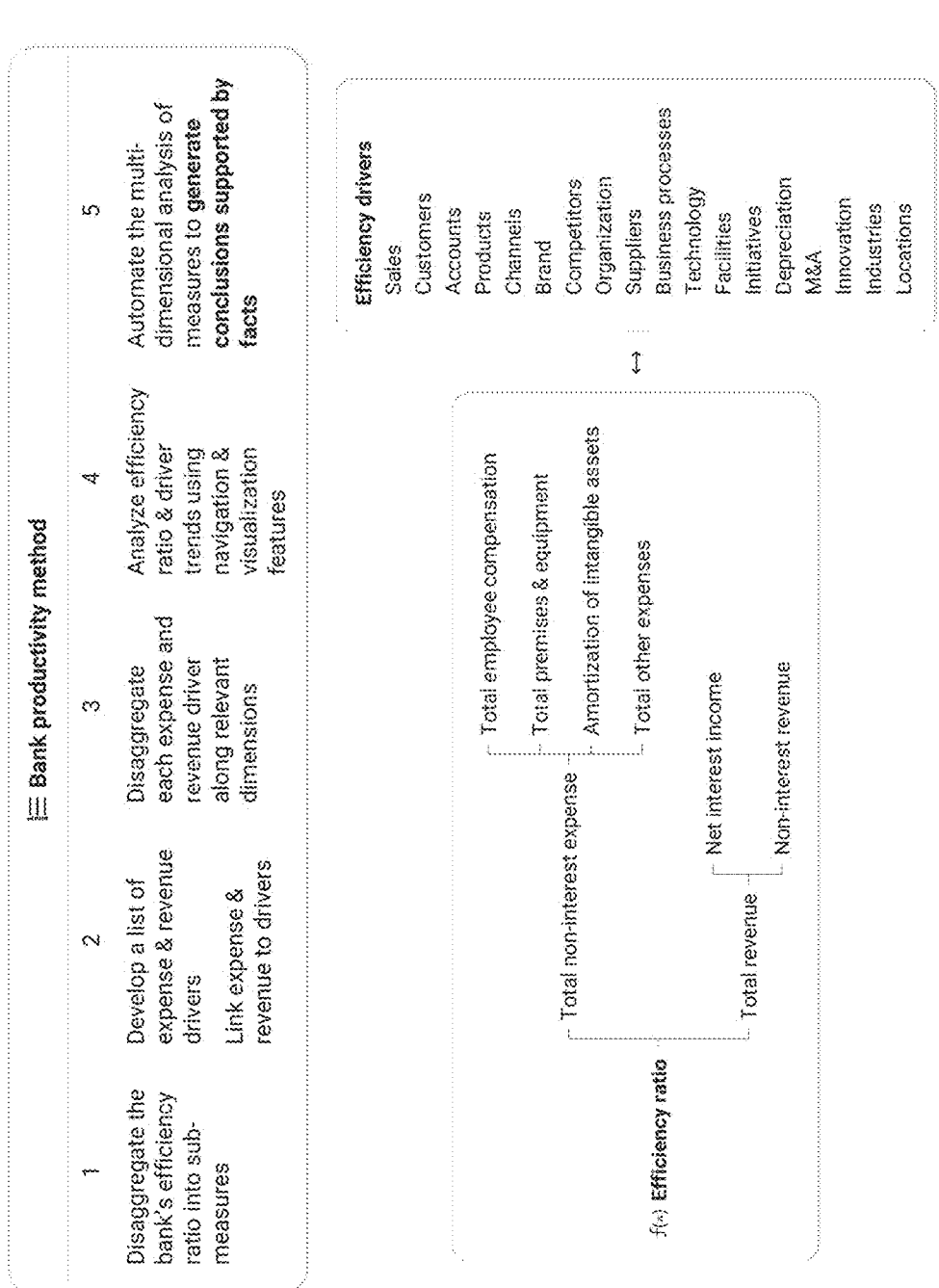

Referring back to FIG. 17, at step 1750 and as depicted in FIGS. 30A-D, the analytics server may iteratively analyze the data in accordance with the mental model and refine the solution by repeating the above-described steps. The analytics server may iteratively execute an analytical protocol on the data corresponding to the nodes within the identified nodal network. The analytics server may also display, on a graphical user interface of the user-computing device, data associated with the execution of the analytical protocol. FIGS. 30B-D illustrate an overall flowchart of how the method 1700 (also referred to as the method) operates and how the analytics server generates the analytic solution (e.g., analytics model or the mental model).

Given the complexity of the request, volume of data collected from disparate data sources, and different attributes of collected data, conventional software solutions have failed to provide efficient results. For instance, query-and-analyze methods utilized by conventional software solutions have faced great technical challenges because they attempt to satisfy user requests in a single step. The systems and methods disclosed herein use an iterative approach to solve complex problems/request more efficiently (using a multi-step approach where value is created at each step).

The analytics server may implement the methods and systems described herein through a series of steps. For instance, the analytics server may execute an analytical protocol that review the data corresponding to the identified mental model(s) to calculate results. At each step, one or more parts of the intelligent data analysis system are enhanced to make the system more powerful. In a non-limiting example, with each iteration the analytics server may add measures and measure groups to different data tables. This enhances the scope of analysis.

The analytics server may also add a dimension with each iteration, which enables analysis of the existing knowledge grid with additional pivots, filters, and drill downs, enabling further insights into the data. With each iteration, the information captured in journals may be enhanced. For example, the analytics server may generate and capture additional fields in the journal of transactions or events. Moreover, additional journals may be added to collect new types of transactions and events. With each iteration, the analytics server may enhanced the information attached to each atomic item (e.g., attributes for each customer and/or attributes for each employee). With each iteration, additional views, diagrams, mental models and/or methods may be added. Furthermore, the analytics server may update the navigation system (Path) with each iteration to provide users with additional ways to traverse the knowledge grid or the nodal structure. In a non-limiting example, the analytics server may iteratively assign the collected to different data tables where with each iteration, the analytics server assigns the collected data to an additional data table. For instance, during the first iteration, the analytics server may assign a file to a dimension, during the second iteration, the analytics server may assign the same file to a FC.

In some configurations, an atomic item refers to an FC. Atomic item catalogs are catalogs that contain concepts of the following types:

people: employees, contractors, global resources, customers, and individuals;

entities: customer-entities, suppliers, regulators, and competitors;

things: facilities, and ATMs;

abstract concepts: risks, regulations, applications, controls, and processes;

atomic items enable the analytics server to drill-down features (e.g., domains) to the most granular level. For instance, the analytics server may drill-down measures number of FTE by first reducing the number of FTEs as follows:

number of FTE by type: employees and contractors reduced by DT (resource type)

number of FTE by location: FTEs in a specific locations reduced by DT (locations)

number of FTE by job family: FTE reduced by DT (job family)

Once the analytics server reduces the total number of FTEs to a specific number of FTEs is a specific dimension (using the method illustrated by the examples above), the analytics server may further drill down to any granular level desired by the user.

Because all parts of the nodal structure are standardized, a large number of users can work in parallel on the above improvements and a single integration team can create the logical linkage across domains in the user interface described above. The resulting system provides a unified navigation, visualization, analytics, and collaboration tool. This iterative approach may be used to systematically improve the knowledge grid.

Upon executing the analytical protocol, the analytics server may display the results as described herein.

In an example, the analytics server collects data from disparate electronic data sources including entity computers, different branches, and other internal and external data sources. The analytics server parses and disaggregates the collected data into different data tables (e.g., domains, DT, FC, FJ, and MC). The analytics server systematically organizes the data by storing the data into different data tables. The data within the data tables share one or more attributes and each data tables defines the attribute common among its data, related data tables, and one or more adaptors. The adaptors define how, when, and where the data is to be collected. The analytics server then generates a nodal structure where each node represents a file (or other collected data). The nodal structure (knowledge grid) represents all the collected data. The analytics server also links different nodes in accordance with their respective data tables and attributes. Therefore, the knowledge grid replicates how all the collected data is stored within different data tables. The analytics server may automatically and iteratively collect data and assign the data to different data tables in accordance with adaptors, related data tables, and translations rules.

The analytics server may also generate a set of mental models. A mental model is a set of related and linked nodes (within the nodal structure or the knowledge grid) that represent an analytical solution to a problem or a request. For instance, to identify how sales impacts productivity, the analytics server generates a mental model that comprises data corresponding to financial sales and service domains. The mental model also comprises all the related data tables (FC, FJ, and other data tables). The analytics server may generate multiple mental models where each mental model is tailored towards a specific category, problem to be solved, and/or request to be satisfied. Each mental model comprises a subset of nodes (e.g., a portion of nodes within the knowledge grid) that are inter-connected based on their respective data tables.

When the analytics server receives a request from a user, the analytics server parses the request to identify a corresponding mental model. For instance, if the user requests the analytics server to identify how sales have affected productivity, the analytics server retrieves the mental model corresponding to sales affecting productivity. The analytics server then analyzes the collected data in accordance with the mental model and displays results accordingly. Because mental models are standardized, the analytics server may use the same mental model for different domains.

FIG. 31 illustrates a flow diagram of a process executed by the intelligent data analysis system, according to an embodiment. The method 3100 includes steps 3110-3170. However, other embodiments may include additional or alternative execution steps, or may omit one or more steps altogether. The method 3100 is described as being executed by a server, similar to the analytics server described in FIG. 1. However, in some embodiments, steps may be executed by any number of computing devices operating in the distributed computing system described in FIG. 1. For instance, part or all the steps described in FIG. 31 may be locally performed by one or more user computing devices or an administrative computing device. Furthermore, even though some aspects of the method 3100 are described in the context of collecting and analyzing data associated with banking computing systems, it is expressly understood that method 3100 is applicable to collecting, structuring, and analyzing any data.

As described above, the analytics server may collect data from various computing devices and electronic data sources to generate a nodal network (knowledge grid). Having this nodal network and organizing the data according to the various data tables described herein (e.g., domain tables, dimension tables, and various fact journals described herein) allows the user to navigate vast structured and/or unstructured data in a more systematic and efficient manner than possible with conventional methods and systems. In addition to structuring the data and as described in method 3100, the analytics server may also create relationships and identify insights using the data structure described above. These insights may be generated in a systematic and standardized method and may be used cross entities and/or domains.

The analytics server may generate mental models and/or physical data models to better create insights and apply those insights to data (e.g., analyze the data). For instance, a user may request the analytics server to analyze how a marketing campaign has affected sales in a specific branch. The analytics server may implement the methods and systems described herein to analyze relevant portions of the nodal network and develop insights. The analytics server may also apply the mental models to other domains. For instance, the analytics server may generate a domain-specific mental model comprising related nodes and data tables that represent an analytic solution. The analytics server can execute analytical protocols to develop insights by using data corresponding to the mental model. Once the mental model is developed and iteratively refined, the analytics server may use this model to identify insights for other domains. The analytics server may also use the mental model to collect data more efficiently.

Methods and systems of parsing data, generating various data tables, and generating a nodal network have been described herein. In method 3100, the analytics server may cluster the nodes into various clusters and only analyze nodes that are relevant to the cluster of nodes. In this way, the analytics server is not required to analyze all related nodes, which may lead to a more efficient analysis of data (e.g., less computing resources needed and less time to analyze relevant data). At steps 3110-3140, the analytics server may parse and/or disaggregate data and generate a nodal network associated with the data.

At step 3150, the analytics server may receive a request from a user computing device and may parse the request to identify a cluster of nodes associated with the request. The analytics server may receive a request from the end user to perform various analytical protocols regarding attributes associated with the nodal network. The end user may transmit a request to the analytics server to run a predetermined protocol on the data stored within the nodal network. For instance, the end user may request the analytics server to perform profitability analysis for an entity where the entity's data is organized using the methods and systems described above (e.g., within a nodal network). The predetermined protocol (e.g., profitability analysis) may refer to one or more predetermined protocols (e.g., analytical models, artificial intelligence models, and analytical algorithms). In some configurations, the analytics server may receive the predetermined protocol from a different server (e.g., third-party server) or the end user. In some configurations, the analytic server may generate the protocol itself or retrieve it from a database.

In some configurations, the analytics server may retrieve the predetermined protocol and apply the analytical protocols (e.g., models) to the data stored within the nodal network. However, analyzing the data within the entire nodal network may require high processing power and processing time. In order to reduce the processing power needed and/or the processing time, the analytics server may utilize the method 3100 to prioritize various nodes (and their respective data). As described herein, the analytics server may then analyze the data associated with the prioritized nodes.

As used herein, analytical protocols may refer any analysis performed using the data within the nodal data structure, such as profit analysis, efficiency analysis, operational leakage analysis, net profit margins, monthly recurring revenue analysis, sales analysis, cybersecurity analysis, growth analysis, product quality analysis, service quality analysis, and the like. An analytical protocol may refer to one or more algorithms used by the analytics server to analyze the data (e.g., segmented data that is a subset of the data within the nodal data structure) and calculate the results. Therefore, an analytical protocol may refer to one or more algorithms or computer models used by the analytics server to calculate the requested metric. The analytical protocols may be retrieved from a data repository and/or a third-party server.

The analytics server may prompt the user to select a metric to be analyzed. Based on the user's response (e.g., selection), the analytics server may retrieve one or more models corresponding to the user's selection. The analytics server may then apply the retrieved model to the data that has been segmented and selected using various methods described herein. In one example, the analytical protocol may be pre-generated, such that the analytics server executes the model without generating and/or revising the model itself. For instance, when prompted, the analytics server may execute a pre-generated profitability model and calculate the results for the user.

Figure 32:
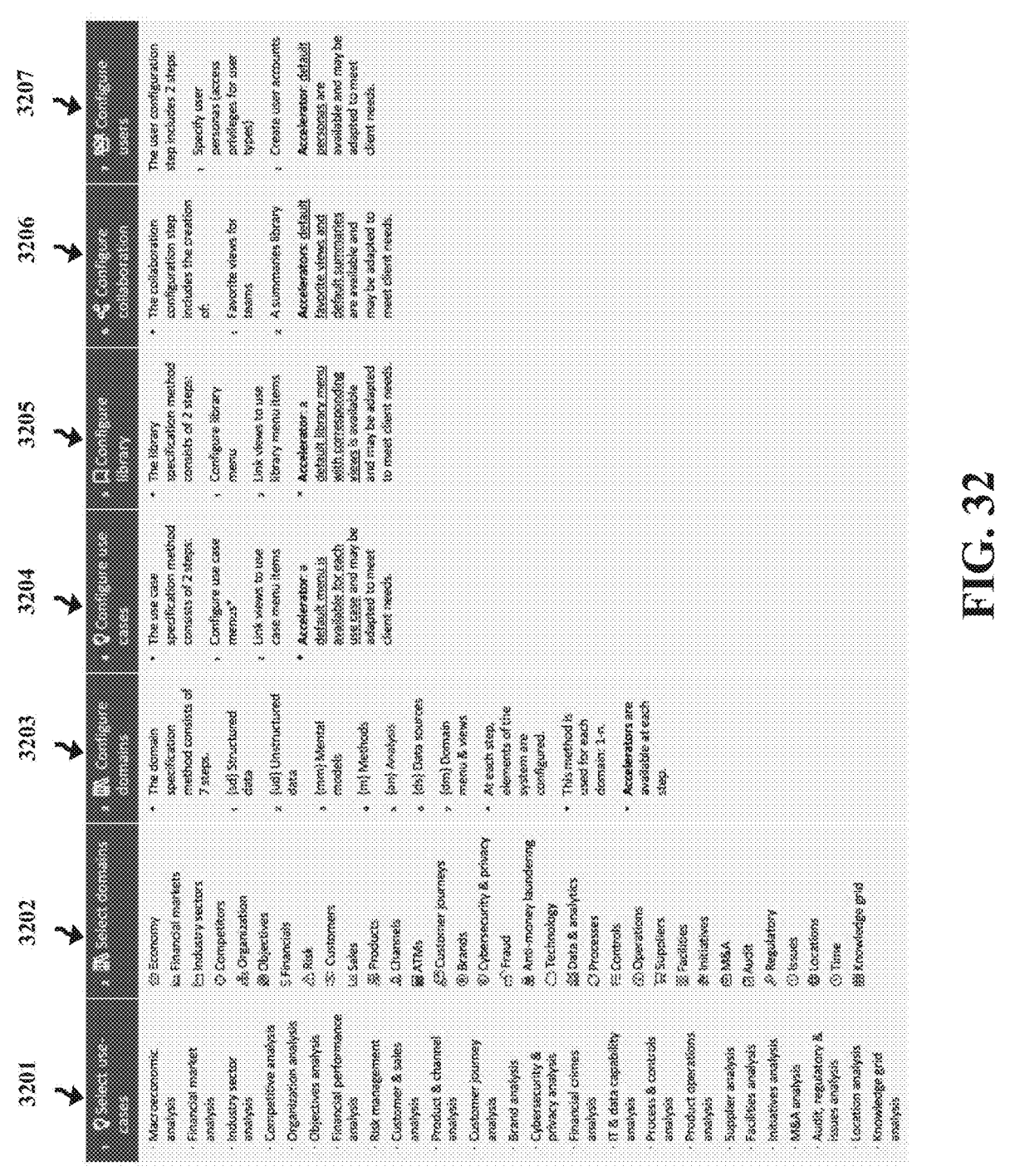

The analytics server may also parse the end user's request to further identify the prioritized nodes and the predetermined protocol. For instance, as will be described in FIG. 32, the end user may utilize a graphical user interface to input various data attributes and protocols.

The predetermined protocol may refer to a request received from the end user. For instance, the end user may use various GUIs described herein to enter a command/request to be performed by the analytics server. The end user may select from a list of analytical protocols provided by the analytics server. For instance, the end user may select "profitability analysis" and then select a group of branches (e.g., all branches within zip code 20009). The analytics server may then analyze the nodes (or a portion of the nodes) that correspond to the right branches and data needed to identify profitability to display the requested results.

In another example, the user may enter a request in natural language (e.g., "show me how profitable our Canadian branches are"). The analytics server then executes a natural language protocol to extract key words from the received request. The analytics server may then cluster the data within the data structure using the key terms associated with the received request. For instance, the analytics server may determine that "Canada," "branches," and "profitable" are keywords within the received request. As a result, the analytics server may cluster the data, such that the clustered data includes data points that correspond to the above-described attributes. After iteratively clustering the data, the analytics server may generate a subset of the data points that are directly related to the received request.

In some configurations, the analytics server may weigh the data points based on how important they are within the data structures described herein. For instance, the analytics server may generate a score for each data point (or a group of data points) that represents an importance of the data point(s). For instance, a node within the nodal data structure that is linked to a higher number of other nodes may receive a higher score than a similar node with fewer linked nodes. In another example, a node that corresponds to data associated with a bigger branch (or a branch that has been identified as more important) will receive a higher score. In an example, a branch located in a bigger city may receive a higher score than another branch located in a rural area. In addition to clustering the data, the analytics server may also filter the nodes within the identified cluster of data, such that the analytics server identifies nodes that correspond to clustering criteria discussed above and have a score than satisfies a threshold.

At step 3160, the analytics server may execute a clustering algorithm to generate one or more clusters of nodes, each cluster having a subset of the set of nodes within the nodal network, each node within each cluster of nodes having at least one common attribute.

The analytics server may execute one or more clustering algorithms to cluster the nodes based on the attributes received within the request (e.g., step 3150). Each cluster may comprise at least one node within the set of nodes of the nodal network. To generate a number of clusters, the analytics server may calculate a multidimensional distance value between each node within the nodal network. Each distance may correspond to an attribute of (e.g., data stored within) each node. The analytics server may assign a cluster to each node based on its respective distance to other nodes, and iteratively repeat calculating the distance value and assigning each node to a cluster until the distance values of nodes within each cluster satisfy a distance threshold. For example, the analytics server may execute a clustering computer model using the data for each node that corresponds to an attribute received within the request or otherwise inputted by the end user. The analytics server may cluster the nodes based on one or more attributes (e.g., single dimension clustering or multi dimension clustering). For clarity, the clustering is described in the context of a single dimension. However, a skilled artisan will recognize that the analytics server can execute multi-dimension clustering algorithms.

The analytics server may generate a number of clusters with each cluster including one or more nodes with similar attributes. By executing the clustering computer model, the analytics server may group the nodes into a number of clusters. Nodes in the same cluster may be more similar (e.g., having attributes with less distance) to each other than to those in other clusters.

In some embodiments, the analytic server may divide the set of nodes into a predetermined number of clusters (e.g., five or ten clusters). For example, the analytics server may receive a parameter for the number of clusters from an end user. The analytics server may iteratively execute the clustering computer model and only stop until the analytics server has reached the predetermined number of clusters and the nodes are assigned to at least one cluster. In some other embodiments, the analytics server may iteratively execute the clustering computer model and only stop until the distance values of nodes within each cluster satisfying a distance threshold. Alternatively, the analytics server may iteratively execute the clustering computer model until the distance values decreasing is less than a threshold or the distance values stop decreasing.

The distance between two nodes may represent a difference of two nodes with respect to one or more attributes. For example, a "spending distance" between two nodes representing two branches represents how similar the two nodes are with respect to spending (e.g., overhead). As described herein, the analytic server may utilize this distance to identify similar nodes and cluster nodes accordingly. Furthermore, because the analytics server considers more than one attribute when assigning nodes to different clusters, the analytics server may generate the distance representing more than one attribute. The analytics server may utilize any distance calculating technique, such as the Euclidean distance or any other distance calculation method, to generate the multidimensional distance value for each node. The Euclidean distance, as described and used herein, may be a "straight-line" distance between two nodes.

In some embodiments, the analytics server may use a non-hierarchical clustering method, such as K-means clustering algorithm, to generate a predetermined number of clusters. For example, the analytics server may generate 10 clusters. The analytics server may start with an initial set of cluster centers. The initial set of cluster centers may be 10 nodes randomly chosen from the set of nodes. The analytics server may calculate the Euclidean distance between each node to each of the centers. The analytics server may minimize the within-cluster scatter, which is the average distance for every node to its cluster center.

In Euclidean space, the within-cluster scatter is the sum of squared distances of each node to the cluster centers. Specifically, the analytics server may minimize the within-cluster scatter with the following two-step iterative process. In the first step, the analytics server may assign each node to its closest cluster center. In the second step, the analytics server may calculate the average location of all the nodes assigned to each cluster and move the cluster center to the average location (e.g., readjust the data point). By repeating this process, the analytics server may iteratively reassign the nodes to more appropriate clusters until either the algorithm converges (the assignment of each node stops changing) or the within-cluster scatter reaches a minimum distance value (e.g., stops decreasing).

In some configurations, the clustering algorithm implemented in the clustering computer model may be K-means clustering, mean-shift clustering, density-based spatial clustering of applications with noise, expectation-maximization clustering, hierarchical clustering, and any other clustering algorithms.

The analytics server may execute the above-described clustering protocols to identify a predetermined number/proportion of nodes that contain (e.g., or otherwise associated with) a predetermined proportion of the data. In some embodiments, the predetermined numbers may be received from the end user. For instance, the end user may require the analytics server to analyze the top 20 percent of nodes that contain 80 percent of the data. In a non-limiting example, the analytics server may identify the nodes that correspond to a higher portion of the data. For instance, nodes that correspond to a busy branch located in a city, which serves many customers may be associated with more data than nodes corresponding to a small branch in a rural area that server fewer customer. Therefore, even if the number of nodes are the same, the nodes that correspond to the busy branch contain more data (that can lead to better results) than nodes that correspond to the smaller branch.

In another example, the end user may limit the number of nodes or the volume of data represented by the nodes. For instance, the end user may instruct the analytics server, such that the data used does not exceed 15 branches. The analytics server then identifies the top 15 branches (that produce the most data) and may analyze the data accordingly.

Upon identifying the nodes, the analytics server may retrieve data associated with the identified nodes. For instance, the analytics server may use the data retrieved to apply and execute the predetermined analytical protocol requested by the end user (step 3150).

At step 3170, the analytics server may display, on a graphical user interface of the user computing device, data associated with the nodes within the identified cluster of nodes. The analytics server may display the results of the execution of the analytical protocols on the graphical user interface. As described above, the analytical server may display various GUIs displaying the results requested by the end user.

In one non-limiting example, a user accesses a software generated by the analytics server that utilizes the methods and systems described herein to analyze various attributes of an entity. In this non-limiting example, the user requests the analytics server to execute profitability analysis and identify profitable areas within the entity. However, in other embodiments and examples, the user may request the analytics server to execute any analytical protocol.

As described above, the analytics server has generated a nodal network having nodes where the nodal network contains all relevant data associated with the entity. Furthermore, the nodal network may be organized in accordance with the above-described data tables.

The user may access a graphical user interface generated/updated by the analytics server. The user may then select a use case (step 3201). For instance, the user may select macroeconomic analysis, competitive analysis, or other options displayed on the GUI. In this non-limiting example, the user selects profitability analysis. Each analysis option displayed in the step 3201 represents an analytical protocol to be executed on a portion of the nodes within the nodal structure.

Each use case may correspond to an analytical protocol. For instance, the analytics server may have a list of data needed to perform the "customer journey analysis." The analytic server may determine that in order to provide customer journey analysis, the analytics server need to execute a computer model (e.g., analytical algorithm) on data associated with certain domains and dimension tables. Therefore, when the user selects a use case, the analytics server automatically retrieves the analytical algorithm (model) and identifies the data accordingly. The data identification, however, can be refined based on receiving additional criteria from the end user.

At steps 3202-3, the user may select and configure one or more domains within the nodal network. As depicted, the user may first select one or more domains of data (e.g., facilities, ATMs, sales, and financials). The user also selects structured and unstructured data. Simply put, the user may select these domains to view profitability analysis of all ATMs and branches.

After the user identifies the domains and use cases, the analytics server may execute various clustering algorithms to identify a subset of the nodes that contain a predetermined portions. For instance, the analytics server first identifies nodes that correspond to attributes received in steps 3201-3203. The analytics server then clusters the identified nodes to identify the top 20% of the nodes that contain 80% of the data. Once the analytics server identifies these nodes, the analytics server retrieves the data associated with the identified nodes. The analytics server then executes one or more analytical protocols identified in step 3201 onto the data retrieved and displays the results. For instance, the analytics server may retrieve and execute algorithms that calculate customer journey experience for the end user.

The displayed results can then be configured and customized by the user (steps 3204-3207). For instance, the user can customize the views, data summarization, and select permissions and display preferences.

FIG. 33 illustrates a flow diagram of a process executed by the intelligent data analysis system, according to an embodiment. The method 3300 includes steps 3310-3360. However, other embodiments may include additional or alternative execution steps, or may omit one or more steps altogether. The method 3300 is described as being executed by a server, similar to the analytics server described in FIG. 1. However, in some embodiments, steps may be executed by any number of computing devices operating in the distributed computing system described in FIG. 1. For instance, part or all the steps described in FIG. 33 may be locally performed by one or more user computing devices or an administrative computing device. Furthermore, even though some aspects of the method 3300 are described in the context of collecting and analyzing data associated with banking computing systems, it is expressly understood that method 3300 is applicable to collecting, structuring, and analyzing any data.

As described above, the analytics server may collect data from various computing devices and electronic data sources to generate a nodal network (knowledge grid or data grid). Having this nodal network and organizing the data according to the various data tables described herein (e.g., domain tables, dimension tables, and various fact journals described herein) allows the user to navigate vast structured and/or unstructured data in a more systematic and efficient manner than possible with conventional methods and systems. In addition to structuring the data and as described in method 3300, the analytics server may also create relationships and identify insights using the data structure described above. These insights may be generated in a systematic and standardized method and may be used cross entities and/or domains.

The analytics server may generate mental models and/or physical data models to better create insights and apply those insights to data. For instance, a user may request the analytics server to analyze how a marketing campaign has affected sales in a specific branch. The analytics server may implement the methods and systems described herein (e.g., method 3300) to analyze relevant portions of the nodal network and develop insights. The analytics server may also apply the mental models to other domains. For instance, the analytics server may generate a domain-specific mental model comprising related nodes and data tables that represent an analytic solution. The analytics server can execute analytical protocols to develop insights by using data corresponding to the mental model. Once the mental model is developed and iteratively refined, the analytics server may use this model to identify insights for other domains. The analytics server may also use the mental model to collect data more efficiently.

Methods and systems of parsing data, generating various data tables, and generating a nodal network has been described above (e.g., FIGS. 1-4 and FIG. 17). In method 3300, the analytics server may cluster the nodes into various clusters and only analyze nodes that are relevant to the cluster of nodes. In this way, the analytics server is not required to analyze all related nodes, which may lead to a more efficient analysis of data (e.g., less computing resources needed and less time to analyze relevant data). At steps 3310-3330, the analytics server may parse and/or disaggregate data and generate a nodal network associated with the data.

At step 3340, the analytics server may, upon receiving the request from a user-computing device, parse the request to identify a node associated with the request. The request may be an instruction to display collected data associated with a certain category, domain, or an event. The analytics server first parse the request to identify a node or a category of nodes to be displayed. The user request may be inputted by a user accessing a graphical user interface provided by the analytics server. For instance, a user may execute a web application or access a webpage generated by the analytics server. The user may then input a request to view a category of data (e.g., cybersecurity for the organization website). Upon receiving the request from the user, the analytics server may identify one or more nodes related to the request using the methodologies described above.

At step 3350, the analytics server may identify, using an attribute of a profile associated with the user computing device, a second subset of the set of nodes authorized to be accessed by the user computing device. The server may query and retrieve a profile associated with a user operating the user computing device. The analytics server may retrieve an identifier associated with the user, such as login credentials, user name, and the like. In some embodiments, the analytics server may retrieve an identifier associated with the user computing device to identify the profile. For instance, the analytics server may identify the user operating the user computing device based on an IP address or MAC address of the user computing device.

Using the data within the profile, the analytics server may identify a subset of the nodes within the set of nodes (within the nodal data structure) to which the user is authorized to access. As described above, the analytics server may first identify a first subset of the set of nodes that comprise all nodes relevant to the request. Using the profile data, the analytics server may then identify a subset of first subset of the nodes to which the user is authorized to access. In some embodiments, the second subset of nodes may include the entire first subset of the set of nodes. For instance, if the user is identified to be the CEO of an entity with access authorization to all the nodes, then the first subset (all nodes relevant to the request) is the same as the second subset (all relevant nodes that can be accessed by the user).

In one non-limiting example, the analytics server may retrieve an attribute of the nodes that can be accessed by (or are restricted from) the user. For instance, a user's profile may indicate that the user is restricted from accessing or viewing data associated with all bank accounts located within a list of countries or a geographical region. As a result, the analytics server may analyze the nodes within the first subset of the nodes (identified as associated with the user's request). For instance, the analytics server may analyze metadata associated with the first subset of the nodes to determine whether they include an attribute that is listed as restricted within the user profile.

Because analyzing each node within the first subset of the nodes (e.g., nodes that are relevant to the user's request) may be computationally intensive, the analytics server may analyze the data to be presented to user categorically and based on predetermined templates and persons. The user profile may also include a predetermined template or persona to identify what information can be accessed or viewed by the user.

The analytics server may use data tables discussed herein (e.g., domains and dimension tables) to ensure that each user has access to the right information. User profiles may be used to constrain access to information in the nodal data structure. These constraints may be defined using domains and dimension tables. For example, a user profile may be given access to a subset of domains and/or to a specific range of values (nodes) in a number of dimension tables (DT1 . . . DTn). Domains and dimension tables may be used to personalize the information to be displayed based on a user profile. For example, financial, organization and other information may be organized in different domain tables and each domain table may include data indicating a persona who is restricted or authorized to access the data. In another example, atomic level information (e.g., individual employee, specific IT asset) is not made available to certain groups of users (e.g., only aggregated information is accessible). For instance, a user may not view detailed data at an atomic level. However, the analytics server may analyze the data and display the results to the user. For instance, the user can view profitability of a branch without seeing cash flow data.

Referring now to FIG. 34, a graphical representation (3400) of a user profile or a user account is depicted, in accordance with an embodiment. In the depicted embodiment, the user account 3402 may include a persona 3406 and authoring privileges 3404. The authoring privileges 3404 may indicate the data that can be added to or revised within the nodal data structure. For instance, a user may have unfettered access to the data stored within the nodal data structure and view the results without any restrictions. However, the user may not be able to add any new data to revise any of the data associated or linked to a particular node or the arrangement of nodes within the nodal data structure.

The persona 3406 corresponds to a preconfigured and revisable template that can indicate what information is accessible to the user. In some configurations, a user may have two or more personas. For brevity, FIG. 34 only depicts one person 3406. Each persona may represent a preconfigured template having executable and machine-readable code that represents the type of data that can be accessed by a user. Therefore, by assigning a persona to a user, a system administrator can instruct the analytics server to limit the user's access to the nodal data structure.

The persona 3406 may include data associated with the user's core organization and cross organization. As used herein, a user's core organization correspond to an organization (e.g., or any segment of an organization, such as a department within an organization) that is directly related to the user. For instance, if the user is an accountant, the user's core organization is considered to be the accounting department. The core organization privileges 3408 includes data instructing the analytics server regarding how to limit the data within the nodal data structure that are associated with the user's core organization. Specifically, the core organization privileges 3408 indicates how the analytics server can identify data tables associated with the user's core organization to which the user has access. For instance, the persona 3406 includes scope 3412, sensitivity 3414, and level 3416, which can be used to determine what data tables (and sometimes what data within each data table) can be accessed or viewed by the user. For instance, a domain table may be designated to contain organizational data associated with a particular sensitivity. If the sensitivity level of the domain table is higher than the sensitivity 3414, the analytics server does not display data within the domain table to the user.

In some embodiments, the persona 3406 may include a sensitivity level (e.g., numerical level between 1-5) that identifies an access level associated with the user. For instance, various data tables discussed herein may include a sensitivity level (e.g., a sensitivity level previously inputted by a system administrator). The analytics server may only display data associated with a data table if the sensitivity level is below the sensitivity 3414.

As used herein, cross organization identifies authorization refers to data that is associated with segments of the organization other than the core organization. Accordingly, the cross organization privileges 3410 includes scope 3418, sensitivity 3420, and level 3422 that identify which data tables (e.g., from other departments) the user can access. Using the persona 3406, the analytics server ensures that the GUIs displayed and discussed herein are displayed for authorized users only.

Figure 35:
FIGS. 35-38 illustrate graphical user interfaces generated by an intelligent data analysis system, according to different embodiments.

Referring now to FIG. 35 a graphical representation of domains accessible to a user is depicted, in accordance with an embodiment. In the depicted embodiment, each column within the chart 3500 represents a domain and each row represents a unit and/or sub-unit of an organization. For instance, row 3502 indicates a first department within an organization (e.g., accounting department). Accordingly, organizations 3504-3518 represent sub-units of the organization 3502 (e.g., account receivables, legal accounting, and banking accounting). Moreover, organizations 3520-3524 represent other organizational units within an entity (cross organization). These organizations can be customized, such that each organization represents a particular segment of an entity/company.

As depicted, all domains associated with the user's core organization (organization 3510) are colored, which means that the user has access to all domains within the core organization. Also as depicted, the user may also have access to domains of the organization 3 (3522). However, the user may not access any other domains belonging to other organizations.

In some embodiments, the user's profile may indicate a sensitivity level. For instance, the user may have a level 2 access to domain 2 of organization 3504 and level 3 access to domain 3 of organization 3506. This indicates that the user can only access data that is designated as sensitivity level 2 or below for domain 2 within the organization 3504.

Figure 36:
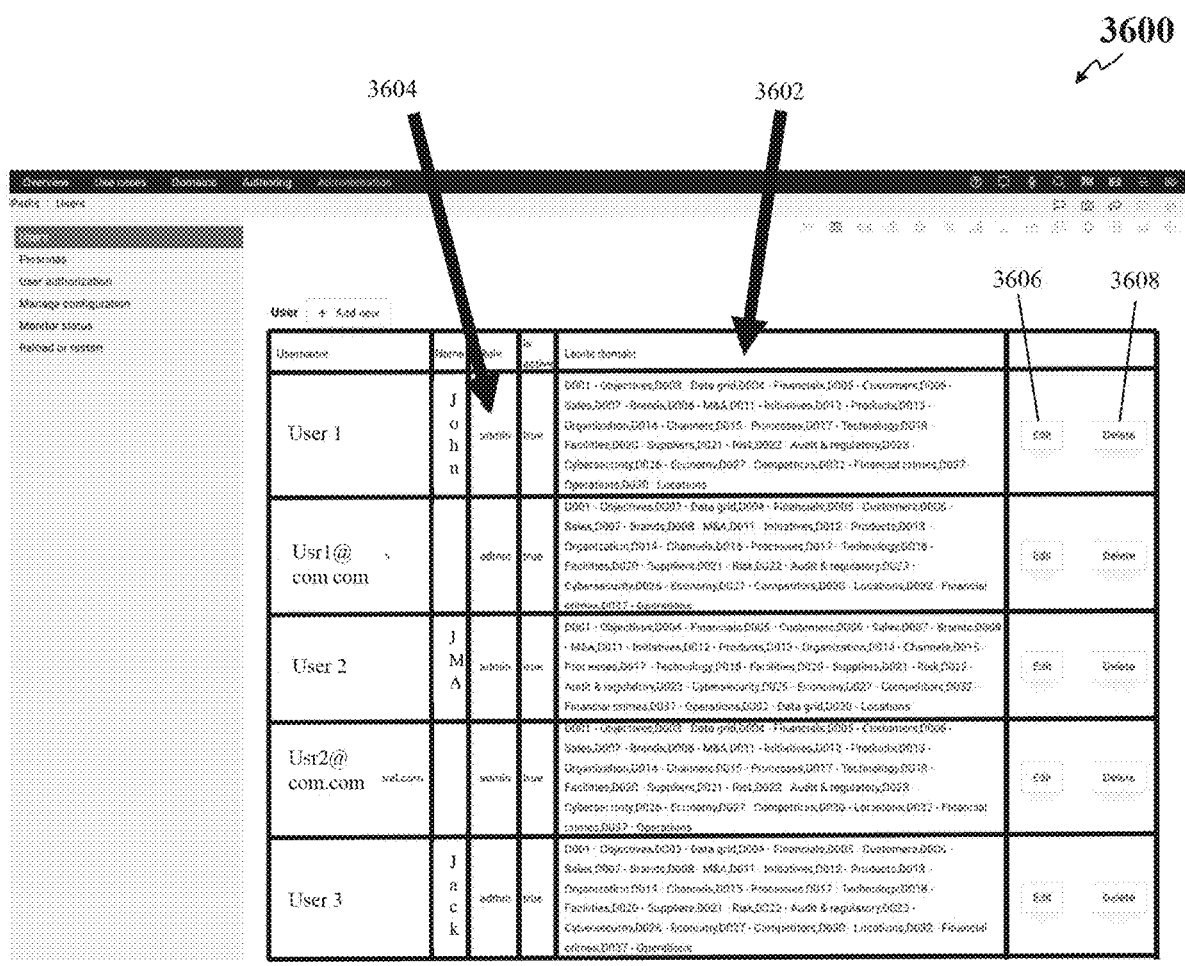

Referring now to FIG. 36, the analytics server may display each user's access rights and authorizations on a GUI, such as the GUI 3600. As depicted, the GUI 3600 displays username assign to the user, user's name, role (e.g., author, admin, and regular, as depicted in the column 3604), and activity information. The column 3602 displays domains accessible to each user. The GUI 3600 also displays the interactive graphical elements 3606 and 3608 where a system administrator can edit or delete a user's account and/or the user's access rights.

Figure 37:
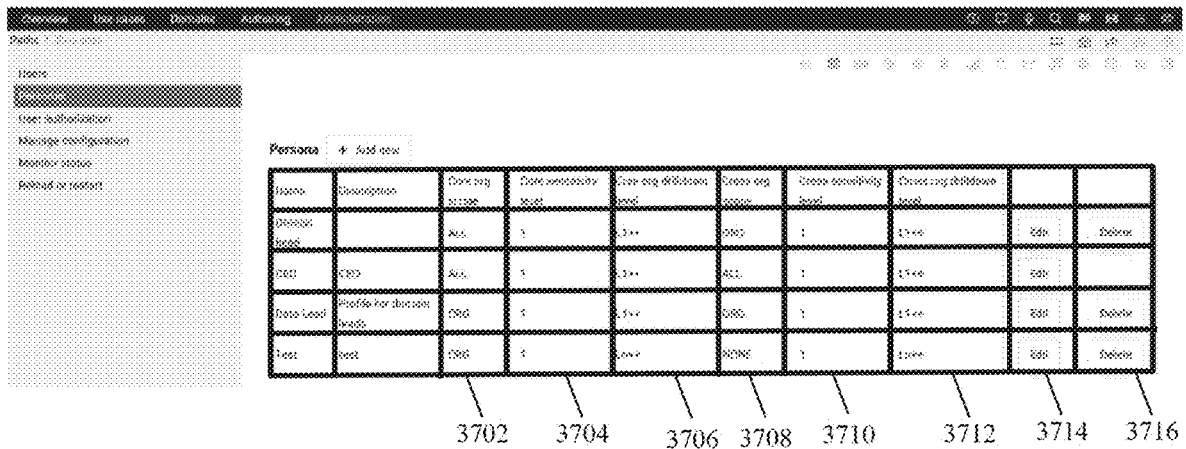

Referring now to FIG. 37, the GUI 3700 displays access rights for different users and their corresponding personas. As discussed herein, personas are used to authorize information access. Column 3702 displays (core organization scope) organization scope (nodes within DT_ORGANIZA-TION_UNIT domain, which may be accessed by each user).

The column 3704 (core sensitivity level) displays a sensitivity level (1=high, 2=medium, 3=low) for domains that can be accessed by each user. The column 3706 (core org drilldown level) display a level of access within the hierarchy of the nodal data structure. For instance, the nodal data structure may be arranged in a hierarchical manner (e.g., L1-Ln structure). The column 3706 may indicate a nodal layer associated with the domain tables that can be accessed by the user. For instance, the column 3706 provides drill-down access for each user where L1++ means that the user can access data stored at all levels of the nodal data structure and L1+ means that the user can access only one level below the identified scope (e.g., nodes that are relevant to the user's request).

The column 3708 (cross org scope) displays a scope for other domains (nodes within other domains, such as non-core organizations), which may be accessed. For instance, the Test user does not have access to any cross organizational domains. In contrast, the CEO user has access to all domains (core or cross organizational domains). The columns 3710 and 3712 displays data similar to the columns 3704 and 3706.

Figure 38:
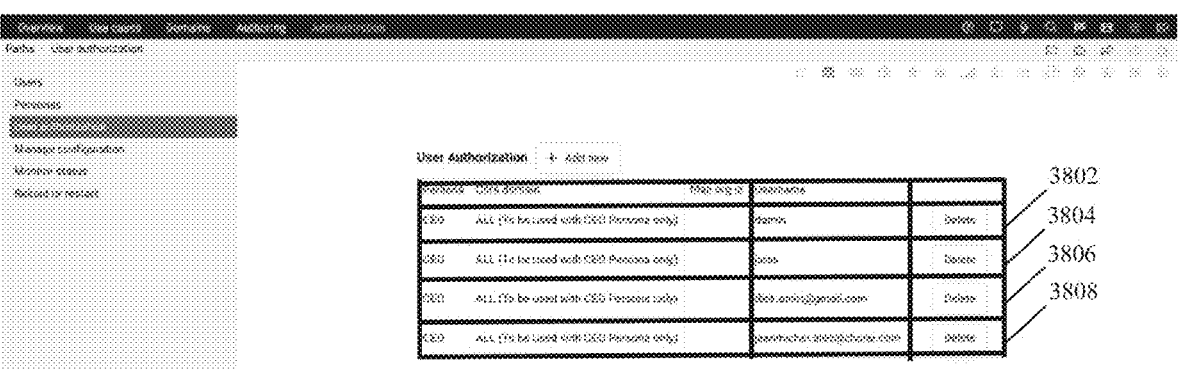
Figure 42:
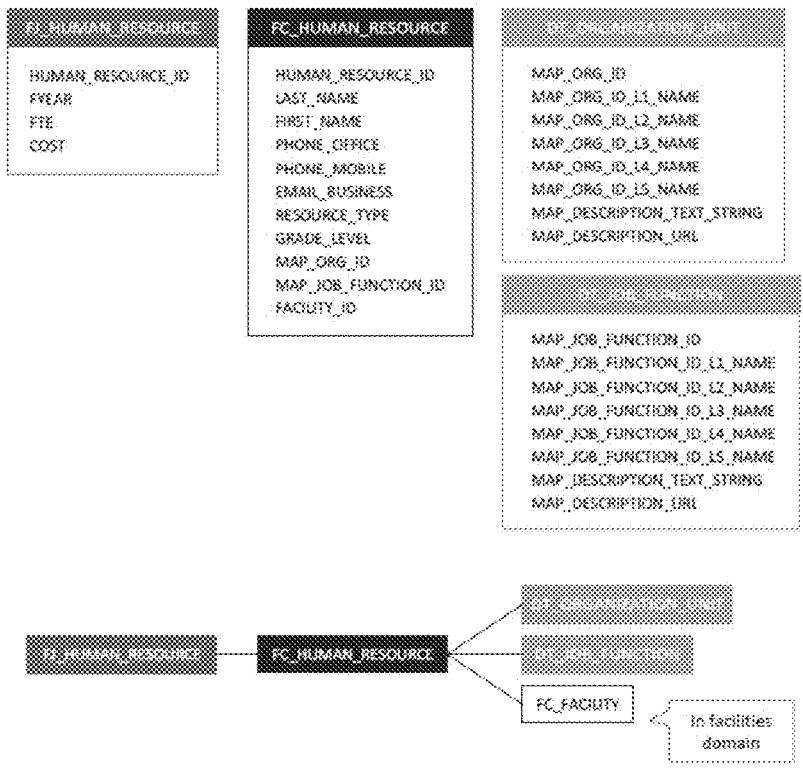
Figure 43:
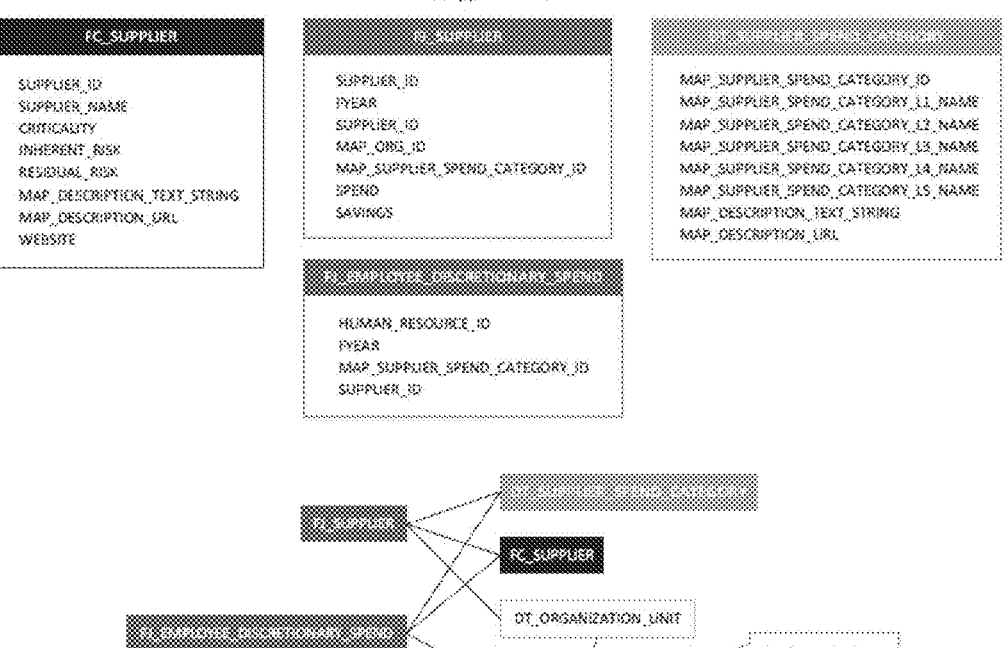
Figure 44:
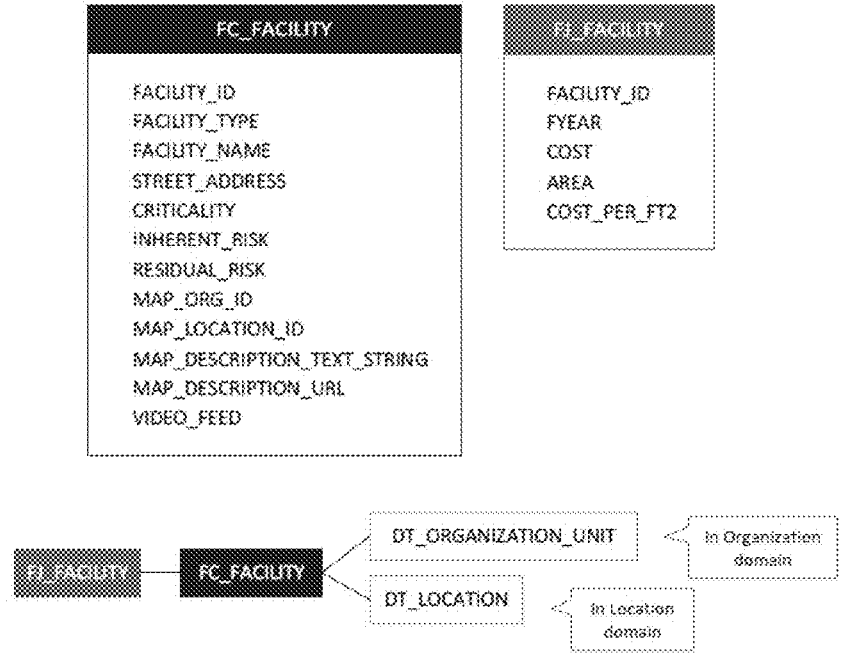

Referring now to FIG. 38, a GUI 3800 displays different preconfigured personas and templates for different users. Each user (belonging to each row 3802-3808) may be assigned one or more personas. As described herein, a persona is a template to provide access rights to a specific set of domains and set of organization unit nodes. Persona template parameters may indicate org ID for the specific user (and identification of an organization or a unit within an entity), core domain (s) for the specific user (a core domain associated with a user; for example, CFO's core domain may be financials, the CIO's core domain may be IT, the CEO's core domain may be all domains). The sensitivity parameters (core domain or cross domain) may be used to determine which information may be accessed within the domain.

Referring back to FIG. 33, at step 3360, the analytics server may display, on a graphical user interface displayed on the user computer device, data associated with the second subset of the set of nodes. Upon identifying one or more related nodes, the analytics server may retrieve data corresponding to the identified nodes and may display the data on a dynamic graphical user interface. The analytics server may execute various analytical protocols requested by the user in the request (step 3350) on the second subset of the nodes (and the corresponding data) and may display the results accordingly.

In an example, a user accesses an electronic platform to transmit a request to the analytics server. For instance, the user uses an input element to input a query in natural language, such as "what is our profitability for having ATMs in Texas?" The analytics server first parses the query to identify keywords (e.g., profit, ATM, and Texas). The analytics server then identifies all nodes within the nodal data structure associated with the identified keywords. The analytics server may then retrieve a persona associated with the user via retrieving a user name of the user and retrieving an associated persona from the user's internal profile. Using the persona, the analytics server may determine that the user has access to detailed data associated with revenue of ATMs in Texas. As a result, the analytics server may perform profitability analysis and display the results. If the analytics server determines that the user does not have access to the data at its atomic level, the analytics server may still display the results. However, the analytics server may not display detailed data associated with the ATMs in Texas. For instance, the analytics server may not display cash flow data for ATMs.

The methods and systems described herein provide an integrated analytics platform that can be adapted and customized. Using the methods and systems described herein, the analytics server may provide one solution in a multi-domain nodal data structure. As discussed herein, information can be arranged within a nodal data structure using different domains and other data tables. As a result, the analytics server may converge complex solutions into one solution by analyzing data that is structured in the manner discussed herein.

Conventional and current methods offer analytics platforms. While these platforms provide a general purpose method that can analyze data that is selected and identified for a specific problem, these platforms do not have any knowledge about the business/entity themselves. Moreover, each user (e.g., data analyst) must build an individual model for their own purpose, such as a model to produce results requested by each individual analyst. Therefore, conventional solutions work in silos and cannot solve complex problem with multiple domains.

In contrast, the analytics server arranges and organizes the solutions using the steps shown in FIG. 39. The analytics server may use the data tables and configuration files depicted in FIG. 40 to arrange the data within the nodal data structure and to iteratively improve the solution. Implementation of the method and system described herein may be performed in parallel across multiple domains of expertise. For instance, the methods and system described herein can be implemented by different users performing different tasks simultaneously or at different times. Reviewing detailed examples enables teams to quickly refine solution requirements. Moreover, new domains and use cases may be easily configured and added to a solution. Spreadsheets for domains and use cases can accelerate data collection efforts where data is automatically assigned to different data tables in accordance with rules within the spreadsheets (e.g., adapters to recurring data sets automate data ingestion).

Configuration files may allow tailoring of solutions to client needs. The disclosed platform may include a view builder that enables users to select data sets and create views to display information optimally using a list of visualization options.

Conventional solutions (e.g., enterprise risk management solutions) provide a generalized approach to design. In contrast, the nodal data structures discussed herein can be customized for different entities. The platform disclosed herein is designed and optimized to simplify and accelerate the assembly of information and analytics solutions. The foundational (atomic) concept used by the platform (analytics server) is data tables. Data tables are divided in 3 types, each with a specific purpose. First, dimension tables (DTs) are used to create hierarchical dimensions with a L1-Ln structure. DTs may be used to model any dimension, which disaggregates a concept into sub-concepts. Any number of levels may be used. In some configurations, in addition to hierarchical dimensions, non-hierarchical (flat) dimensions may also be used. Flat dimensions may be specified in FCs and FJs directly. DTs may be referred to by FCs and FJs with a foreign Key.

Second, fact catalogs (FCs) may be used to build catalogs of people, things, concepts (e.g., employees, facilities, suppliers, risks, initiatives, applications, computing assets). Fact catalogs include attributes of data defined in a DT or a domain. In addition, a fact catalog may point to one or more DTs. Third, fact journals (FJs) contain time stamped information. FJs contain attributes and may point to one or more FCs and/or DTs.

Each table (DT, FC, or FJ) belongs to a specific domain or domain tables. Domains are used to organize and govern information by area of expertise. The overall approach used by the analytics server is to standardize, abstract, and automate the data. Specifically, the analytics server may reduce the data dimensionality to 3 types of tables are used (DT, FC, and FJ). Each table type has a standard format and specific purpose. The analytics server may then model all domains using the same method. For instance, financials, organization, risk, IT, and processes may be modeled with abstracted data components (DT, FC, and FJ). In the "automation" step, standardization and abstraction enables automation in data model assembly, maintenance, visualization, and analytics.

Each data table discussed herein may also include information on its data source for data lineage purposes. Having a single table for each concept (e.g., journal of financial transactions) in the model is preferable for simplicity. However, in cases with multiple data sources for similar concepts, multiple tables may be used.

The method and systems described herein allow parallel model assembly where multiple domain teams may work in parallel to assemble the information grid. Since data components are standardized, the result is one model with integrated information. The analytics server allows experts in multiple domains to build one integrated solution. The data grid (nodal network) may be subdivided into domains. The development and evolution of each domain may be led by a team of experts (e.g., finance, organization, IT, cybersecurity, risk, compliance, etc.). Since all teams use common data components, domains may be integrated into a single solution.

As a result, and as depicted in FIG. 41, different data tables may be connected to each other. The analytics server may limit the degrees of freedom used to link different data tables. For instance, the graph 4100 depicts a hierarchy of different tables. The graph 4102 depicts how a FC can be connected to two DTs. Moreover, the graph 4104 visualizes how FJ can be connected to two different FCs and DTs. FIGS. 42-45 depict different examples of nodal data structures having different data tables.

Using the methods and systems described herein, the analytics server may allow automated data model assembly. For instance, DTs, FCs and FJs may be created, prepared and loaded using templates (such as spreadsheets). The analytics server may then assemble the nodal data structure (relationships between DTs, FCs, and FJs) automatically. Using the methods and systems described herein, the analytics server may allow for data model visualization. The relationships between tables (DTs, FCs, and FJs) as well as the relationships between measures and dimensions may be visualized using standard widgets (matrix and radial). DTs and FCs create consistent dimensions across domains. This results in integrated multi-domain and multi-dimensional information. Each data table discussed herein may utilize a domain-specific language (DSL).

The analytics server may allow for simplified view building using the methods and systems described herein. A standard method may be used for view configuration (view builder) where a user selects table (DT, FC, and FJ), configure view (rows, columns, filters, visualization, etc.) and allows the analytics server to visualize the results (or raw data). The multi-domain, multi-dimensional analytics discussed herein may be automated (e.g., p-Algorithm). Other algorithms may be applied to all domains consistently using DTs, FCs, and FJs. Moreover, multi-dimensional views across multiple domains may be created using (DTs and FCs) to tag (FJs) and/or (DTs) to tag (FCs).

Using the methods and systems discussed herein, domains may be extended and expanded by adding DTs, FCs, FJs or attributes and rows for existing tables. As a result, users are able to learn how to build, maintain and extend these models quickly. Domains and dimension tables play a role in ensuring that each user has access to the right information. User profiles may be used to constrain access to information in the nodal data structure. Constraints may be defined using domains and dimension tables. For example, a user profile may be given access to a subset of domains and/or to a specific range of values (nodes) in a number of dimension tables (DT1 . . . DTn).

Domains and dimension tables may be used to personalize the information to be displayed based on a user profile. For example, financial, organization and other information may be restricted to a subset of nodes in the organization unit dimension tables. Another example is where atomic level information (e.g., individual employee and specific IT asset) is not made available to certain groups of users (only aggregated information may be accessible).

Using the methods and systems described herein, the analytics server may execute pre-existing or third party algorithms to generate results more efficiently. For instance, the nodal data structure may organize the information in a way, such that the appropriate subset of data can be applied to a conventional algorithm or method to generate results.

The methods and systems described herein allow for multi-dimensional analytics that is user-driven. Using the methods and system described herein, a user may pivot, filter, or drilldown the data within the nodal data structure. The analytics server enables users with authorship privileges to create views based on data tables. Once a view is created, pivot, filter and drilldown features may be added to analyze this information. Once pivots and filters are defined, they may be included in a DTV specification next to the view query service to automatically create a left menu including row pivot options, column pivot options and filter options. Based on the data set displayed, the analytics server determines applicable visualization options. For large data sets (e.g., over 60 million rows of data), a calculation engine may be used to pre-compute aggregated data sets. This improves response time for common queries.

The organization of the data using the methods and systems discussed herein can be ingested by a machine learning model, such that the machine learning model can learn how to organize data. After training the model, the data can be automatically ingested and organized with little to no human intervention.

To configure a solutions, the analytics server may utilize use cases and examples to identify how previous problems were solved. For instance, the analytics server may determine how profitability for a region was solved (e.g., how data was retrieved from different tables and how data was analyzed). Once a solution is modeled, the analytics server can replicate the process for other domains and other entities. The analytics server may use a library of use cases to accelerate analyzing the data.

Foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:

parsing, by a processor, data into a set of domain data tables, each domain data table corresponding to a domain having a first criterion;

parsing, by the processor, each domain data table into a set of dimension data tables, each dimension data table corresponding to a dimension having a second criterion;

generating, by the processor, a nodal network comprising a set of nodes organized into a plurality of layers of nodes where each node represents at least a portion of the data, each node having metadata comprising an identifier corresponding to a particular domain data table and a particular dimension table corresponding to data associated with each node;

linking, by the processor, one or more nodes based their respective metadata;

upon receiving a request from a user computing device, parsing, by the processor, the request to identify a first subset of the set of nodes associated with the request, a profile associated with the user computing device corresponding to a plurality of attributes indicating a data sensitivity level of access of a plurality of table levels of access for each of a plurality of domain data tables of the set of domain data tables and a layer level of access of a plurality of layer levels of access for the plurality of layers of nodes, the data sensitivity levels indicating data accessible by the user computing device;

filtering, by the processor, the identified first subset of the set of nodes to a second subset of the first subset of nodes based on the profile having authorization to access the second subset of the first subset of nodes based on each of the second subset of nodes comprising an identifier of a domain data table for which a data sensitivity level of access of the profile satisfies a data sensitivity level of the domain data table and a layer level of access of the profile satisfies a layer level of the domain data table; and displaying, by the processor on a graphical user interface displayed on the user computer device, data associated with the second subset of the set of nodes.

2. The method of claim 1, wherein the attribute is associated with a user operating the user computing device corresponding to at least one of an identifier of the user or an identifier of the user's account.

3. The method of claim 1, wherein the attribute corresponds to an identifier of the user computing device.

4. The method of claim 1, wherein the profile includes a predetermined template identifying a type of data authorized to be accessed.

5. The method of claim 1, wherein the processor further executes an analytical protocol before displaying data associated with the second subset of the set of nodes.

6. The method of claim 5, wherein the analytical protocol corresponds to the request.

7. The method of claim 1, wherein the profile indicates which domain data tables are accessible by the user computing device.

8. The method of claim 1, wherein the profile indicates a scope for data accessible by the user computing device.

9. A system comprising:

a non-transitory storage medium having a set of instructions where when executed, the set of instructions cause a processor to:

parse data into a set of domain data tables, each domain data table corresponding to a domain having a first criterion;

parse each domain data table into a set of dimension data tables, each dimension data table corresponding to a dimension having a second criterion;

generate a nodal network comprising a set of nodes organized into a plurality of layers of nodes where each node represents at least a portion of the data, each node having metadata comprising an identifier corresponding to a particular domain data table and a particular dimension table corresponding to data associated with each node;

link one or more nodes based on their respective metadata;

upon receiving a request from a user computing device, parse the request to identify a first subset of the set of nodes associated with the request, a profile associated with the user computing device corresponding to a plurality of attributes indicating a data sensitivity level of access of a plurality of table levels of access for each of a plurality of domain data tables of the set of domain data tables and a layer level of access of a plurality of layer levels of access for the plurality of layers of nodes, the data sensitivity levels indicating data accessible by the user computing device;

filter to the identified first subset of the set of nodes to a second subset of the first subset of nodes based on the profile having authorization to access the second subset of the first subset of nodes based on each of the second subset of nodes comprising an identifier of a domain data table for which a data sensitivity level of access of the profile satisfies a data sensitivity level of the domain data table and a layer level of access of the profile satisfies a layer level of the domain data table; and display, on a graphical user interface displayed on the user computer device, data associated with the second subset of the set of nodes.

10. The system of claim 9, wherein the attribute is associated with a user operating the user computing device corresponding to at least one of an identifier of the user or an identifier of the user's account.

11. The system of claim 9, wherein the attribute corresponds to an identifier of the user computing device.

12. The system of claim 9, wherein the profile includes a predetermined template identifying a type of data authorized to be accessed.

13. The system of claim 9, wherein the processor further executes an analytical protocol before displaying data associated with the second subset of the set of nodes.

14. The system of claim 13, wherein the analytical protocol corresponds to the request.

15. The system of claim 9, wherein the profile indicates which domain data tables are accessible by the user computing device.

16. The system of claim 9, wherein the profile indicates a scope for data accessible by the user computing device.

17. A system comprising:

a user computer device in communication with a server, the server having a processor configured to:

parse data into a set of domain data tables, each domain data table corresponding to a domain having a first criterion;

parse each domain data table into a set of dimension data tables, each dimension data table corresponding to a dimension having a second criterion;

generate a nodal network comprising a set of nodes organized into a plurality of layers of nodes where each node represents at least a portion of the data, each node having metadata comprising an identifier corresponding to a particular domain data table and a particular dimension table corresponding to data associated with each node;

link one or more nodes based on their respective metadata; and upon receiving a request from a user computing device, parse the request to identify a first subset of the set of nodes associated with the request, a profile associated with the user computing device corresponding to a plurality of attributes indicating a data sensitivity level of access of a plurality of table levels of access for each of a plurality of domain data tables of the set of domain data tables and a layer level of access of a plurality of layer levels of access for the plurality of layers of nodes, the data sensitivity levels indicating data accessible by the user computing device;

filter the identified first subset of the set of nodes to a second subset of the first subset of nodes based on the profile having authorization to access the second subset of the first subset of nodes based on each of the second subset of nodes comprising an identifier of a domain data table for which a data sensitivity level of access of the profile satisfies a data sensitivity level of the domain data table and a layer level of access of the profile satisfies a layer level of the domain data table; and display, on a graphical user interface displayed on the user computer device, data associated with the second subset of the set of nodes.

18. The system of claim 17, wherein the attribute is associated with a user operating the user computing device corresponding to at least one of an identifier of the user or an identifier of the user's account.

* * * * *